US012601967B2

(12) United States Patent
Hirata et al.

(10) Patent No.: US 12,601,967 B2
(45) Date of Patent: Apr. 14, 2026

(54) INFORMATION DISPLAY SYSTEM HAVING ACUTE-ANGLED DIFFUSION CHARACTERISTICS AND IMAGE LIGHT CONTROL FILM USED FOR THE SAME

(71) Applicant: Maxell, Ltd., Kyoto (JP)

(72) Inventors: Koji Hirata, Kyoto (JP); Toshinori Sugiyama, Kyoto (JP); Koji Fujita, Kyoto (JP); Eiji Takagi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 51 days.

(21) Appl. No.: 18/533,225

(22) Filed: Dec. 8, 2023

(65) Prior Publication Data

US 2024/0103351 A1 Mar. 28, 2024

Related U.S. Application Data

(63) Continuation of application No. 17/624,376, filed as application No. PCT/JP2020/020735 on May 26, 2020, now Pat. No. 11,880,125.

(30) Foreign Application Priority Data

| | | |
|---|---|---|
| Jul. 4, 2019 | (JP) | 2019-124958 |
| Jul. 9, 2019 | (JP) | 2019-127379 |
| Jul. 11, 2019 | (JP) | 2019-129104 |

(51) Int. Cl.
*G03B 21/62* (2014.01)
*B60K 35/23* (2024.01)
(Continued)

(52) U.S. Cl.
CPC .............. *G03B 21/62* (2013.01); *B60K 35/23* (2024.01); *B60K 35/28* (2024.01); *G02B 27/28* (2013.01);
(Continued)

(58) Field of Classification Search
CPC ...... G03B 21/62; G03B 21/604; G03B 21/56; G03B 21/60; G03B 21/58; G03B 21/625; G02B 27/28
(Continued)

(56) References Cited

U.S. PATENT DOCUMENTS

| | | | | |
|---|---|---|---|---|
| 9,779,692 B2 * | 10/2017 | Skrypchuk | ........... | G02B 6/0051 |
| 10,670,865 B2 * | 6/2020 | Song | .................... | G02B 3/0068 |

(Continued)

FOREIGN PATENT DOCUMENTS

| | | | |
|---|---|---|---|
| JP | H03-8319 U | | 1/1991 |
| JP | H03-068319 | * | 7/1991 |

(Continued)

OTHER PUBLICATIONS

International Search Report and Written Opinion mailed on Jul. 7, 2020, received for PCT Application PCT/JP2020/020735, filed on May 26, 2020, 14 pages.
(Continued)

*Primary Examiner* — Stephanie E Bloss
*Assistant Examiner* — Kevin C Butler
(74) *Attorney, Agent, or Firm* — XSENSUS LLP

(57) ABSTRACT

An information display system having acute-angled diffusion characteristics configured to display an image to inside or outside of a space via a transparent projected member, the information display system including an image projection apparatus, a transparent sheet provided on an inner surface of a display region set on a part of the projected member; and a light direction changing unit that directs a direction of image light toward the transparent sheet of the display region, the image projection apparatus including an image light characteristic converting unit, and an image light control film that restricts an emission direction of the image light being provided on an upper surface of the image
(Continued)

projection apparatus, so that the image light is not directly delivered to an observer and the image light reflected by the transparent sheet is recognized by the observer.

9 Claims, 30 Drawing Sheets

(51) Int. Cl.

| | |
|---|---|
| *B60K 35/28* | (2024.01) |
| *B60K 35/50* | (2024.01) |
| *B60K 35/60* | (2024.01) |
| *B60K 37/20* | (2024.01) |
| *G02B 27/28* | (2006.01) |
| *G03B 21/56* | (2006.01) |
| *G03B 21/58* | (2014.01) |
| *G03B 21/60* | (2014.01) |
| *G03B 21/604* | (2014.01) |
| *G03B 21/625* | (2014.01) |

(52) U.S. Cl.
CPC ............. *G03B 21/56* (2013.01); *G03B 21/58* (2013.01); *G03B 21/60* (2013.01); *G03B 21/604* (2013.01); *G03B 21/625* (2013.01); *B60K 35/50* (2024.01); *B60K 35/60* (2024.01); *B60K 37/20* (2024.01)

(58) Field of Classification Search
USPC ........................................................ 359/443
See application file for complete search history.

(56) References Cited

U.S. PATENT DOCUMENTS

| | | | | |
|---|---|---|---|---|
| 10,890,763 | B2 * | 1/2021 | Hirata | .................. H04N 9/3167 |
| 11,586,040 | B2 * | 2/2023 | Hirata | .................... B60K 35/29 |

| | | | | | | |
|---|---|---|---|---|---|---|
| 2006/0181769 | A1 * | 8/2006 | Kumasawa | .......... | G03B 21/604 359/449 |
| 2007/0206156 | A1 * | 9/2007 | Quach | .................. | G03B 21/604 353/20 |
| 2011/0057212 | A1 * | 3/2011 | Quach | .................... | G03B 21/62 257/E33.044 |
| 2016/0195719 | A1 | 7/2016 | Yonetani | | |
| 2017/0045740 | A1 | 2/2017 | Hirata et al. | | |
| 2018/0180982 | A1 | 6/2018 | Yamaki et al. | | |
| 2018/0348411 | A1 | 12/2018 | Yamaki et al. | | |
| 2019/0079218 | A1 * | 3/2019 | Lee | ..................... | G02B 5/0205 |
| 2019/0265472 | A1 * | 8/2019 | Sugiyama | ............. | B60K 35/00 |

FOREIGN PATENT DOCUMENTS

| | | | | | | |
|---|---|---|---|---|---|---|
| JP | 5-12248 | U | | 2/1993 | | |
| JP | 2004-168230 | A | | 6/2004 | | |
| JP | 2005-084172 | A | | 3/2005 | | |
| JP | 2006227581 | A | * | 8/2006 | ............ | G03B 21/62 |
| JP | 2009529144 | A | * | 8/2009 | .............. | H04N 5/74 |
| JP | 2015-194707 | A | | 11/2015 | | |
| JP | 6133522 | B1 | | 5/2017 | | |
| JP | 6199530 | B1 | | 9/2017 | | |
| JP | 2017227901 | A | * | 12/2017 | | |
| JP | 2018072507 | A | * | 5/2018 | | |
| JP | 2019-003081 | A | | 1/2019 | | |
| JP | 2019012271 | A | * | 1/2019 | | |
| JP | 2019056884 | A | * | 4/2019 | | |
| WO | WO-2020241075 | A1 | * | 12/2020 | .......... | B60K 35/231 |
| WO | WO-2021002121 | A1 | * | 1/2021 | ............ | G03B 21/10 |

OTHER PUBLICATIONS

Office Action issued on Sep. 20, 2022, in corresponding Japanese patent Application No. 2021-529920, 10 pages.

* cited by examiner ( a )

X AXIS
(VERTICAL
DIRECTION)

Y AXIS
(HORIZONTAL
DIRECTION)

ANGULAR CHARACTERISTICS OF LUMINANCE
(UP-DOWN DIRECTION)

ANGULAR CHARACTERISTICS OF CONTRAST
(UP-DOWN DIRECTION)

VIEWING DIRECTION

*FIG. 23*

IMAGE DISPLAY
REGION (1)

IMAGE DISPLAY REGION (2)

IMAGE DISPLAY
REGION (1)

IMAGE DISPLAY
REGION (2)

REFLECTANCE OF GLASS TO P-POLARIZED LIGHT
AND S-POLARIZED LIGHT ( a )

IMAGE DISPLAY REGION (1e)

SIZE OF IMAGE DISPLAY APPARATUS          SIZE OF VIRTUAL IMAGE ( a )

( b )

1

INFORMATION DISPLAY SYSTEM HAVING ACUTE-ANGLED DIFFUSION CHARACTERISTICS AND IMAGE LIGHT CONTROL FILM USED FOR THE SAME

CROSS-REFERENCE TO RELATED APPLICATIONS

The present application is a continuation of U.S. application Ser. No. 17/624,376, filed Jan. 3, 2022, which based on PCT filing PCT/JP2020/020735, filed May 26, 2020, which claims priority to JP 2019-124958, filed Jul. 4, 2019, JP 2019-127379, filed Jul. 9, 2019, and JP 2019-129104, filed Jul. 11, 2019, the entire contents of each are incorporated herein by reference.

TECHNICAL FIELD

The present invention relates to an information display system having acute-angled diffusion characteristics and an image light control film used for the same.

BACKGROUND ART

As an information display system, in general, displaying an image by using a transparent or reflective screen has already been known, and for example, according to Patent Document 1 and Patent Document 2 below, a transparent or reflective screen provided with a light diffusion layer containing a binder and fine particles has already been known.

On the other hand, as to an information display apparatus for use in a vehicle and an information display system using the same, a so-called head-up display (HUD) apparatus configured to display traffic information such as route information and traffic congestion information and vehicle information such as remaining fuel and cooling water temperature by projecting image light to form a virtual image on a windshield or a combiner of an automobile has already been known in, for example, Patent Document 3 below. In this type of information display apparatus, in general, in order to enlarge the image information displayed on a small-sized image display element and monitor it as a virtual image for the purpose of reducing the movement of the point of view of a driver, the configuration in which the image displayed on the image display apparatus is projected onto the point of view of the driver by using an optical system including a concave mirror (function of convex lens) has been adopted in many cases.

RELATED ART DOCUMENTS

Patent Documents

Patent Document 1: Japanese Patent No. 6133522
Patent Document 2: Japanese Patent No. 6199530
Patent Document 3: Japanese Unexamined Patent Application Publication No. 2015-194707

SUMMARY OF THE INVENTION

Problems to be Solved by the Invention

However, in the above-mentioned projection information display system or apparatus which is the conventional technology, for example, consideration about the safety and visibility relating to the image light from the liquid crystal display panel directly entering the eyes of the observer have been insufficient in some cases. Therefore, the present invention provides an information display system that is safe and has excellent visibility and an image light control film used for the information display system.

Means for Solving the Problems

In order to solve the problem described above, for example, a configuration described in claims is adopted. This application includes a plurality of means for solving the problem described above, and an example thereof is an information display system configured to display an image to inside or outside of a space via a transparent projected member constituting the space, and the information display system includes: an image projection apparatus arranged inside the space and configured to generate and project image light by modulating a light flux from a light source; a transparent sheet provided on an inner surface of a display region set on a part of the projected member; and a light direction changing unit configured to direct a direction of the image light from the image projection apparatus toward the transparent sheet of the display region, wherein the image projection apparatus includes an image light characteristic converting unit for converting the image light from the light source constituting the image projection apparatus into image light having a narrow diffusion angle and composed of a specific polarization component, and wherein an image light control film configured to restrict an emission direction of the image light is provided on an upper surface of the image projection apparatus, so that the image light is not directly delivered to an observer and the image light reflected by the transparent sheet is recognized by the observer.

Also, another example is an image light control film used for the information display system, and the image light control film has a sandwich structure in which a transparent portion made of transparent silicon and a black portion made of black silicon are alternately arranged and a synthetic resin is arranged on a light incident/emission surface.

Effect of the Invention

According to the present invention, it is possible to provide an information display system that is safe and has excellent visibility and an image light control film used for the information display system. The problems, configurations, and effects other than those described above will become apparent by the description of the embodiments below.

BRIEF DESCRIPTIONS OF THE DRAWINGS

FIG. 8 is a diagram showing a specific configuration example of the light source apparatus constituting the image display apparatus;

FIG. 11 is a diagram including graphs showing image light diffusion characteristics of the image display apparatus;

FIG. 23 is a cross-sectional view showing a configuration of a unidirectional transparent sheet (transmission type) (second example) constituting the image projection apparatus of the information display system;

FIG. 35 is a diagram showing an example in which information is displayed to pedestrians and others outside a vehicle via a rear glass constituting the vehicle;

Figure 36:
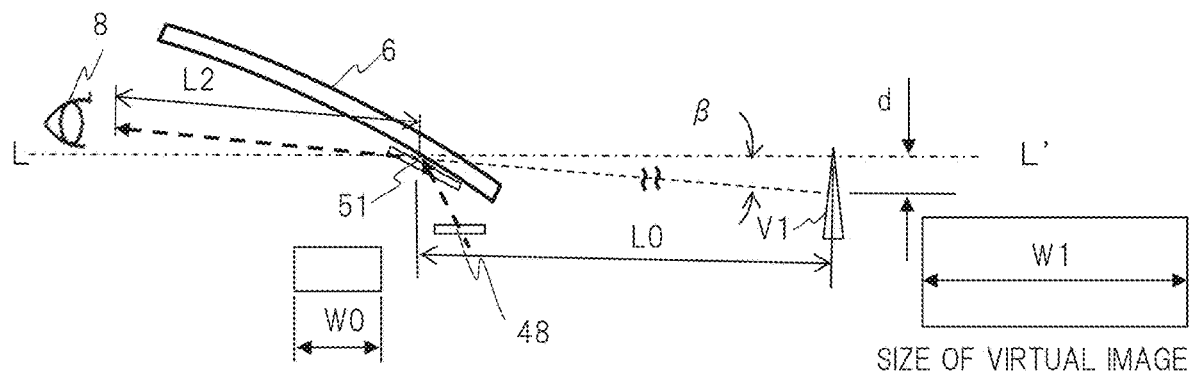
Figure 36:
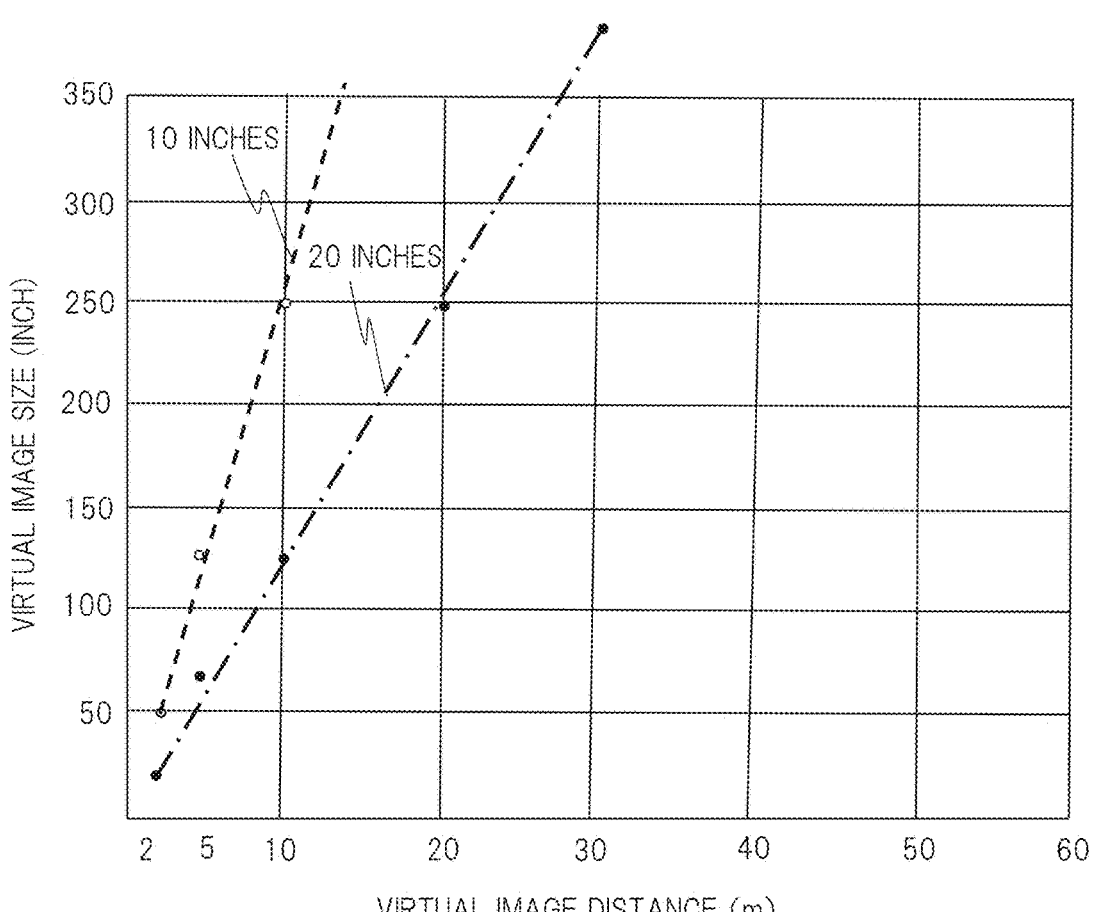
Figure 37:
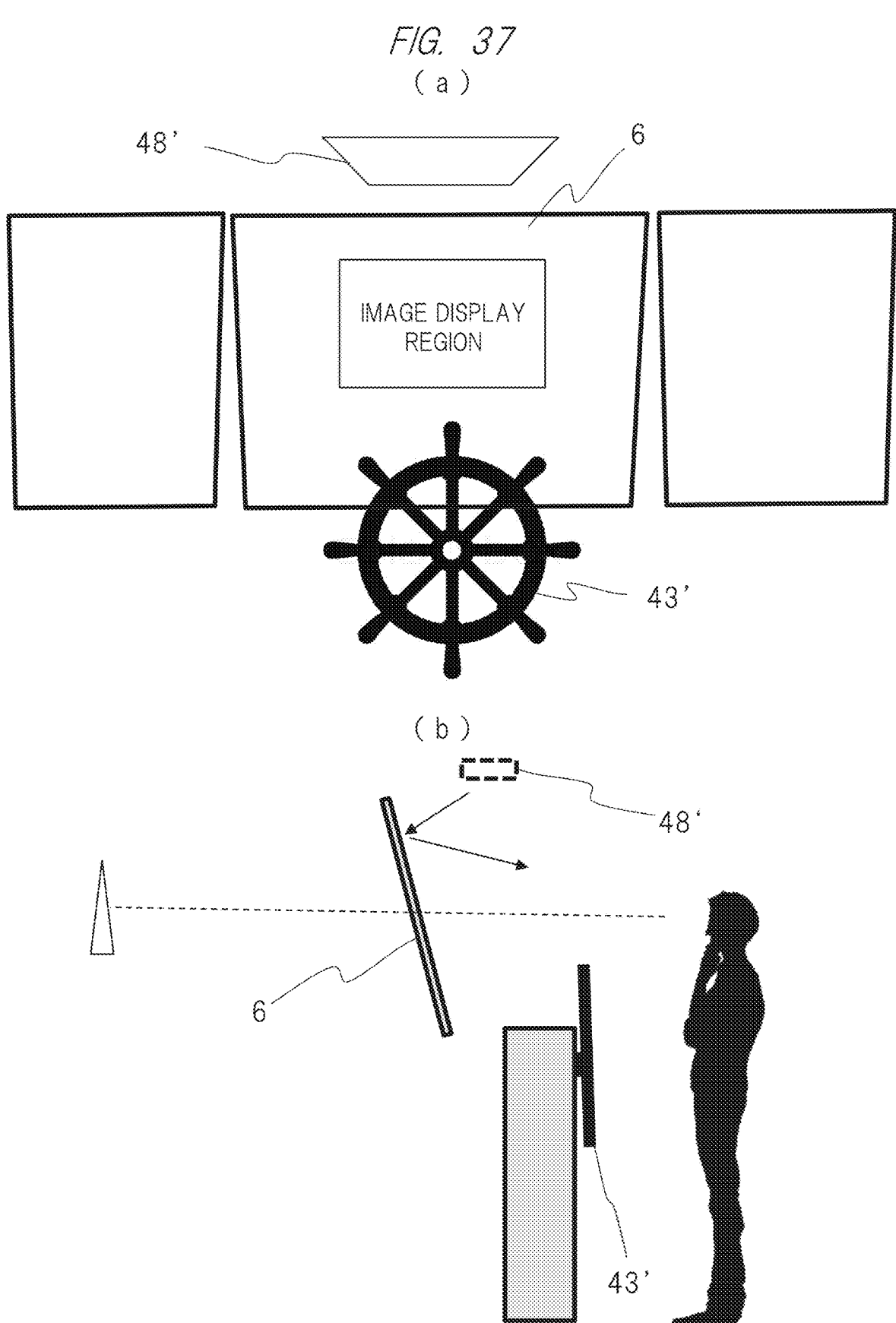

FIG. 36 is a diagram showing the relative size of the reflected image (virtual image) shown on the window glass obtained by calculation using as a parameter the distance at which the virtual image can be seen, in a vehicle image display system of an HUD type; and FIG. 37 is a diagram showing an example in which the information display system of the present invention is used in a deck (wheelhouse) of a ship.

DETAILED DESCRIPTION OF PREFERRED EMBODIMENTS

The following embodiments relate to an information display system capable of displaying an image to inside or outside of a store (space) by reflecting on or transmitting through a transparent member that partitions the space such as a show window glass, and further relate to an information display system capable of displaying an image to a show window and inside or outside of an automobile, a train, an aircraft, or the like (hereinafter, collectively referred to as "vehicle") by projecting image light from a large-area image generation source onto a windshield, a rear glass, a side glass, or a combiner of the vehicle by using the information display system.

In the above-mentioned conventional technology, no consideration is given to the improvement of the light utilization efficiency by efficient delivery of the image light to the observer, and as a result, there is the problem that it is difficult to reduce the power consumption of the system and the image projection apparatus including the light source of the apparatus. Further, in a vehicle information display apparatus represented by a head-up display or the like, AR (Augmented-Reality) information which is a virtual image is displayed so as not to obstruct the view outside the vehicle from the driver, but high resolution and high visibility are also required when displaying information such as a map. Therefore, a liquid crystal display element (liquid crystal display panel) is often used because a high-quality image can be easily obtained and it is inexpensive. On the other hand, since a small-sized liquid crystal display element is used in order to reduce the size of the set, the obtained resolution of the projection image is insufficient, and it poses the problem that it is not suitable for displaying a high-resolution image displayed on a smartphone or the like.

Further, in the conventional vehicle information display apparatus of the head-up display type, when the inclination angle of the windshield is large (close to vertical), since the place where the imaging apparatus is arranged is limited to the space between the steering and the windshield, there is the possibility that the image light from the imaging apparatus is reflected in the direction in which the light cannot reach the eyes of the driver after the reflection on the windshield and the system cannot be established, and there is the restriction on the structure of the vehicle in which the apparatus is installed. Also, the conventional vehicle information display apparatus of the head-up display type is not intended to display image information to the outside of the vehicle. Therefore, when it is desired to display image information to the outside of the vehicle, an image display apparatus such as a display is mounted inside the vehicle, and the image information is displayed through the glass of the vehicle. However, in that case, the image display apparatus obstructs the view of the driver, which is not preferable for safe driving.

In Patent Document 1 and Patent Document 2, which are conventional technologies, a reflective screen or a transparent screen provided with a light diffusion layer containing a binder and fine particles used in an information display apparatus is disclosed, but no consideration is given to efficient delivery of image light to an observer, that is, improvement of light utilization efficiency, and there is no teaching on the application in vehicles and the specific method, form, and configuration for that purpose.

In the following embodiments, instead of the conventional information display system and apparatus, an information display system having an acute-angled diffusion characteristics capable of displaying high-resolution image information even on a glass surface of a show window or the like and capable of significantly reducing power consumption of the system and apparatus including a light source and an image projection apparatus by making the divergence angle of the image light emitted from the information display apparatus small, that is, an acute angle and further aligning it with a specific polarization so as to efficiently deliver the image light to the observer and improve the light utilization efficiency is provided, and an image light control film used for the information display system is provided.

According to the following embodiments, a novel information display system capable of displaying high-resolution image information even on a glass surface of a show window or the like, capable of significantly reducing power consumption by improving the light utilization efficiency by the efficient delivery of the image light to the observer, and further safe and excellent in visibility and usability because the image light from the liquid crystal display panel does not directly enter the eyes of the observer can be provided, and an image light control film used for the information display system is provided.

Hereinafter, embodiments of the present invention will be described with reference to drawings and the like. Note that the present invention is not limited to the description of the embodiments, and various changes and modifications can be made by a person having ordinary skill in the art within the scope of the technical idea disclosed in this specification. In addition, in all the drawings for describing the present invention, components having the same function are denoted by the same reference characters, and repetitive description thereof will be omitted in some cases.

<Information Display System>

Figure 1:
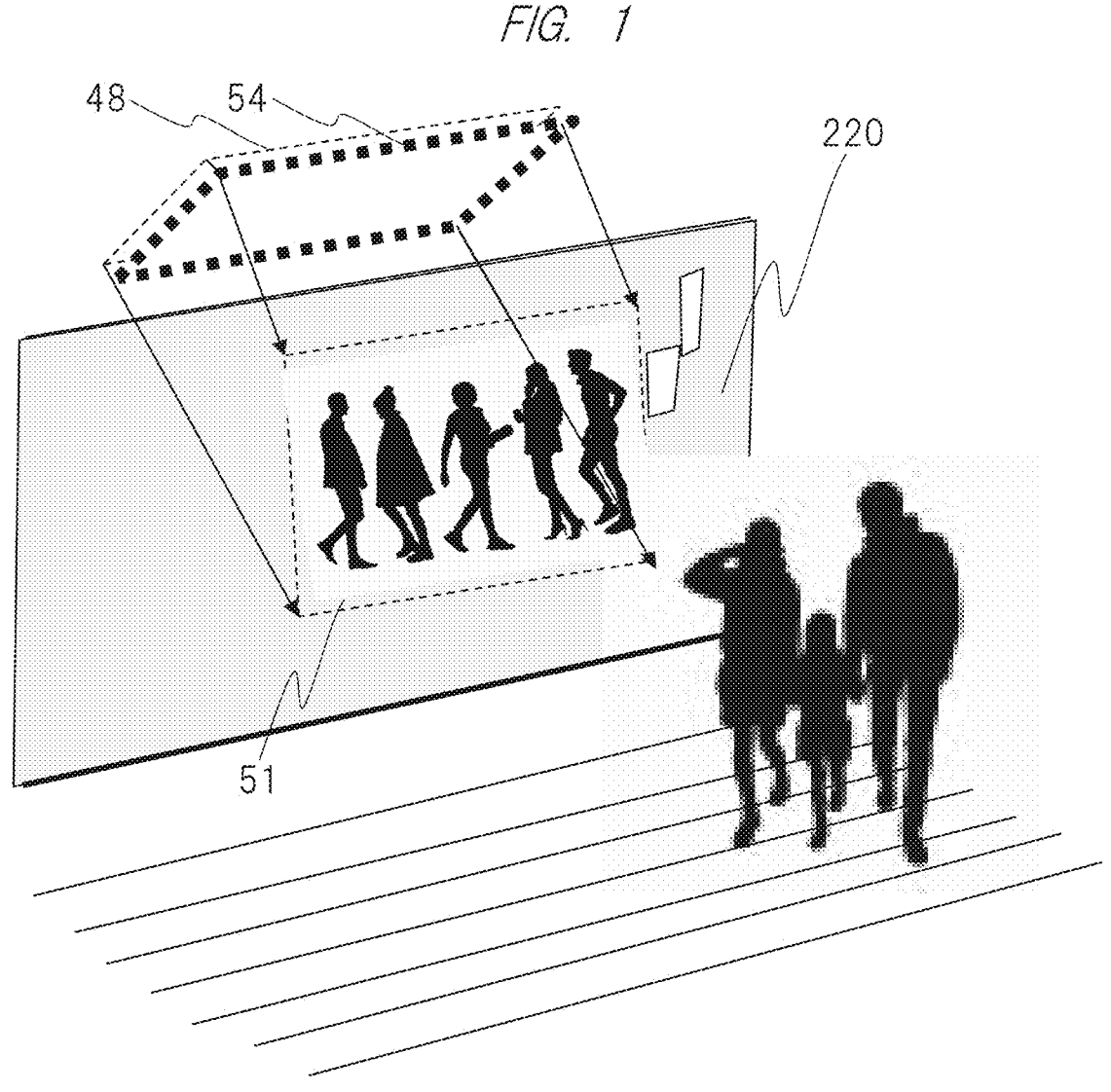
FIG. 1 is a diagram showing an example of an overall configuration of an information display system according to an embodiment of the present invention.

FIG. 1 shows an overall configuration of an information display system according to an embodiment of the present invention. For example, in a store or the like, a space is partitioned by a show window (also referred to as "window glass") 220 which is a translucent member such as glass, and according to the information display system of the present embodiment, it is possible to unidirectionally display an image to inside or outside of the store (space) by reflecting on or transmitting through the transparent member. In FIG. 1, the inside of the show window 220 (inside the store) is shown as a far side in the depth direction, and the outside thereof (for example, the sidewalk) is shown as a near side.

More specifically, as shown in FIG. 1, though described later in detail, an image display apparatus 48 provided with a light source and configured to generate and project image light to be displayed is arranged above the show window 220 which is a transparent member such as glass, and the image light generated by the image display apparatus 48 is unidirectionally displayed to inside or outside selectively by the function of a light direction changing panel 54 and a transparent sheet (film) 51 attached to the show window 220 also described later in detail. Accordingly, it is possible to display various kinds of information to inside or outside of the show window 220 by using it, and it is possible to remarkably improve the utilization efficiency of the show window.

Figure 2:
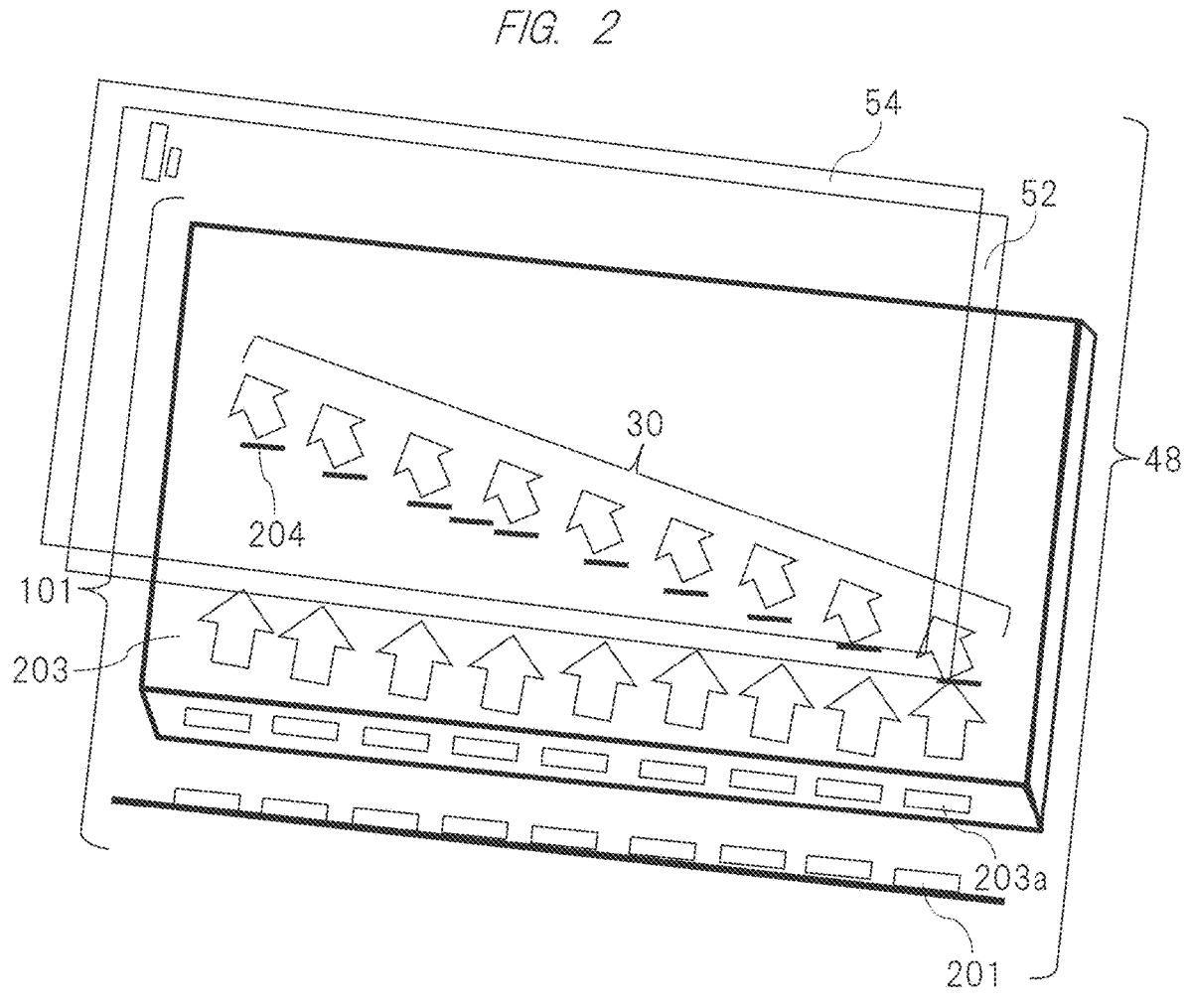
FIG. 2 is a diagram showing an example of a specific configuration of a light source apparatus constituting an image projection apparatus of the information display system.

Next, FIG. 2 shows a more specific configuration of the above-mentioned information display system, and an image display element 52 constituting the above-mentioned image display apparatus 48 is composed of a relatively large-sized liquid crystal display panel with a screen size of more than 6 inches. Further, in order to perform correction at a level of causing no problem in practical use by distortion correction, the resolution of the panel is preferably 1280×720 dots or more.

Also, the image display apparatus 48 further includes a light source apparatus 101 constituting a light source thereof together with the above-mentioned liquid crystal display panel 52, and the light source apparatus 101 is shown in a developed perspective view together with the above-mentioned liquid crystal display panel 52 in FIG. 2.

Though described later in detail, as indicated by arrows 30 in FIG. 2, the liquid crystal display panel (element) 52 obtains an illumination light flux having characteristics similar to laser light with acute-angled diffusion characteristics, that is, strong directivity (straightness) and polarization plane aligned in one direction, by the light from the light source apparatus 101 which is a backlight apparatus, and emits the image light modulated in accordance with an input image signal to the transparent sheet 51 provided on a surface of the window glass 220. Also, in FIG. 2, the information display system is shown together with the liquid crystal display panel 52 constituting the image display apparatus 48. Also, as shown below, it further includes the light direction changing panel 54 configured to control the directional characteristics of the light flux emitted from the light source apparatus 101 and a narrow-angle diffusion plate (not shown) as needed. Namely, polarization plates are provided on both surfaces of the liquid crystal display panel 52, and the image light having a specific polarization is emitted with the light intensity modulated by the image signal (see arrows 30 in FIG. 2). Consequently, a desired image is projected as specific polarized light having high directivity (straightness) toward the window glass 220 via the light direction changing panel 54, and it is reflected on or transmits through the transparent sheet 51 provided on the surface thereof so as to be directed to the eyes (not shown) of the observer inside or outside the store (space). Note that a protective cover (not shown) may be provided on the surface of the above-mentioned light direction changing panel 54.

In the present invention, in order to significantly reduce the power consumption by improving the utilization efficiency of the light flux 30 emitted from the light source apparatus 101, in the image display apparatus 48 including the light source apparatus 101 and the liquid crystal display panel 52, high directivity is given by optical components such as a lenticular lens and a transparent panel described below to the luminance of the image light which is the light from the light source apparatus 101 (see arrows 30 in FIG. 2) and is transmitted through or diffused by the transparent sheet 51 provided on the surface of the window glass 20 as described below. According to this, the image light from the image display apparatus 48 efficiently reaches an observer inside the show window 220 (inside the store) or an observer outside it (for example, on a sidewalk) with high directivity (straightness) like a laser beam, and as a result, a high-quality image can be displayed with high resolution and the power consumption by the image display apparatus 48 including an LED element 201 serving as a light source can be remarkably reduced.

<Example of Image Display Apparatus>

Figure 3:
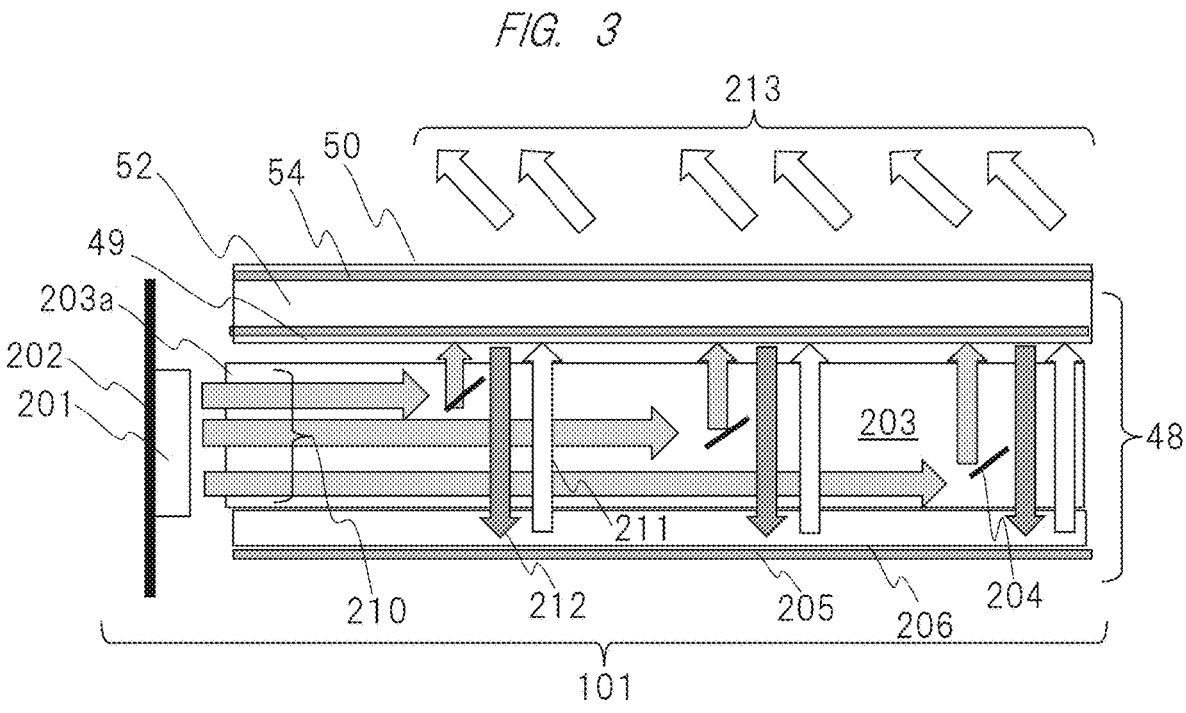
FIG. 3 is a cross-sectional layout view for describing a configuration example and operation of the light source to perform the polarization conversion in the image projection apparatus.

FIG. 3 shows a specific configuration of the light source apparatus 101 described above. In FIG. 3, the liquid crystal display panel 52 and the light direction changing panel 54 arranged on the image display apparatus 48 including the light source apparatus 101 in FIG. 2 are shown. The light source apparatus 101 is formed to have a case made of plastic or the like as shown in FIG. 2, and is configured such that the LED element 201 and a light guide body 203 described later in detail are housed in the case. On an end surface of the light guide body 203, in order to convert the divergent light from each of the LED elements 201 into substantially parallel light flux as shown in FIG. 2, a lens shape whose cross-sectional area gradually increases toward a light receiving portion and which functions to gradually reduce a divergence angle by total reflection plural times when propagating inside is provided. On an upper surface thereof, the liquid crystal display panel 52 constituting the image projection apparatus 48 is attached. Further, on one side surface (left end surface in this example) of the case of the light source apparatus 101, the LED (Light Emitting Diode) element 201 which is a semiconductor light source and an LED board 202 on which the control circuit thereof is mounted are attached, and a heat sink which is a member for cooling the heat generated by the LED element and the control circuit is attached to an outer surface of the LED board 202 in some cases.

On the other hand, on a frame (not shown) of the liquid crystal display panel attached to the upper surface of the case of the light source apparatus 101, the liquid crystal display panel 52 attached to the frame, an FPC (Flexible Printed Circuits: Flexible Wiring Board) (not shown) electrically connected to the liquid crystal display panel, and the like are attached. Namely, though described in detail later, the liquid crystal display panel 52 which is a liquid crystal display element generates the display image by modulating the intensity of transmitted light based on the control signal from the control circuit (not shown here) constituting an electronic device together with the LED element 201 which is a solid light source. At this time, since the image light to be generated has a narrow diffusion angle and includes only a specific polarization component, a novel and non-conventional image display apparatus that is close to a surface-emitting laser image source driven by an image signal can be obtained. At present, a laser light flux having the same size as the image obtained by the above-mentioned image display apparatus 48 cannot be obtained by using the laser apparatus also from the viewpoint of technology and safety. Therefore, in this embodiment, for example, the light close to the above-mentioned surface-emitting laser image light is obtained from a light flux from a general light source provided with an LED element.

<Example of Light Source Apparatus of Image Display Apparatus>

Subsequently, the configuration of the optical system housed in the case of the light source apparatus 101 will be described in detail below with reference to FIG. 4 together with FIG. 3 described above.

Figure 4:
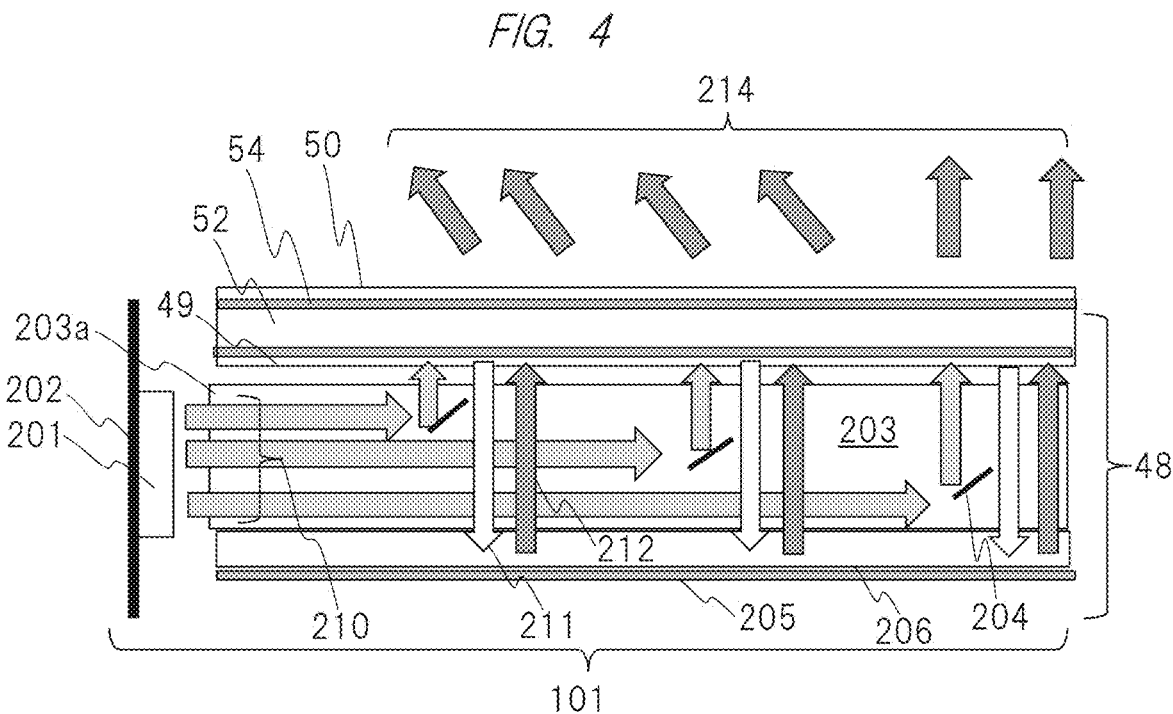
FIG. 4 is a cross-sectional layout view for describing a configuration example and operation of the light source to perform the polarization conversion in the image projection apparatus.

Since FIG. 3 and FIG. 4 are cross-sectional views, only one LED element 201 constituting the light source is shown, and these are converted to substantially collimated light by the shape of a light receiving end surface 203a of the light guide body 203 as described above. Therefore, the light receiving portion on the end surface of the light guide body and the LED element are attached so as to keep a predetermined positional relationship. Each of the light guide bodies 203 is made of a translucent resin such as acrylic resin. Also, the LED light receiving surface at the end of the light guide body has a conical convex outer peripheral surface obtained by, for example, rotating a paraboloid cross section, has at the top thereof a concave portion in which a convex portion (that is, a convex lens surface) is formed at the center thereof, and has a convex lens surface projecting outward (or a concave lens surface recessed inward) in the central portion of the flat surface portion thereof (not shown). The outer shape of the light receiving portion of the light guide body to which the LED element 201 is attached has a parabolic shape forming a conical outer peripheral surface, and it is set within an angular range capable of totally reflecting the light emitted in the peripheral direction from the LED element therein or has a reflection surface formed thereon.

On the other hand, the LED element 201 is arranged at a predetermined position on the surface of the LED board 202 which is the circuit board thereof. The LED board 202 is arranged and fixed with respect to the LED collimator (light receiving end surface 203a) such that the LED element 201 on the surface thereof is located at the central portion of the concave portion described above.

With the configuration described above, the light emitted from the LED element 201 can be taken out as substantially parallel light by the shape of the light receiving end surface 203a of the light guide body 203 described above, and the utilization efficiency of the generated light can be improved.

As described above, the light source apparatus 101 is configured by attaching the light source unit, in which a plurality of LED elements 201 as a light source is arranged, on the light receiving end surface 203a serving as a light receiving portion provided on the end surface of the light guide body 203. The divergent light flux from the LED element 201 is converted to substantially parallel light by the lens shape of the light receiving end surface 203a on the end surface of the light guide body, is guided inside the light guide body 203 as indicated by arrows (horizontal direction in the drawing), and is then emitted to the liquid crystal display panel 52 arranged approximately parallel to the light guide body (vertical direction in the drawing) by a light flux direction changing unit 204. By optimizing the distribution (density) of the light flux direction changing unit 204 by the internal shape or the surface shape of the light guide body, the uniformity of the light flux incident on the liquid crystal display panel 52 can be controlled. The above-mentioned light flux direction changing unit 204 emits the light flux that has propagated in the light guide body to the liquid crystal display panel 52 (in the vertical direction from the drawing) arranged substantially parallel to the light guide body by providing a portion having a different refractive index on the surface of the light guide body or inside the light guide body. At this time, there is no practical problem if the relative luminance ratio when the luminance of the center of the screen and the luminance of the peripheral portion of the screen are compared in the state where the liquid crystal display panel 52 faces straight the center of the screen and the viewpoint is placed at the same position as the diagonal dimensions of the screen is 20% or more, and the characteristics will be even better if it exceeds 30%.

FIG. 3 is a cross-sectional layout view for describing the configuration and function of the light source of the present embodiment to perform the polarization conversion in the light source apparatus 101 including the light guide body 203 and the LED element 201 described above. In FIG. 3, the light source apparatus 101 includes the light guide body 203 having the light flux direction changing unit 204 provided on its surface made of plastic or the like or in its inside, the LED element 201 as a light source, a reflection sheet 205, a retardation plate 206, a lenticular lens 800, and the like, and the liquid crystal display panel 52 having polarization plates provided on a light source light incident surface and an image light emission surface is attached on its upper surface as the image projection apparatus 48.

Further, a film or sheet-shaped reflective polarization plate 49 is provided on the light source light incident surface (lower surface in the drawing) of the liquid crystal display panel 52 corresponding to the light source apparatus 101, by which one polarized wave (for example, P wave) 212 of the natural light flux 210 emitted from the LED light source 201 is selectively reflected, and the reflected light is reflected by the reflection sheet 205 provided on one surface (lower part of the drawing) of the light guide body 203 and is directed again toward the liquid crystal display panel 52. Then, by providing a retardation plate ($\lambda$/4 plate) between the reflection sheet 205 and the light guide body 203 or between the light guide body 203 and the reflective polarization plate 49, the light is reflected by the reflection sheet 205 and is transmitted twice to convert the reflection light flux from P-polarized light to S-polarized light, so that the utilization efficiency of the light source light as the image light is improved. Since the image light flux whose light intensity is modulated by the image signal in the liquid crystal display panel 52 (arrows 213 in FIG. 3) is incident on the window glass 220 at a large incident angle as shown in FIG. 1, the reflectance at the transparent sheet 51 is increased, and favorable diffusion characteristics for monitoring inside or outside the store (space) can be obtained.

FIG. 4 is a cross-sectional layout view for describing the configuration and function of the light source of the present embodiment to perform the polarization conversion in the light source apparatus 101 including the light guide body 203 and the LED 201 similarly to FIG. 3. The light source apparatus 101 also includes the light guide body 203 having the light flux direction changing unit 204 provided on its surface made of plastic or the like or in its inside, the LED element 201 as a light source, the reflection sheet 205, the retardation plate 206, the lenticular lens 800, and the like, and the liquid crystal display panel 52 having polarization plates provided on a light source light incident surface and an image light emission surface is attached on its upper surface as the image projection apparatus 48.

Further, the film or sheet-shaped reflective polarization plate 49 is provided on the light source light incident surface (lower surface in the drawing) of the liquid crystal display panel 52 corresponding to the light source apparatus 101, by which one polarized wave (for example, S wave) 211 of the natural light flux 210 emitted from the LED light source 201 is selectively reflected, and the reflected light is reflected by the reflection sheet 205 provided on one surface (lower part of the drawing) of the light guide body 203 and is directed again toward the liquid crystal display panel 52. By providing a retardation plate ($\lambda$/4 plate) between the reflection sheet 205 and the light guide body 203 or between the light guide body 203 and the reflective polarization plate 49, the light is reflected by the reflection sheet 205 and is transmitted twice to convert the reflection light flux from S-polarized light to P-polarized light, so that the utilization efficiency of the light source light as the image light is improved. Even when the image light flux whose light intensity is modulated by the image signal in the liquid crystal display panel 52 (arrows 214 in FIG. 4) is incident on the window glass 220 at a large incident angle as shown in FIG. 1, the reflection on the surface is reduced, and the image light can be efficiently diffused to the outside by the transparent sheet 51.

In the light source apparatus shown in FIG. 3 and FIG. 4 described above, in addition to the function of the polarization plates provided on the light incident surface and the emission surface of the corresponding liquid crystal display panel 52, since the one polarization component is reflected by the reflective polarization plate, the contrast ratio theoretically obtained is the product of the inverse of the cross transmittance of the reflective polarization plate and the inverse of the cross transmittance obtained by the two polarization plates attached to the liquid crystal display panel, and thus high contrast performance can be obtained. In fact, it was confirmed by experiments that the contrast performance of the display image obtained by the liquid crystal display panel was improved by 10 times or more. As a result, a high-quality image comparable to that of the self-luminous organic EL was obtained.

<Another Example of Image Display Apparatus>

Figure 5:
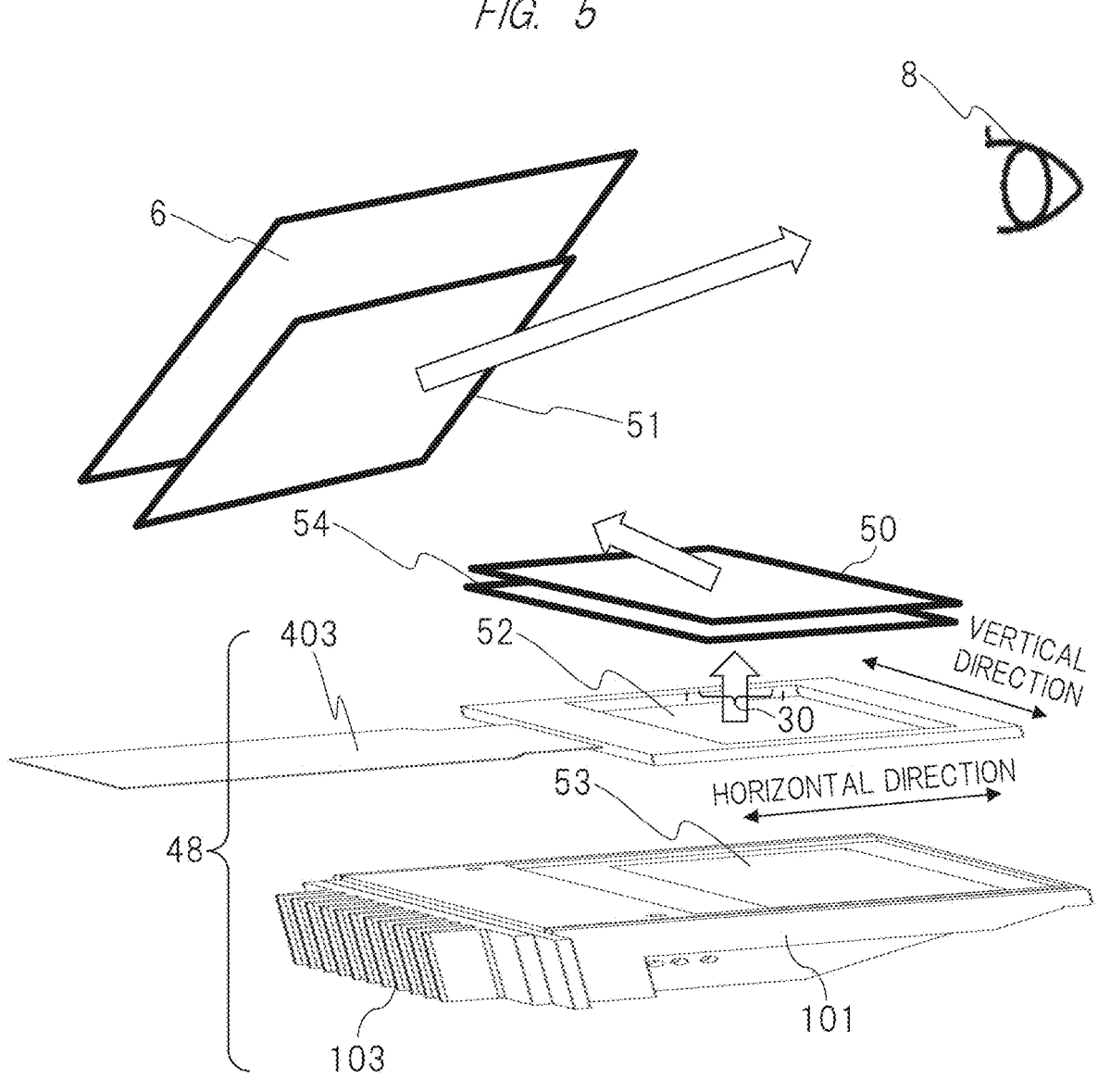
FIG. 5 is a layout view for describing a configuration example and operation of the image projection apparatus.
Figure 6:
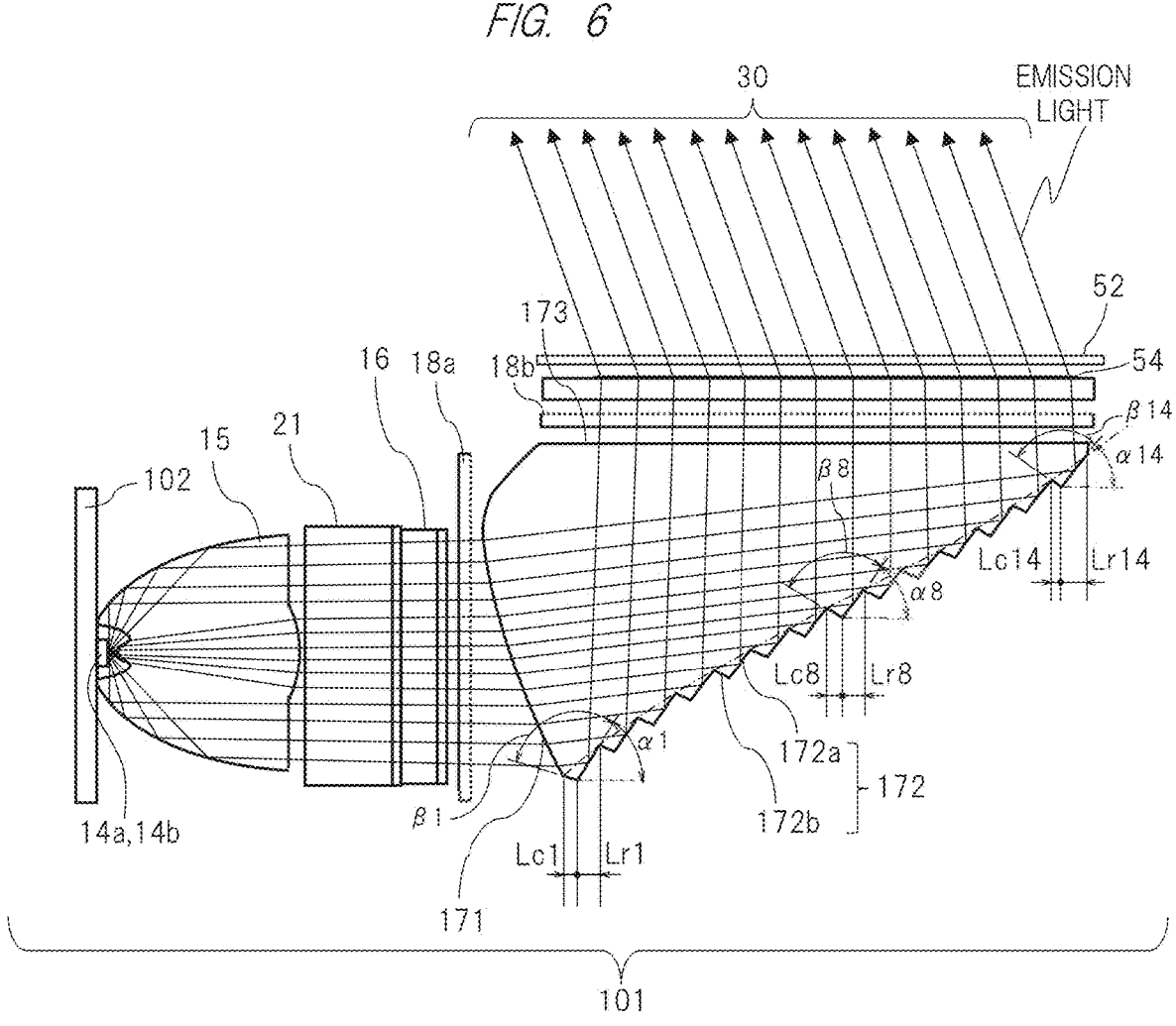
FIG. 6 is a cross-sectional layout view for describing a configuration example and operation of the light source to perform the polarization conversion in the image projection apparatus.

A specific configuration of the above-mentioned light source apparatus 101 is shown in FIG. 5, but FIG. 5 shows the light source apparatus 101 like that shown in FIG. 6. As shown in the drawing, in the light source apparatus 101, for example, an LED, a collimator, a synthetic diffusion block, and a light guide body which will be described in detail later are housed in its case made of plastic or the like (see FIG. 5), and the liquid crystal display panel 52 constituting the image projection apparatus 48 is attached to the upper surface thereof. Further, LED (Light Emitting Diode) elements 14a and 14b which are semiconductor light sources and an LED board 102 on which the control circuit thereof is mounted are attached to one side surface of the case of the light source apparatus 101, and a heat sink 103 which is a member for cooling the heat generated in the LED element and the control circuit is attached to on an outer surface of the LED board 102 (see FIG. 5).

On the other hand, a liquid crystal display panel frame is attached to the upper surface of the case of the light source apparatus 101, and the liquid crystal display panel 52 and an FPC (Flexible Printed Circuits) board 403 (see FIG. 5)

electrically connected to the panel are attached to the frame. Namely, though described later in detail, the liquid crystal display panel 52 which is a liquid crystal display element generates the display image by modulating the intensity of the transmitted light based on a control signal from a control circuit (not shown here) constituting an electronic device together with the LED elements 14a and 14b which are solid light sources.

<Example of Light Source Apparatus>

Next, the configuration of the optical system housed in the case of the light source apparatus 101 will be described in detail with reference to FIG. 7(a) and FIG. 7(b) in addition to FIG. 6 above.

Figure 7:
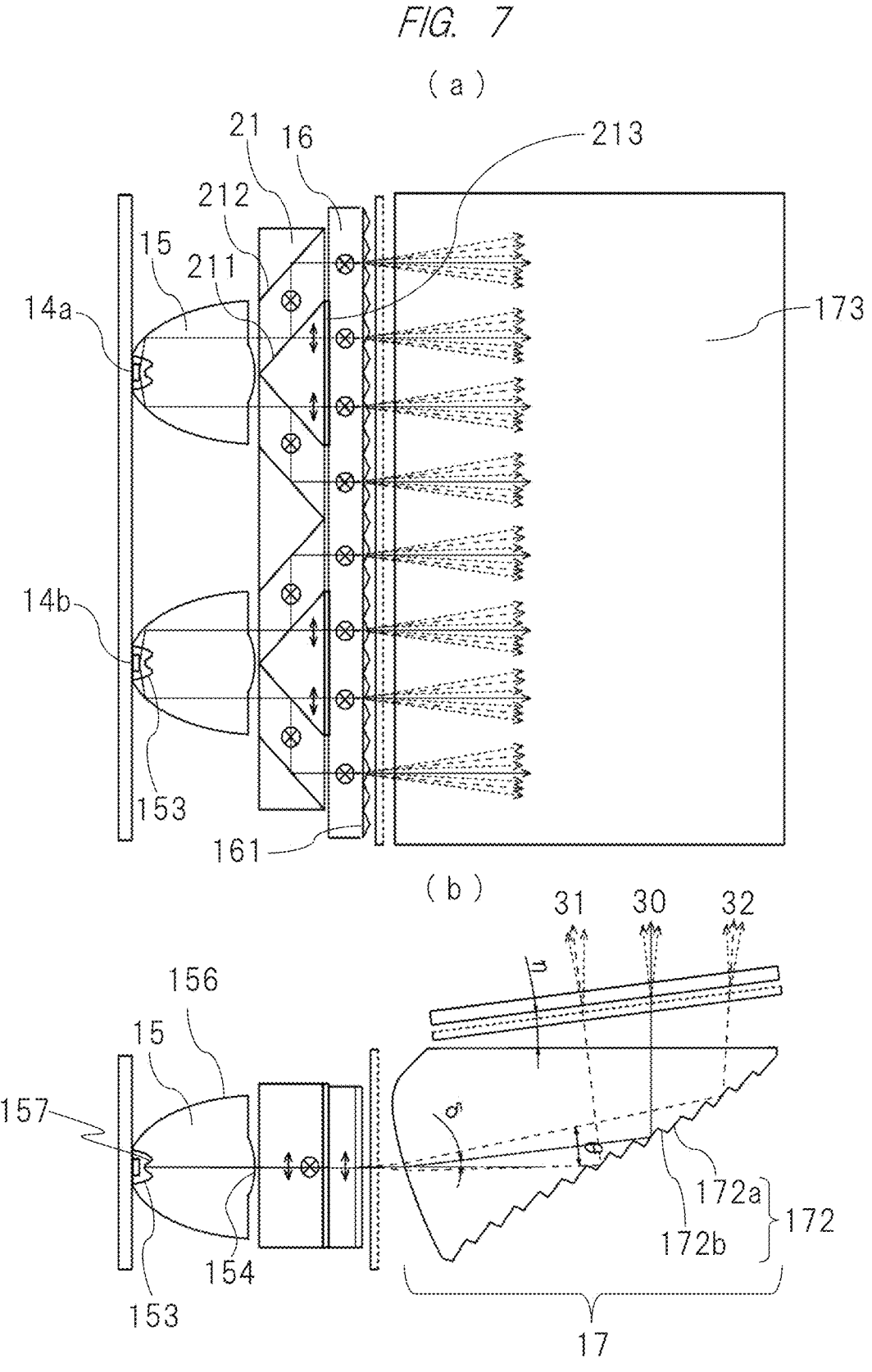
FIG. 7 is a top layout view for describing a configuration example and operation of the light source to perform the polarization conversion in the image projection apparatus.

FIG. 6 and FIG. 7 show LEDs 14a and 14b constituting the light source, and they are attached at predetermined positions with respect to the LED collimator 15. Note that each of the LED collimators 15 is formed of, for example, translucent resin such as acrylic resin. Also, as shown in FIG. 7(b), the LED collimator 15 has a conical convex outer peripheral surface 156 obtained by rotating a substantially parabolic cross section, and a concave portion 153 having a convex portion (that is, convex lens surface) 157 at its central portion is formed at the top of the LED collimator 15. In addition, a convex lens surface 154 protruding to outside (or a concave lens surface recessed to inside) is formed at a central portion of a flat portion of the LED collimator 15. Note that the parabolic surface 156 forming the conical outer peripheral surface of the LED collimator 15 is set within an angle range capable of totally reflecting the light emitted in the peripheral direction from the LED 14a therein or has a reflection surface formed thereon.

On the other hand, the LEDs 14a and 14b are each arranged at predetermined positions on the surface of the LED board 102 which is a circuit board thereof. The LED board 102 is fixed to the LED collimator 15 such that the LED 14a or 14b on the surface of the LED board 12 is arranged at the position of the central portion of the concave portion 153 of the LED collimator 15.

With the configuration described above, the light emitted from the central portion of the LED 14a or 14b in an upward direction (to the right in the drawing) is collected to be parallel light by the two convex lens surfaces 157 and 154 that form the outer shape of the LED collimator 15. Also, the light emitted from the other portion in the peripheral direction is reflected by the parabolic surface that forms the conical outer peripheral surface of the LED collimator 15 and is similarly collected to be parallel light. In other words, with the LED collimator 15 in which the convex lens is formed at the central portion thereof and the parabolic surface is formed in the peripheral portion thereof, almost all of the light generated from the LED 14a or 14b can be taken as the parallel light, and the utilization efficiency of the generated light can be improved.

Note that, on a light emission side of the LED collimator 15, a polarization conversion element 21 to be described later in detail is provided. As is clear from the drawing, the polarization conversion element 21 is configured by combining a plurality of translucent members having a columnar shape whose cross section is parallelogramic (hereinafter, parallelogram column) and a plurality of translucent members having a columnar shape whose cross section is triangular (hereinafter, triangular column) so as to be arranged in an array in parallel to the surface perpendicular to the light axis of the parallel light from the LED collimator 15. Further, at the interfaces between the adjacent translucent members arranged in an array, a polarizing beam splitter (hereinafter, abbreviated as "PBS") film 211 and a reflection film 212 are alternately provided, and a λ/2 phase plate 213 is provided on an emission surface from which the light which has been incident on the polarization conversion element 21 and has passed through the PBS film 211 is emitted.

A combined diffusion block 16 having a rectangular shape shown in FIG. 7(a) is further provided on the emission surface of the polarization conversion element 21. Namely, after the light emitted from the LED 14a or 14b becomes the parallel light by the function of the LED collimator 15 and is incident on the combined diffusion block 16, the light is diffused by texture 161 on an emission side and then reaches a light guide body 17 described later.

The light guide body 17 is a member made of translucent resin such as acrylic resin and formed into a rod shape whose cross section is substantially triangular (see FIG. 7(b)), and includes a light guide body incident portion (surface) 171 facing the emission surface of the combined diffusion block 16 with a first diffusion plate 18a interposed therebetween, a light guide body reflection portion (surface) 172 forming a sloped surface, and a light guide body emission portion (surface) 173 facing the liquid crystal display panel 52 of the liquid crystal display element with a second diffusion plate 18b interposed therebetween as can be seen from FIG. 6.

On the light guide body reflection portion (surface) 172 of the light guide body 17, as shown in FIG. 7 which is a partially enlarged view thereof, a large number of reflection surfaces 172a and connection surfaces 172b are alternately formed in a sawtooth shape. Also, the reflection surface 172a (line segment rising to the right in the drawing) forms $\alpha$n (n: natural number of 1 to 130 in this example) with respect to the horizontal plane indicated by a dash-dotted line in the drawing, and the $\alpha$n is set to, for example, 43 degrees or less (but 0 degrees or more) in this case.

The light guide body incident portion (surface) 171 is formed to have a curved convex shape inclined toward the light source side. Accordingly, the parallel light from the emission surface of the combined diffusion block 16 is incident after being diffused through the first diffusion plate 18a, and reaches the light guide body reflection portion (surface) 172 while being slightly bent (deflected) upward by the light guide body incident portion (surface) 171 as can be seen from the drawing. Then, the light is reflected here and reaches the liquid crystal panel 52 provided on the emission surface on the upper side of the drawing.

As described above in detail, with the image projection apparatus 48 described above, the light utilization efficiency and the uniform illumination characteristics can be further improved, and at the same time, the apparatus which is reduced in size can be manufactured at low cost with the inclusion of the modularized light source apparatus of the S-polarized light. In the description above, the case in which the polarization conversion element 21 is attached following the LED collimator 15 has been described, but the present invention is not limited to this, and it is obvious for a person having ordinary skill in the art that the same function and effect can be obtained by providing the polarization conversion element 21 in the light path to the liquid crystal display panel.

Note that a large number of reflection surfaces 172a and connection surfaces 172b are alternately formed in a sawtooth shape on the light guide body reflection portion (surface) 172, and the illumination light flux is totally reflected upward by each of the reflection surfaces 172a. Further, by providing a narrow-angle diffusion plate on the light guide body emission portion (surface) 173, the substantially parallel diffusion light flux is incident on the light direction changing panel 54 that controls the directional characteristics and is then incident on the liquid crystal display panel 52 from an oblique direction. In this example, the case in which the light direction changing panel 54 is provided between the light guide body emission surface 173 and the liquid crystal display panel 52 has been described, but it is needless to say that the same effect can be obtained even when the light direction changing panel 54 is provided on the emission surface of the liquid crystal display panel 52.

<Another Example of Light Source Apparatus>

Figure 8:
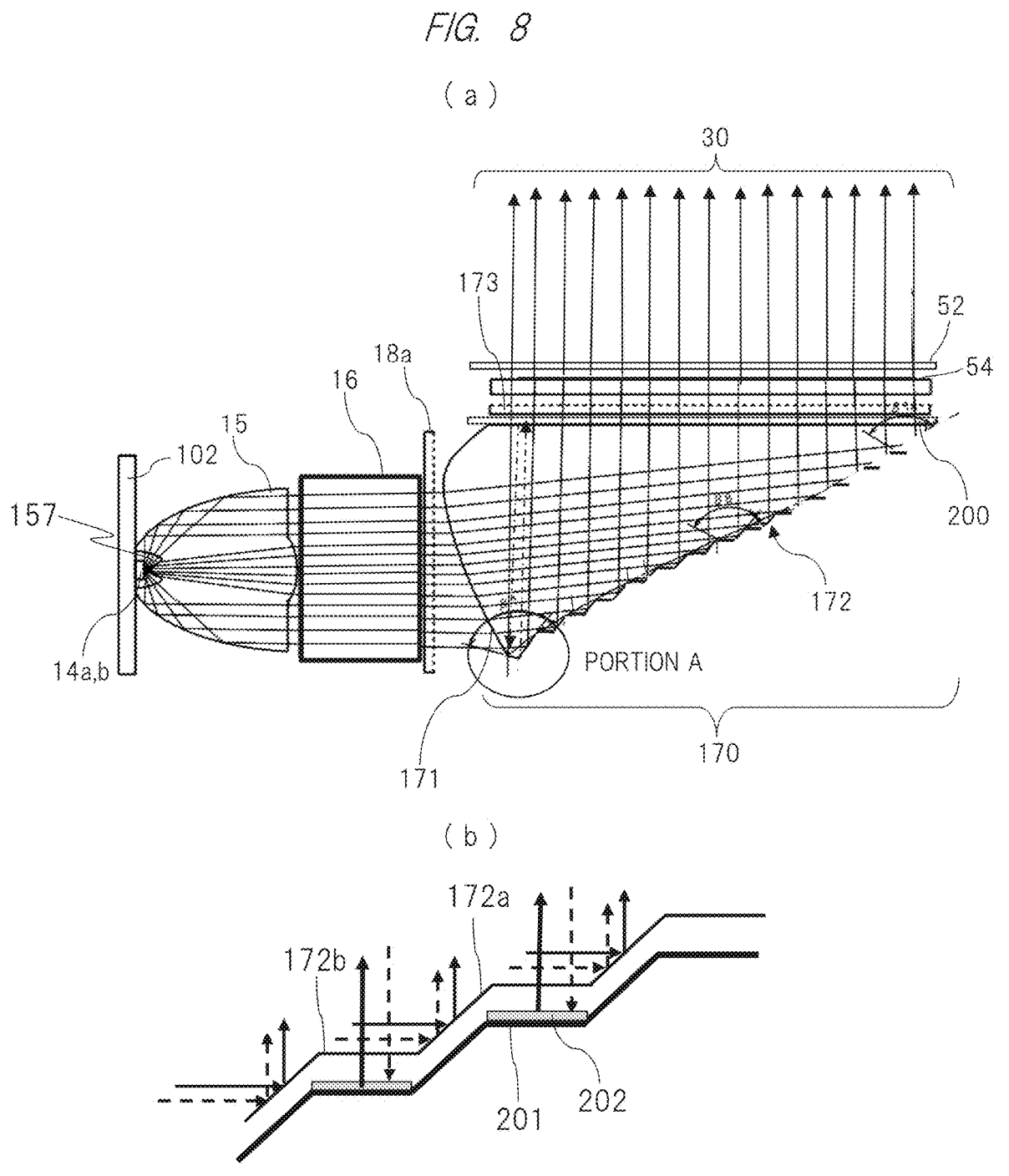

Another example of the light source apparatus is shown in FIG. 8. FIG. 8 shows a plurality of (two in this example) LEDs 14a and 14b constituting the light source, and they are attached at predetermined positions with respect to the LED collimator 15. Note that each of the LED collimators 15 is formed of, for example, translucent resin such as acrylic resin. Also, the LED collimator has a conical convex outer peripheral surface 156 obtained by rotating a substantially parabolic cross section, and a concave portion 153 having a convex portion (that is, convex lens surface) 157 at its central portion is formed at the top of the LED collimator 15. In addition, a convex lens surface 154 protruding to outside (or a concave lens surface recessed to inside) is formed at a central portion of a flat portion of the LED collimator 15. Note that the parabolic surface 156 forming the conical outer peripheral surface of the LED collimator 15 is set within an angle range capable of totally reflecting the light emitted in the peripheral direction from the LED 14a therein or has a reflection surface formed thereon.

On the other hand, the LEDs 14a and 14b are each arranged at predetermined positions on the surface of the LED board 102 which is a circuit board thereof. The LED board 102 is fixed to the LED collimator 15 such that the LED 14a or 14b on the surface of the LED board 12 is arranged at the position of the central portion of the concave portion 153 of the LED collimator 15.

With the configuration described above, the light emitted from the central portion of the LED 14a or 14b in an upward direction (to the right in the drawing) is collected to be parallel light by the two convex lens surfaces 157 and 154 that form the outer shape of the LED collimator 15. Also, the light emitted from the other portion in the peripheral direction is reflected by the parabolic surface that forms the conical outer peripheral surface of the LED collimator 15 and is similarly collected to be parallel light. In other words, with the LED collimator 15 in which the convex lens is formed at the central portion thereof and the parabolic surface is formed in the peripheral portion thereof, almost all of the light generated from the LED 14a or 14b can be taken as the parallel light, and the utilization efficiency of the generated light can be improved.

Note that a light guide body 170 is provided on the light emission side of the LED collimator 15 via the first diffusion plate 18a. The light guide body 170 is a member made of translucent resin such as acrylic resin and formed into a rod shape whose cross section is substantially triangular, and includes a light incident portion 171 of the light guide body 170 facing the emission surface of the diffusion block 16 with the first diffusion plate 18a interposed therebetween, a light guide body reflection portion (surface) 172 forming a sloped surface, and a light guide body emission portion (surface) 173 facing the liquid crystal display panel 52 of the liquid crystal display element with a reflective polarization plate 200 interposed therebetween as can be seen from FIG. 8(a).

For example, if a reflective polarization plate 200 having a property of reflecting P-polarized light (transmitting S-polarized light) is selected, the reflective polarization plate 200 reflects the P-polarized light of the natural light emitted from the LED serving as a light source, and the reflected P-polarized light passes through a λ/4 plate 202 provided on the light guide body reflection portion 172 shown in FIG. 8(b), is reflected by a reflection surface 201, and passes through the λ/4 plate 202 again, so that the P-polarized light is converted into the S-polarized light and all of the light flux incident on the liquid crystal display panel 52 uniformly becomes the S-polarized light.

Similarly, if the reflective polarization plate 200 having a property of reflecting S-polarized light (transmitting P-polarized light) is selected, the reflective polarization plate 200 reflects the S-polarized light of the natural light emitted from the LED serving as a light source, and the reflected S-polarized light passes through the λ/4 plate 202 provided on the light guide body reflection portion 172 shown in FIG. 8(b), is reflected by the reflection surface 201, and passes through the λ/4 plate 202 again, so that the S-polarized light is converted into the P-polarized light and all of the light flux incident on the liquid crystal display panel 52 uniformly becomes the P-polarized light. The polarization conversion can be similarly realized with the above-described configuration.

<Lenticular Lens>

Figure 9:
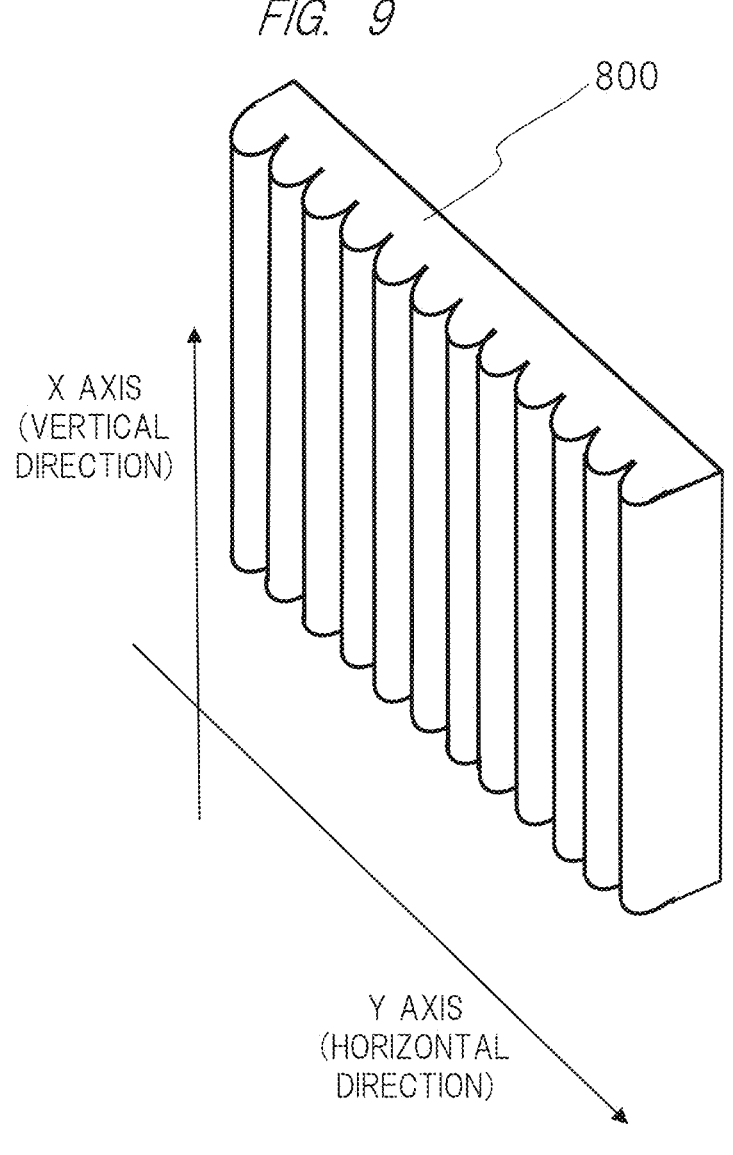
FIG. 9 is a diagram showing an example of a configuration of a lenticular lens constituting the image projection apparatus of the information display system.

In order to control the diffusion distribution of the image light from the liquid crystal display panel 52, the unidirectional emission characteristics (image light in the x-axis direction in the drawing) can be controlled by optimizing the lens shape by providing the lenticular lens 800 shown in FIG. 9 between the above-mentioned light source apparatus 101 and the liquid crystal display panel 52 or on the surface of the liquid crystal panel 52. Further, by arranging the microlens array in a matrix shape, the emission characteristics of the image light flux from the image projection apparatus 48 can be controlled in the x-axis direction and the y-axis direction, and as a result, an image display apparatus having desired diffusion characteristics can be obtained.

Here, the function of the lenticular lens 800 shown in FIG. 9 will be described. The lenticular lens 800 makes it possible to efficiently reflect or diffuse the light emitted from the image display apparatus 48 described above on the transparent sheet 51 on the window glass 220 by optimizing the lens shape. Namely, for example, as shown in FIG. 10(a) and FIG. 10(b), by arranging two lenticular lenses in combination or microlens array in a matrix shape with respect to the image light from the image projection apparatus 48 and providing a sheet for controlling diffusion characteristics, the luminance (relative luminance) of the image light can be controlled in accordance with its reflection angle (0 degrees in the vertical direction) in the X-axis direction and the Y-axis direction. In this embodiment, by the lenticular lens 800 mentioned above, the luminance characteristics in the vertical direction are made steeper as shown in FIG. 10(b) and further the light luminance (relative luminance) by the reflection and diffusion is increased by changing the balance of the directional characteristics in the vertical direction (positive and negative directions of the Y-axis) as compared with the conventional case, whereby the image light having a narrow diffusion angle (high straightness) and including only a specific polarization component like the image light from the surface-emitting laser image source is obtained, and is efficiently delivered to the eyes of the observer.

Figure 10:
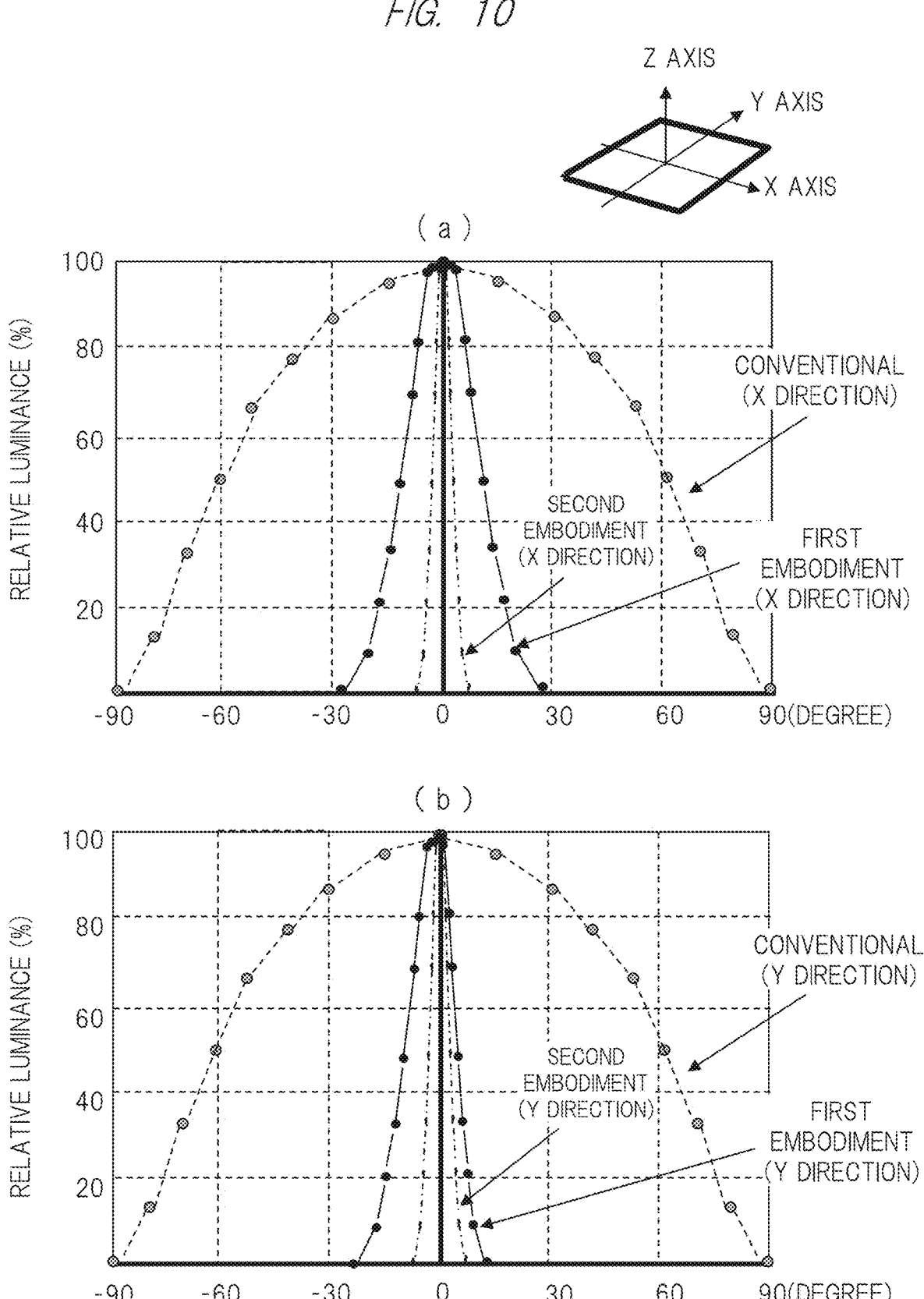
FIG. 10 is a diagram including graphs showing image light diffusion characteristics of the image display apparatus.

Also, by achieving the directional characteristics having significantly narrower angle in both the X-axis direction and the Y-axis direction shown as the first embodiment and the second embodiment by the above-mentioned light source apparatus, as compared with the diffusion characteristics of the emission light from the general liquid crystal panel (referred to as conventional in the drawing) shown in FIG. 10(*a*) and FIG. 10(*b*), the image display apparatus capable of emitting light of a specific polarization which emits an image light flux almost parallel to a specific direction can be realized.

Figure 11:
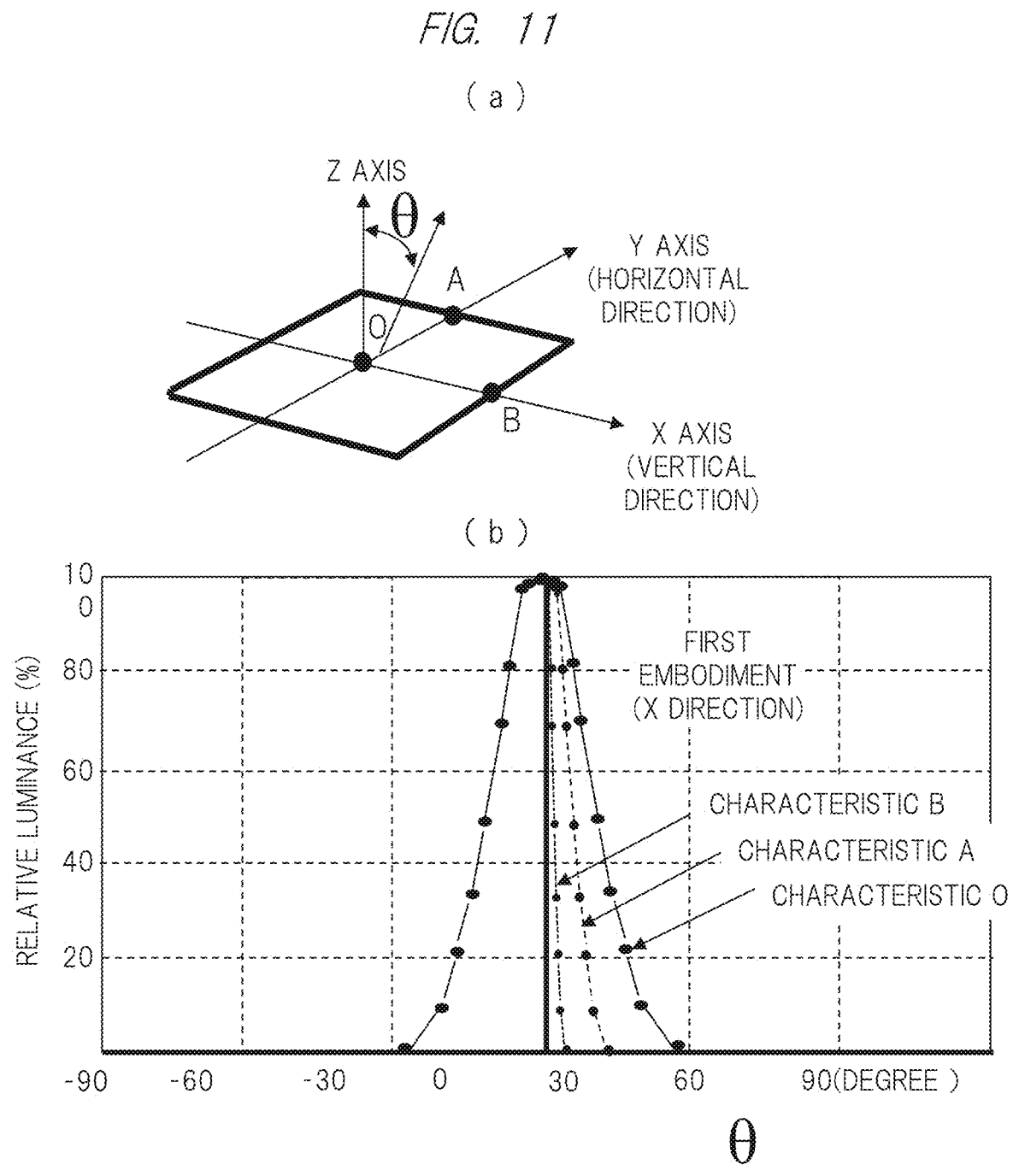

FIG. 11 shows an example of the characteristics of the lenticular lens used in this embodiment. In this example, in particular, the characteristics in the X direction (vertical direction) are shown, and a characteristic O shows a luminance characteristic in which the peak in the light emission direction is at an angle of about 30 degrees upward from the vertical direction (0 degrees) and is vertically symmetrical. Also, characteristics A and B in the drawing further show examples of the characteristics in which the image light above the peak luminance is condensed at about 30 degrees to increase the luminance (relative luminance). Therefore, in these characteristics A and B, the luminance (relative luminance) of light is sharply reduced at the angle exceeding 30 degrees as compared with the characteristic O.

Namely, with the above-mentioned optical system including the lenticular lens, the image light from the image projection apparatus 48 can be reflected or diffused while increasing (emphasizing) the luminance thereof in a specific direction via the transparent sheet 51 on the window glass 220. Consequently, the image light from the image projection apparatus 48 can be efficiently delivered to the eyes of the observer inside or outside the room as the light having a narrow diffusion angle (high straightness) and including only a specific polarization component like the image light from the surface-emitting laser image source. According to this, even if the intensity (luminance) of the image light from the image projection apparatus 48 is reduced, the observer can accurately recognize the image light and obtain information. In other words, it is possible to realize the information display system with lower power consumption by further reducing the output of the image projection apparatus 48.

<Light Direction Changing Panel>

Figure 12:
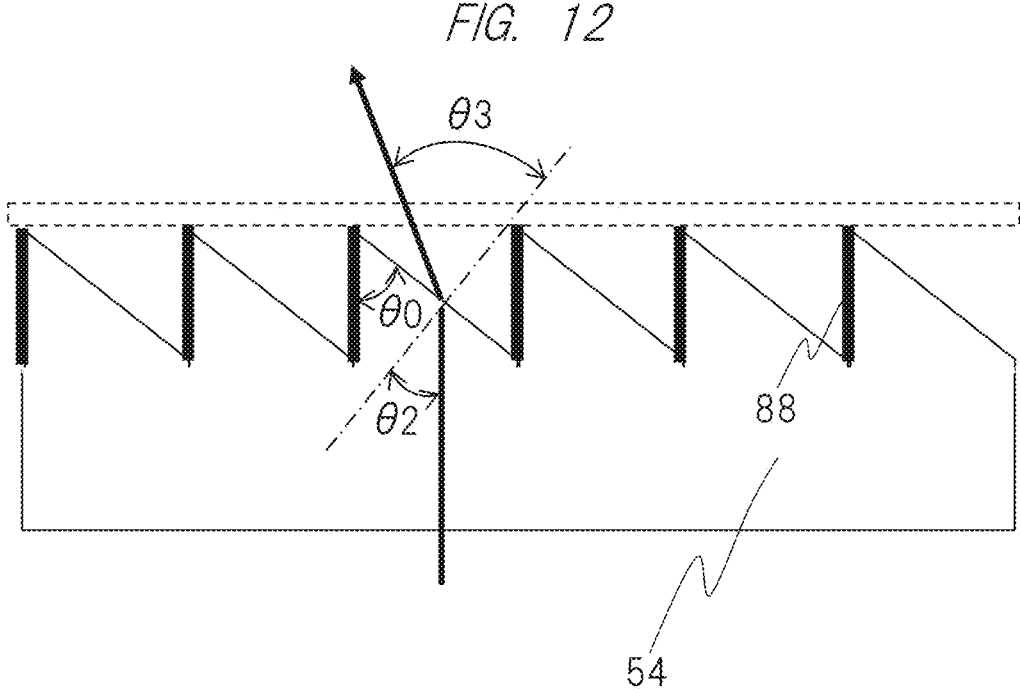
FIG. 12 is a cross-sectional view for describing the principle of a light direction changing panel constituting the image projection apparatus of the information display system.

FIG. 12 is a schematic explanatory diagram for describing the principle of the light direction changing panel 54 constituting a part of the information display system of the present embodiment and provided on the upper surface of the image display apparatus 48 described above. The light flux from the light guide body 203 of the light source apparatus 101 described above is incident from the incident surface (lower surface in the drawing) of the light direction changing panel 54, and is refracted in a desired direction θ3 by the lens function of the linear Fresnel lens provided on the emission surface (upper surface in the drawing). At this time, the desired direction θ3 is uniquely derived from Snell's law by the incident angle θ2 of the light flux to the Fresnel lens, the Fresnel angle θ0 of the Fresnel lens, and the refractive index n of the base material. As a result, the directivity in a desired direction can be given to the substantially parallel light flux from the light guide body. Namely, the image light emitted from the liquid crystal display panel 52 constituting the image display apparatus 48, which has high straightness and includes only a specific polarization component, is directed to the transparent sheet 51 provided on the window glass 220 described later without being visually recognized by an observer inside or outside the store (space). Thereafter, the image light is unidirectionally reflected and diffused by the transparent sheet 51, and the reflected image is visually recognized by the observer. Namely, by the light direction changing panel 54, the image light itself from the image display apparatus 48 (see FIG. 1) is not visually recognized directly from inside of the space and thus does not disturb the observer in the store, and only the reflected image of the reflected light will be monitored by the observer. By providing a light-absorbing paint or pigment on a connection surface 88 of the Fresnel lens, the generation of light other than the light flux traveling in a desired direction is suppressed. As a result, unnecessary light is not mixed with the image light reflected by the window glass 220, so that the imaging performance is not impaired.

<Protective Cover>

Figure 13:
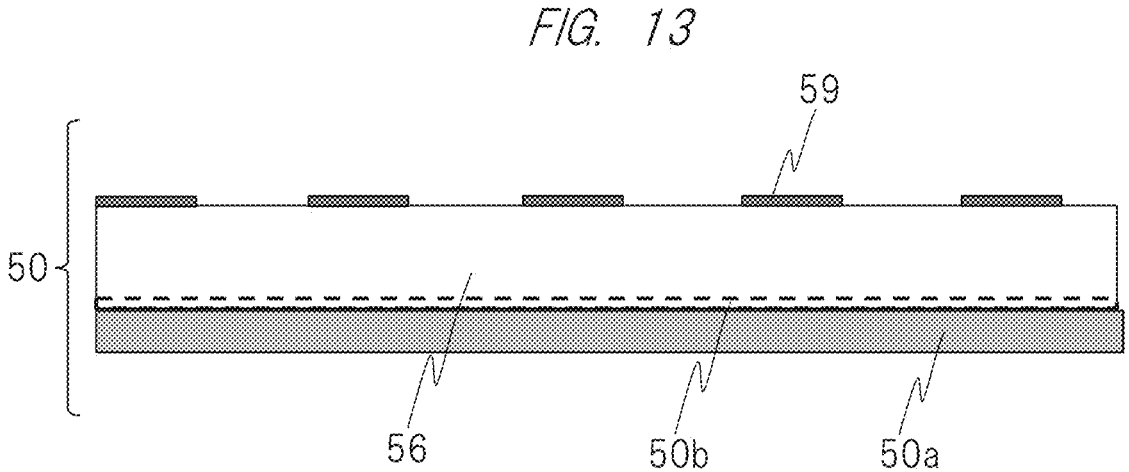
FIG. 13 is a cross-sectional view showing an example of a schematic configuration of a protective cover constituting the image projection apparatus of the information display system.

FIG. 13 is a cross-sectional view showing a schematic configuration of a protective cover 50 provided on the upper surface of the above-mentioned light direction changing panel 54. Black stripes 59 are provided on a part of the light emission side of a substantially transparent base material 56. In order to reduce the surface reflection of external light including sunlight, a black paint such as a paint containing carbon black is preferably used as the black stripe 59. Further, by providing an antireflection film for suppressing surface reflection on the portion where the black stripe is not provided, the external light reflection on the surface of the protective cover 50 is significantly reduced, and the hindrance due to the external light reflection is reduced. On the other hand, in order to enhance the light-shielding performance against sunlight, it is preferable to give a property of reflecting near-infrared light and infrared light to the antireflection film.

On the other hand, on the light incident side (lower side of the drawing) of the substantially transparent base material 56, a film 50*a* that absorbs or reflects the P wave component of the solar light flux is formed or adhered. As a result, since the P wave component of sunlight and the like do not enter the image projection apparatus 48, the reliability regarding light resistance and heat resistance is greatly improved. On the other hand, since it also has the characteristics of a filter that selectively transmits the S-polarized image light output from the image projection apparatus 48, the contrast performance of the obtained image is significantly improved.

Figure 14:
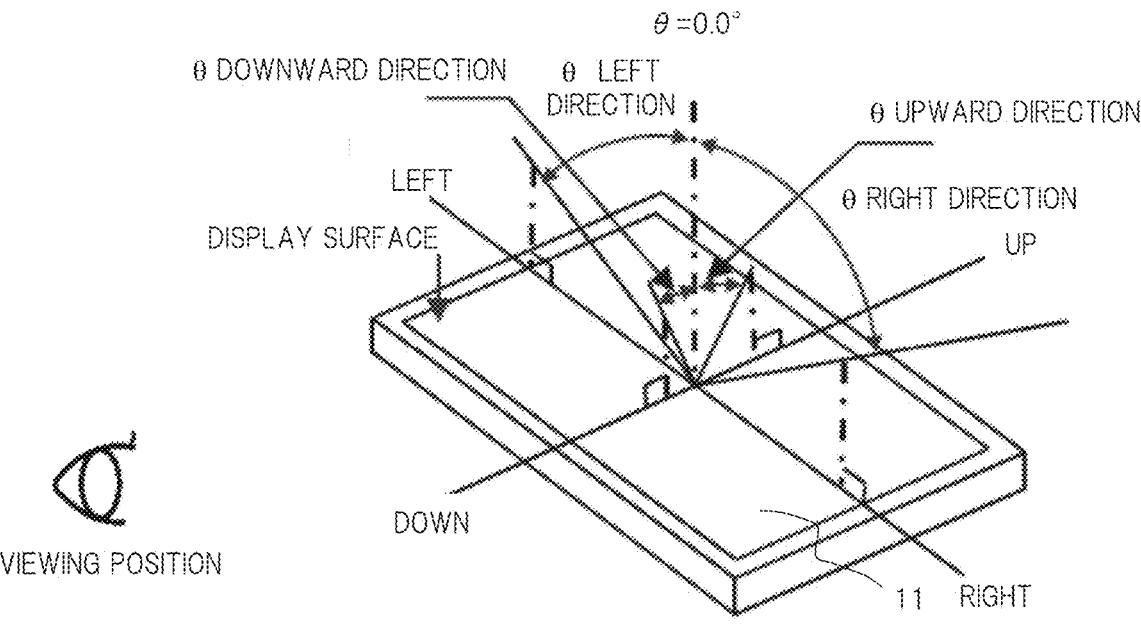
FIG. 14 is a diagram showing a coordinate system to measure visual characteristics of a liquid crystal panel.
Figure 15:
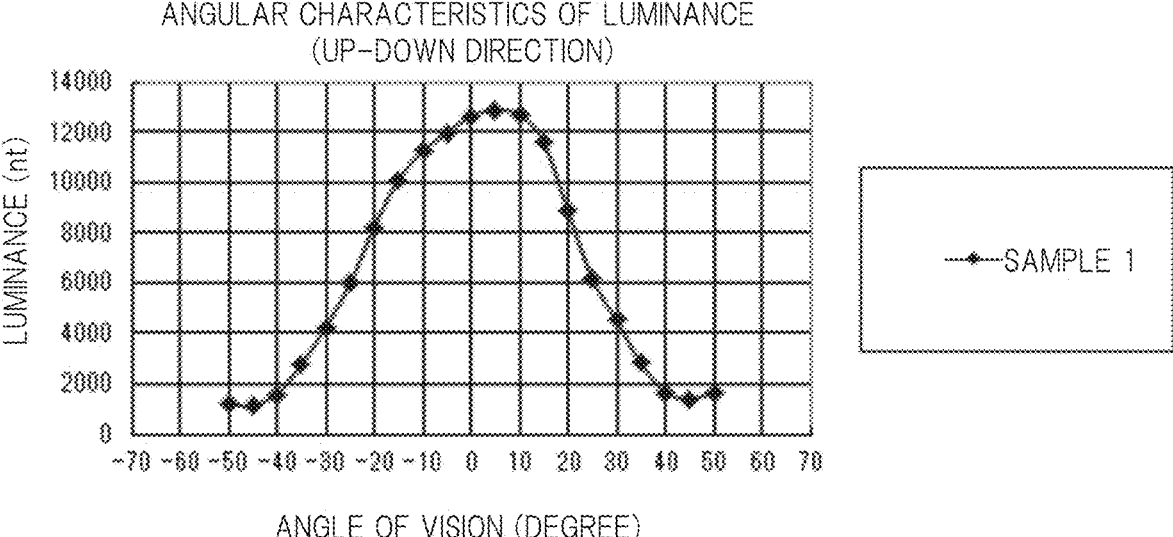
FIG. 15 is a diagram showing angular characteristics of luminance (up-down direction) in a general liquid crystal panel.

By the way, in a general TFT (Thin Film Transistor) liquid crystal panel, luminance and contrast performances differ depending on the light emission direction in accordance with the mutual characteristics of the liquid crystal and the polarization plate. In the evaluation under the measurement environment shown in FIG. 14, the characteristics of the luminance and the viewing angle in the up-down direction of the panel are excellent at the angle slightly deviated (+5 degrees in this embodiment) from the emission angle vertical to the panel surface (emission angle: 0 degrees) as shown in FIG. 15. This is because the characteristics of twisting light in the up-down direction of the liquid crystal do not become 0 degrees when the applied voltage is maximum.

Figure 16:
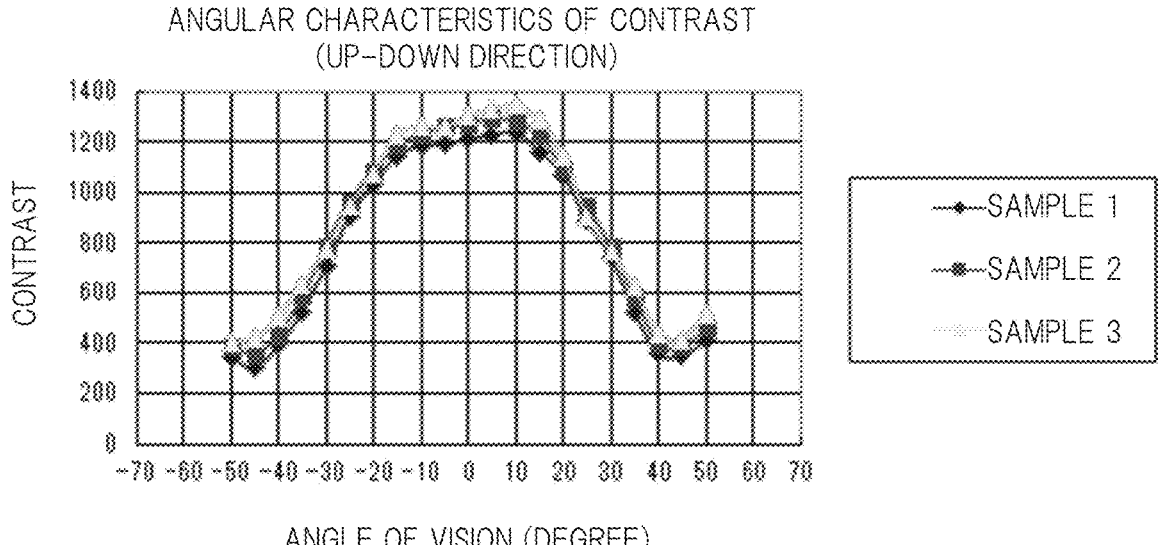
FIG. 16 is a diagram showing angular characteristics of contrast (up-down direction) in a general liquid crystal panel.

On the other hand, as shown in FIG. 16, the contrast performance in the up-down direction is excellent in the range of −15 degrees to +15 degrees, and the use in the range of ±10 degrees centered on 5 degrees can obtain the best characteristics when combined with the luminance characteristics.

Figure 17:
FIG. 17 is a diagram showing angular characteristics of luminance (left-right direction) in a general liquid crystal panel.
Figure 17:
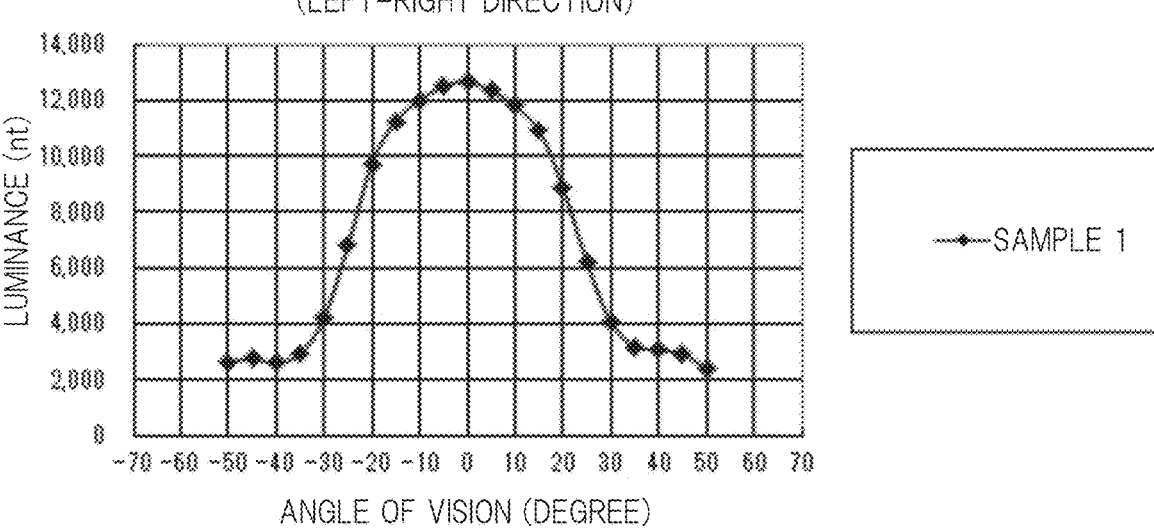

Also, as shown in FIG. 17, the characteristics of the luminance and the viewing angle in the left-right direction of the panel are excellent at the emission angle vertical to the panel surface (emission angle: 0 degrees). This is because the characteristics of twisting light in the left-right direction of the liquid crystal become 0 degrees when the applied voltage is maximum.

Figure 18:
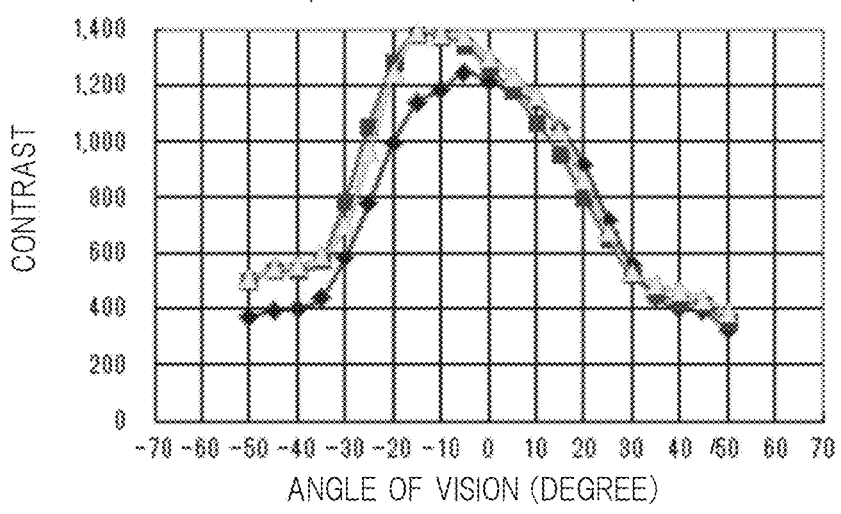
FIG. 18 is a diagram showing angular characteristics of contrast (left-right direction) in a general liquid crystal panel.
Figure 18:
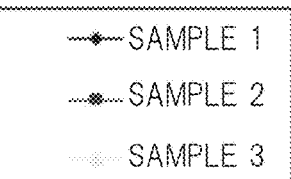

Similarly, as shown in FIG. 18, the contrast performance in the left-right direction is excellent in the range of −5 degrees to −10 degrees, and the use in the range of ±5 degrees centered on −5 degrees can obtain the best characteristics when combined with the luminance characteristics. Therefore, by making the light enter the liquid crystal panel from the direction in which the most excellent characteristics can be obtained by the light flux direction changing unit 204 provided in the light guide body 203 of the light source apparatus 101 described above and performing the light modulation by the image signal, the image quality and performance of the image display apparatus 48 can be improved.

In order to bend the image light from the liquid crystal panel as the image display element in a desired direction, it is preferable to provide the light direction changing panel 54 on the emission surface of the liquid crystal panel.

<Image Light Control Film>

Figure 19:
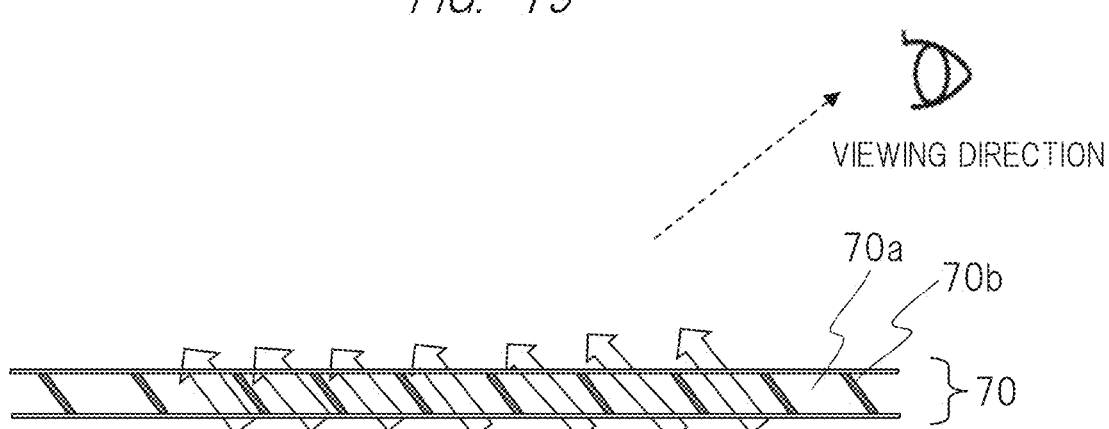
FIG. 19 is a cross-sectional view showing an example of an image light control film.

FIG. 19 is a cross-sectional view of an image light control film 70 having a function of restricting the emission direction of the image light. The image light control film 70 is provided on, for example, the upper surface of the image display apparatus 48 and emits the image light from the liquid crystal display panel 52 in a specific direction (in the direction of the white arrow in FIG. 19). Also, since a black portion 70b of the image light control film 70 blocks a part of the light, the light does not directly enter the observer's eyes, and it is thus possible to prevent the hindrance due to the direct light from the image display apparatus 48 entering the observer's eyes. The image light control film 70 has a function of preventing the image light from being directly delivered to the observer, while the image light passes through a transparent portion 70a and is reflected by a windshield 6 or the like, and can be recognized by the driver who is the observer. As the image light control film 70, for example, a viewing angle control film (VCF: View Control Film) of Shin-Etsu Polymer Co., Ltd. is suitable, and since the structure thereof is such that transparent silicon and black silicon are alternately arranged and a synthetic resin is arranged on a light incident/emission surface to form a sandwich structure, the same effect as that of the image light control film 70 of the present embodiment can be expected. It is desirable that a pitch h of the transparent portion 70a and the black portion 70b of the viewing angle control film described above is ⅓ or less with respect to the pixels of the image to be displayed. At this time, when the viewing angle α is desired to be larger than 90 degrees, a thickness W should be set such that h/w becomes larger than 1.0, and when the viewing angle α is desired to be smaller than 90 degrees, the thickness W should be set such that h/w becomes smaller than 1.0. On the other hand, there is no practical problem if the haze (HAZE) defined by the ratio of the diffusion transmittance and the parallel light transmittance of the transparent sheet 51 is 10% or less, but it is preferably 4% or less.

<Unidirectional Transparent Sheet: First Example of Reflection Type>

Figure 20:
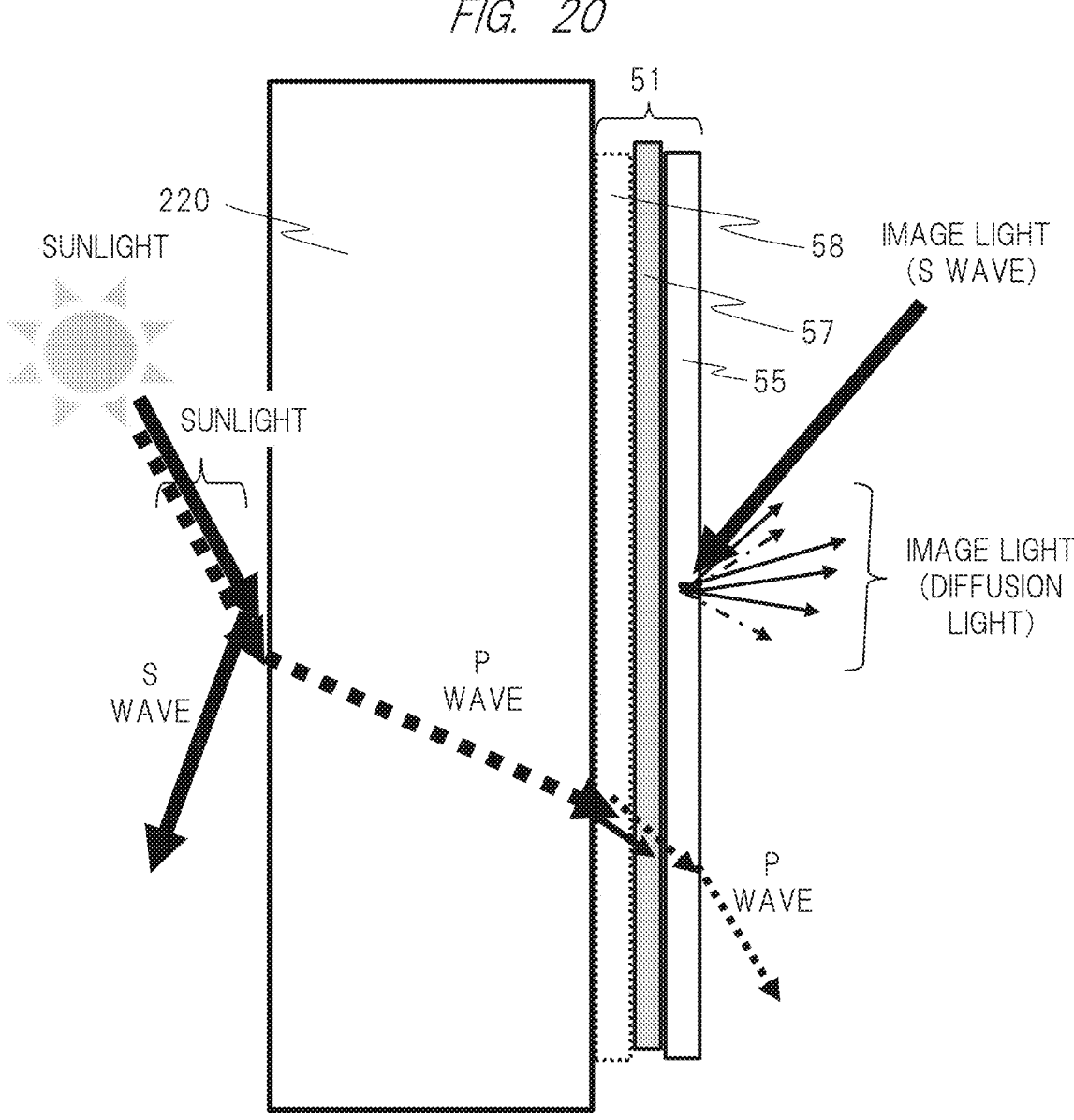
FIG. 20 is a cross-sectional view showing a configuration of a unidirectional transparent sheet (reflection type) (first example) constituting the image projection apparatus of the information display system.

Next, in the overall configuration of the information display system, in particular, the configuration and function of the transparent sheet 51 will be described with reference to FIG. 20. Here, the S-polarized light of the sunlight incident on the window glass 220 from an oblique direction is reflected, and the P-polarized light is transmitted and directed to the transparent sheet 51. The transparent sheet 51 is composed of a polarization plate 57 that transmits S waves, a transparent diffusion sheet material 55, and a retardation plate 58. For this transparent sheet 51, a film obtained by melting and stretching a thermoplastic polymer in which zirconium nanoparticles and diamond nanoparticles having a large refractive index are dispersed, for example, "KALEIDO SCREEN" manufactured by JXTG Energy Co., Ltd. can be used (see Patent Document 3 mentioned above). Consequently, the display which is transparent and does not prevent the observer from monitoring the scenery of the outside world (outside the store) when the image is not displayed and the display which diffuses and reflects the image light such that the observer inside or outside the store (space) can visually recognize the image information when the image is displayed, that is, the unidirectional display can be realized. At this time, there is no practical problem if the haze (HAZE) defined by the ratio of the diffusion transmittance and the parallel light transmittance of the transparent sheet 51 is 10% or less, but it is preferably 4% or less.

Since the image light from the image projection apparatus 48 is S-polarized light, it scatters inside the transparent diffusion sheet material 55 described above and is emitted toward the observer in a state where the reflectance in the oblique incidence is high. On the other hand, a part of the image light whose polarization direction is disturbed due to the scattering diffuses and transmits through the transparent diffusion sheet material 55, and is emitted toward the window glass 220. Since the difference in refractive index is small on the incident surface of the window glass 220, the level of the double image generated by the reflected light is low. On the other hand, since the reflected light generated on the emission surface (the surface in contact with the outside world) of the window glass 220 is mostly the S polarization component, the reflectance is large. Since the image light reflected on this surface passes through the polarization plate 57 again after reflection and is then absorbed, it does not return to the observer side. Therefore, since the light intensity of the double image generated by the reflected image of the window glass 220 can be significantly reduced, the image quality is greatly improved. Similarly, it goes without saying that the same effect can be obtained by attaching the above-mentioned transparent sheet 51 to the combiner instead of the window glass 220 as the image reflection surface.

With the transparent sheet 51 described above, the sunlight component of the P-polarized light that has passed through the window glass 220 (passed through also the combiner afterward in the combiner method) under predetermined conditions in the daytime is absorbed in front of the information display system and the light direction changing panel 54 and the protective cover 50 provided on the upper surface thereof, so that it is possible to prevent it from returning to the liquid crystal display panel and the polarization plate.

<Unidirectional Transparent Sheet: Second Example of Reflection Type>

Figure 21:
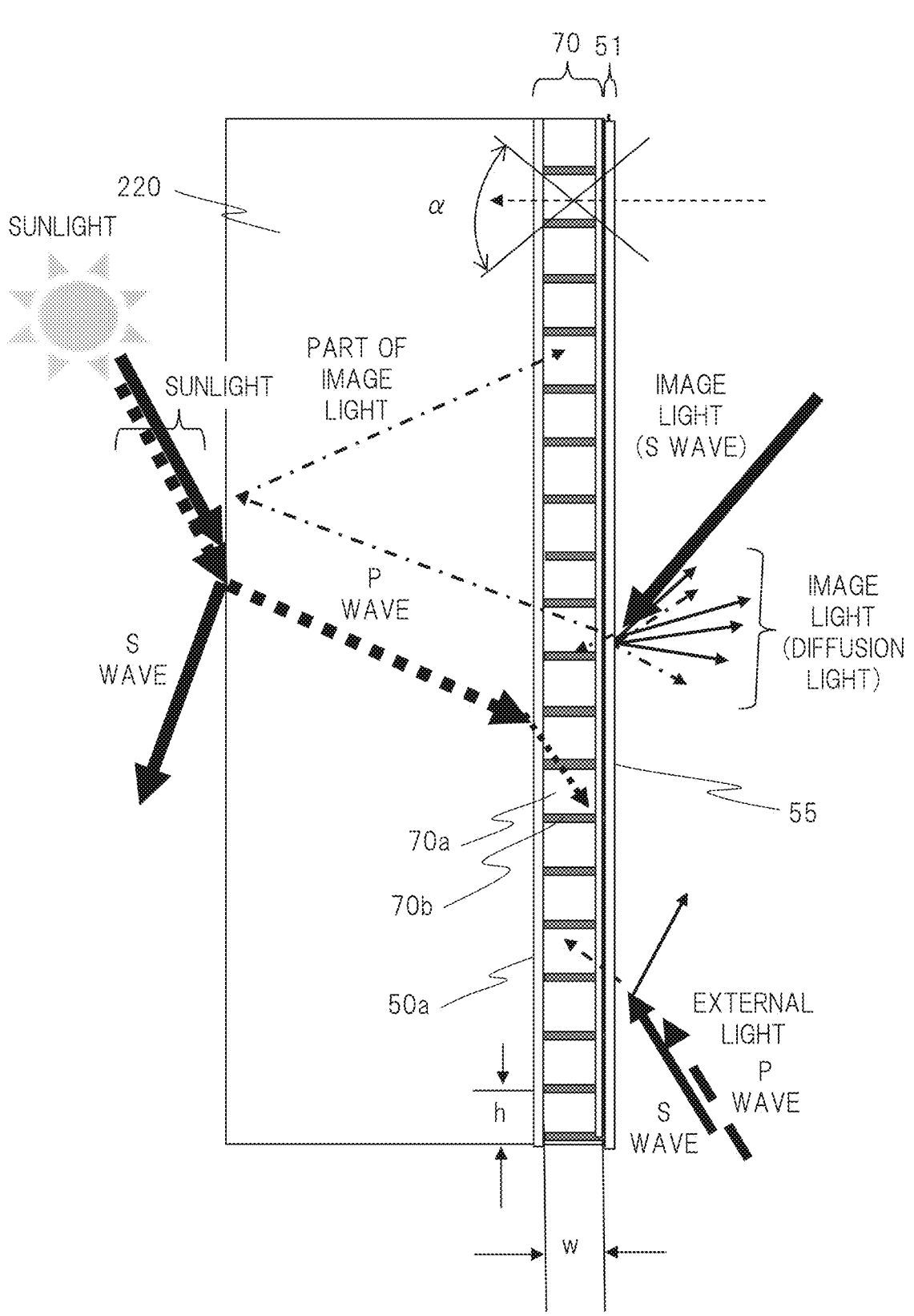
FIG. 21 is a cross-sectional view showing a configuration of a unidirectional transparent sheet (reflection type) (second example) constituting the image projection apparatus of the information display system.

Another example of the reflective unidirectional transparent sheet will be described with reference to FIG. 21. In this example, the image light control film 70 shown in FIG. 19 is further added on the transparent sheet 51 described above to form an external light control film (hereinafter, denoted by reference numeral 70).

As described above, the S-polarized light of sunlight incident on the window glass 220 from an oblique direction is reflected, and the P-polarized light thereof is transmitted and directed to the transparent sheet 51. At this time, it is absorbed by the black region 70$b$ (shown in gray in FIG. 21) provided in the external light control film 70, and does not reach the inside of the room or the vehicle in which the image display apparatus is arranged. Further, since it is not mixed with the image light from the image display apparatus 48, deterioration of the image quality is prevented. The transparent sheet 51 is made of the transparent diffusion sheet material 55. For this transparent sheet 51, a film obtained by melting and stretching a thermoplastic polymer in which zirconium nanoparticles and diamond nanoparticles having a large refractive index are dispersed, for example, "KALEIDO SCREEN" manufactured by JXTG Energy Co., Ltd. can be used (see Patent Document 3 mentioned above). Consequently, the display which is transparent and does not prevent the observer from monitoring the scenery of the outside world (outside the store) when the image is not displayed and the display which diffuses and reflects the image light such that the observer inside or outside the store (space) can visually recognize the image information when the image is displayed, that is, the unidirectional display can be realized.

Further, the above-mentioned external light control film 70 does not obstruct the monitoring of the scenery of the outside world because the light of the outside world passes through the transparent portion 70$a$ when the observer monitors the scenery of the outside world. As this external light control film 70, for example, a viewing angle control film (VCF) of Shin-Etsu Polymer Co., Ltd. is suitable, and since the structure thereof is such that transparent silicon and black silicon are alternately arranged and a synthetic resin is arranged on a light incident/emission surface to form a sandwich structure, the same effect as that of the external light control film of the present embodiment can be expected.

It is desirable that a pitch h of the transparent portion 70$a$ and the black portion 70$b$ of the viewing angle control film described above is ⅓ or less with respect to the pixels of the image to be displayed. At this time, when the viewing angle α is desired to be larger than 90 degrees, a thickness W should be set such that h/w becomes larger than 1.0, and when the viewing angle α is desired to be smaller than 90 degrees, the thickness W should be set such that h/w becomes smaller than 1.0. On the other hand, there is no practical problem if the haze (HAZE) defined by the ratio of the diffusion transmittance and the parallel light transmittance of the transparent sheet 51 is 10% or less, but it is preferably 4% or less. In addition, the total transmittance of 75% or more is required when it is attached to a windshield for use in a vehicle.

Since the image light from the image projection apparatus 48 is S-polarized light, it scatters inside the transparent diffusion sheet material 55 described above and is emitted toward the observer in a state where the reflectance in the oblique incidence is high. On the other hand, a part of the image light whose polarization direction is disturbed due to the scattering diffuses and transmits through the transparent diffusion sheet material 55, and is emitted toward the window glass 220. Since the difference in refractive index is small on the incident surface of the window glass 220, the level of the double image generated by the reflected light is low. On the other hand, since the reflected light generated on the emission surface (the surface in contact with the outside world) of the window glass 220 is mostly the S polarization component, the reflectance is large. Since the image light reflected on this surface passes through the external light control film 70 again after reflection and is then absorbed in the black region 70$b$, it does not return to the observer side.

Therefore, since the light intensity of the double image generated by the reflected image of the window glass 220 can be significantly reduced, the image quality is greatly improved. Similarly, it goes without saying that the same effect can be obtained by attaching the above-mentioned transparent sheet 51 to the combiner instead of the window glass 220 as the image reflection surface.

With the unidirectional transparent sheet 51 described above, the sunlight component of the P-polarized light that has passed through the window glass 220 (passed through also the combiner afterward in the combiner method) under predetermined conditions in the daytime is absorbed in front of the information display system and the light direction changing panel 54 and the protective cover 50 provided on the upper surface thereof, so that it is possible to prevent it from returning to the liquid crystal display panel and the polarization plate.

<Unidirectional Transparent Sheet: First Example of Transmission Type>

Figure 22:
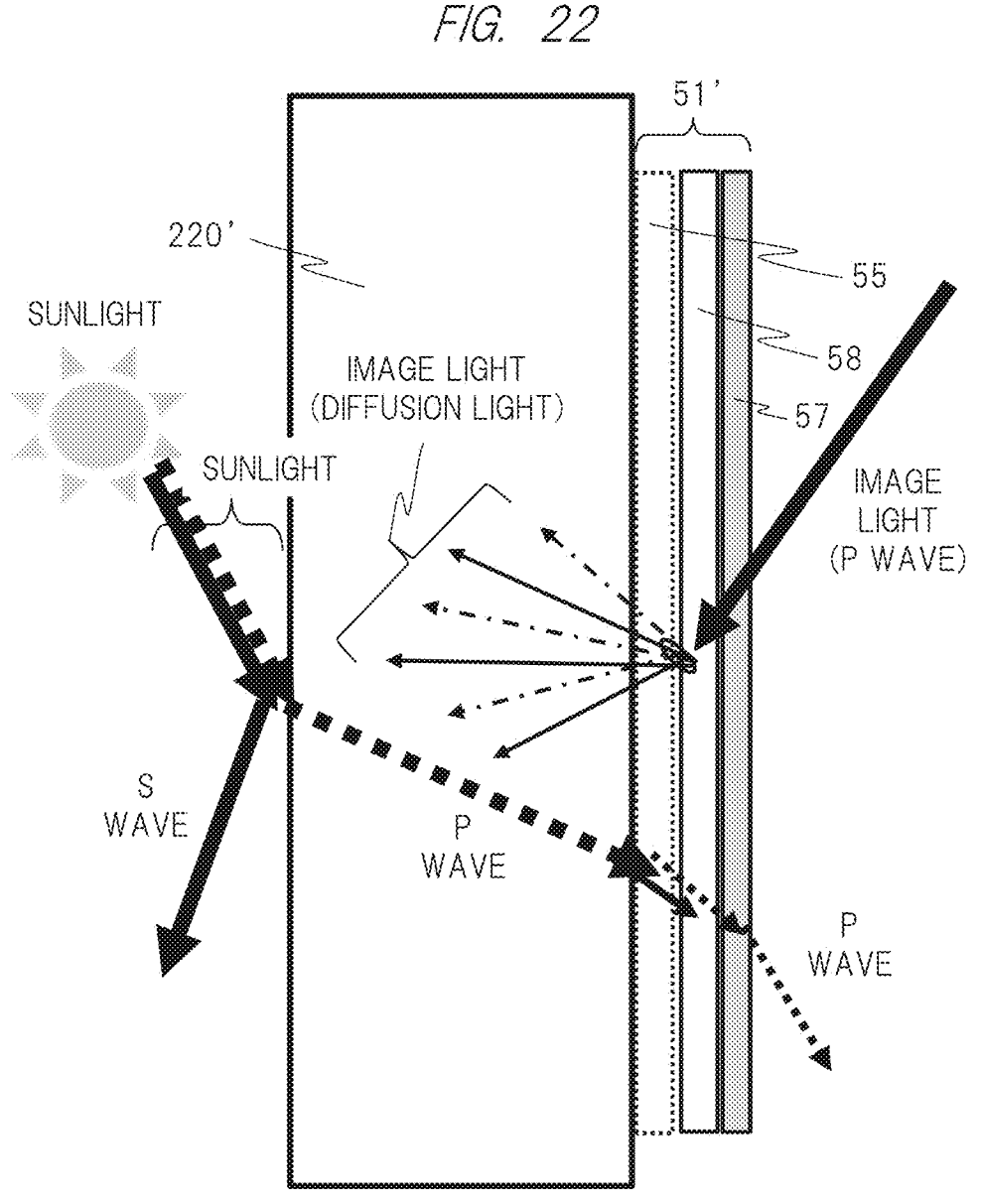
FIG. 22 is a cross-sectional view showing a configuration of a unidirectional transparent sheet (transmission type) (first example) constituting the image projection apparatus of the information display system.

FIG. 22 shows a configuration of a transparent sheet 51' that diffuses the image light flux to the outside of the vehicle or the outside of the room. The polarization plate 57 that transmits P waves and the retardation plate 58 are provided on the image light flux incident surface of the transparent diffusion sheet material 55, and the image light flux reflected by the transparent diffusion sheet material 55 is prevented from returning to the inside of the room (space in which the information display apparatus is installed). As a result, the image projected on the window glass 220 does not hinder the observer. As the optimum phase difference of the retardation plate 58 provided between the polarization plate 57 and the transparent diffusion sheet material 55, an optimal value is preferably selected in accordance with the diffusion characteristics of the transparent diffusion sheet. When the diffusion angle is large, it is preferably close to λ/4, and when the diffusion angle is small, better conversion performance can be obtained by combining with a λ/8 plate or the like.

Also, by providing a sheet to which the reflection enhanced coating whose reflectance of a specific polarized wave is increased is applied instead of the above-mentioned transparent diffusion sheet material 55 as a substitute of the polarization plate or applying the reflection enhanced coating to the surface of the polarization plate, the reflectance of the image light flux can be increased and simultaneously the intensity of the double image generated by the reflected image of the window glass 220 can be significantly reduced, that is, the same effect as the above-mentioned technique can be obtained.

Further, it is preferable that, by using, for example, PDLC (Polymer Dispersed Liquid Crystal) of Santech Display Co., Ltd. instead of the transparent diffusion sheet material 55 described above, the image light is dispersed without applying a voltage in the image display state and it is used instead of the transparent sheet by turning it to a transparent state by applying a voltage in the image non-display state. Also, the inventors revealed by experiment that it was possible to realize a screen having a novel function capable of controlling the diffusion characteristics by changing the voltage applied to the above-mentioned PDLC and capable of controlling the transmittance in accordance with the image by modulating the applied voltage in synchronization with the ON/OFF or the intensity of the image signal.

<Unidirectional Transparent Sheet: Second Example of Transmission Type>

Figure 23:
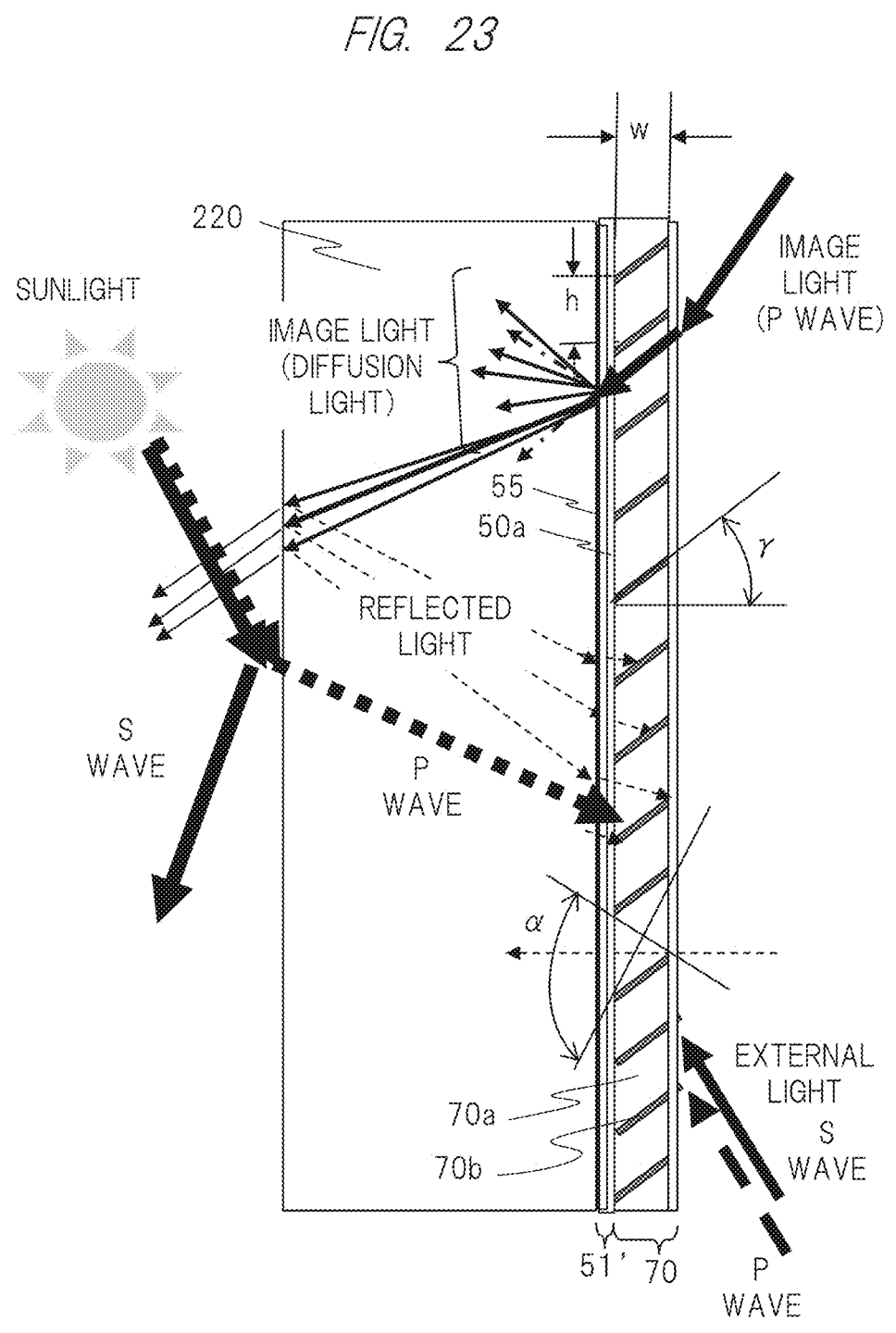

FIG. 23 shows a configuration in which the image light control film 70 shown in FIG. 19 is used as the external light control film (hereinafter, denoted by a reference numeral 70)

in addition to the transparent sheet 51' that diffuses the image light flux to the outside of the vehicle or the outside of the room. As described above, the S-polarized light of sunlight incident on the window glass 220 from an oblique direction is reflected, and the P-polarized light thereof is transmitted and directed to the transparent sheet 51'. At this time, it is absorbed by the black portion 70*b* (shown in gray in FIG. 23) provided in the external light control film 70, and does not reach the inside of the room or the vehicle in which the image display apparatus is arranged. In addition, since it is not mixed with the image light from the image display apparatus 48, deterioration of the image quality is also prevented.

The transparent sheet 51' is made of the transparent diffusion sheet material 55. For this transparent sheet 51', a film obtained by melting and stretching a thermoplastic polymer in which zirconium nanoparticles and diamond nanoparticles having a large refractive index are dispersed, for example, "KALEIDO SCREEN" manufactured by JXTG Energy Co., Ltd. can be used (see Patent Document 3 mentioned above). Consequently, the display which is transparent and does not prevent the observer from monitoring the scenery of the outside world (outside the store) when the image is not displayed and the display which diffuses and reflects the image light such that the observer outside the store (space) can visually recognize the image information when the image is displayed, that is, the unidirectional display can be realized. Further, in the above-mentioned external light control film 70, since the image light incident on the window glass 220 from an oblique direction is hardly blocked by the black portion 70*b* and passes through the transparent portion 70*a*, it is diffused by the transparent sheet 51' and the image display to the outside world (to the outside of the vehicle or outside of the store) is possible. As the external light control film 70, for example, a viewing angle control film (VCF: View Control Film) of Shin-Etsu Polymer Co., Ltd. is suitable, and since the structure thereof is such that transparent silicon and black silicon are alternately arranged and a synthetic resin is arranged on a light incident/emission surface to form a sandwich structure, the same effect as that of the external light control film of the present embodiment can be expected. It is desirable that a pitch h of the transparent portion 70*a* and the black portion 70*b* of the viewing angle control film described above is ⅓ or less with respect to the pixels of the image to be displayed. At this time, when the viewing angle α is desired to be larger than 90 degrees, a thickness W should be set such that h/w becomes larger than 1.0, and when the viewing angle α is desired to be smaller than 90 degrees, the thickness W should be set such that h/w becomes smaller than 1.0. Also, the energy loss can be reduced by matching an inclination angle γ of the black portion with the incident angle of the image light determined by the mounting positions of the image display apparatus 48 and the window glass.

On the other hand, there is no practical problem if the haze (HAZE) defined by the ratio of the diffusion transmittance and the parallel light transmittance of the transparent sheet 51 is 10% or less, but it is preferably 4% or less. Also, by providing a sheet to which the reflection enhanced coating whose reflectance of a specific polarized wave is increased is applied instead of the above-mentioned transparent diffusion sheet material 55, the reflectance of the image light flux can be increased and simultaneously the intensity of the double image generated by the reflected image of the window glass 220 can be significantly reduced, that is, the same effect as the above-mentioned technique can be obtained.

Further, it is preferable that, by using, for example, PDLC of Santech Display Co., Ltd. instead of the transparent diffusion sheet material 55 described above, the image light is dispersed without applying a voltage in the image display state and it is used instead of the transparent sheet by turning it to a transparent state by applying a voltage in the image non-display state. Also, the inventors revealed by experiment that it was possible to realize a screen having a novel function capable of controlling the diffusion characteristics by changing the voltage applied to the above-mentioned PDLC and capable of controlling the transmittance in accordance with the image by modulating the applied voltage in synchronization with the ON/OFF or the intensity of the image signal.

Since the image source constituting the image projection apparatus 48 described above is a liquid crystal panel, when the observer wears polarized sunglasses, a problem that a specific polarized wave is blocked and the observer cannot see the image occurs. In order to prevent this, a wave plate 50*b* such as a λ/4 plate, a λ/8 plate, or a λ/16 plate is arranged between the film 50*a* and the base material 56 provided on the light incident side surface of the protective cover 50 provided on the light emitting side of the image projection apparatus 48 described above. By providing the wave plate 50*b*, preferably, the polarization direction of the light flux is aligned in a specific direction, the image light is made to have the optimum polarization angle, and the polarization direction of the polarized sunglasses and the polarization axis are shifted from each other by a desired amount.

On the other hand, even with the same polarization, by rotating the absorption axis so as to shift the absorption axis of the polarization plate on the light emission side of the liquid crystal panel by 30 degrees or more with respect to the absorption axis of the polarized sunglasses, the absorption becomes about 50%, so that the problem that the image cannot be seen can be solved.

Further, when the polarization axis is rotated to be approximated to circular polarization, the polarization axis of the image light from the information display system is rotated from S-polarized light. Thus, since the reflectance by the window glass 220 is lowered and the brightness of the image is lowered, the balanced selection therebetween is preferable.

In the information display system according to the embodiment described above in detail, since the image light from the image projection apparatus 48 has a narrow diffusion angle (high straightness) and includes only a specific polarization component like the image light from the surface-emitting laser image source, various information can be displayed inside or outside the space by using, for example, the show window 220 that constitutes the space, the utilization efficiency of the show window can be greatly improved, high-quality images can be displayed with high resolution, and power consumption can be significantly reduced by improving the utilization efficiency of the light emitted from the light source. Further, when displaying a larger image, a large-sized liquid crystal display panel 52 obtained by combining a plurality of relatively inexpensive liquid crystal display panels by making the joints thereof continuous may be adopted as the liquid crystal display panel 52 that is an image display element constituting the image projection apparatus 48 together with the light source apparatus 101. In this case, by directing the light flux from the above-mentioned light source apparatus 101 to the transparent sheet 51 parallelly provided on the window glass 220 and unidirectionally reflecting/diffusing it by the transparent sheet 51, more expanded image information can be displayed while significantly reducing the power consumption.

In the above description, an example in which the information display system is applied to a store which is a space partitioned by a show window which is a transparent member such as glass and information is unidirectionally displayed to the inside or outside thereof by using the show window 220 has been described, but the present invention is not limited to this example. Namely, the information display system according to the present invention can unidirectionally display the information to the inside or outside of the specific space by using the transparent member that partitions the space as long as the space is partitioned by using a transparent member such as glass, and other examples of the information display system will be described below.

<Vehicle Information Display System>

In the information display system described above, (1) the image light generated from the image projection apparatus 48 and emitted toward the show window 220 which is a member to which the light is projected (referred to as a projected member) is converted to image light having a narrow diffusion angle (high straightness) and including only a specific polarization component like the image light from the surface-emitting laser image source, so that high-quality images can be displayed with high resolution and power consumption can be significantly reduced by improving the utilization efficiency of the emitted light, and (2) the overall outer shape of the apparatus can be formed to be flat (panel-like) shape as is apparent from the component parts described above. Therefore, various examples of the so-called vehicle information display systems in which the information display system described above is applied by utilizing these features to a vehicle such as an automobile, a train, and an aircraft instead of a space such as a store mentioned above will be described in detail below.

Figure 24:
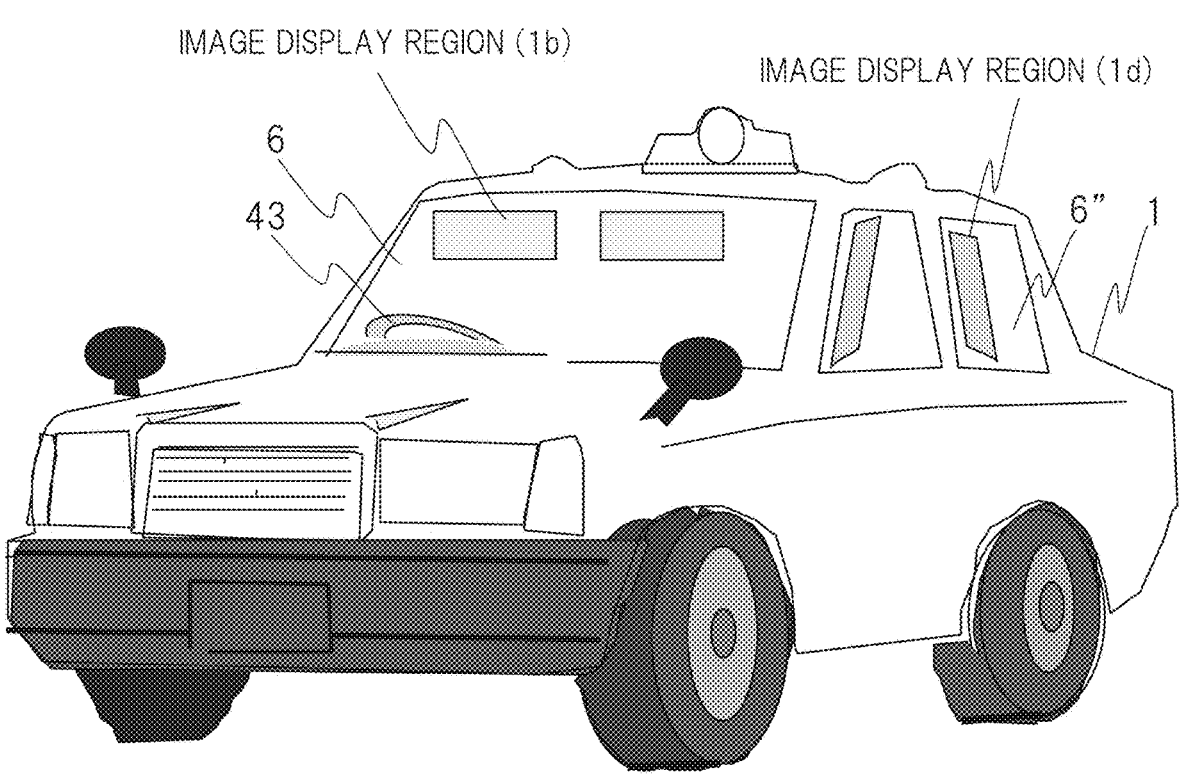
FIG. 24 is a diagram showing an example in which the information display system is applied to a passenger car.

FIG. 24 shows an example in which a vehicle information display system is mounted on an ordinary passenger car. In this example, image information is displayed on some or all of a part of the windshield 6 (upper part of a steering 43), a rear glass, a part of a side glass 6" (gray part), and the like by the vehicle information display panel 100.

Figure 25:
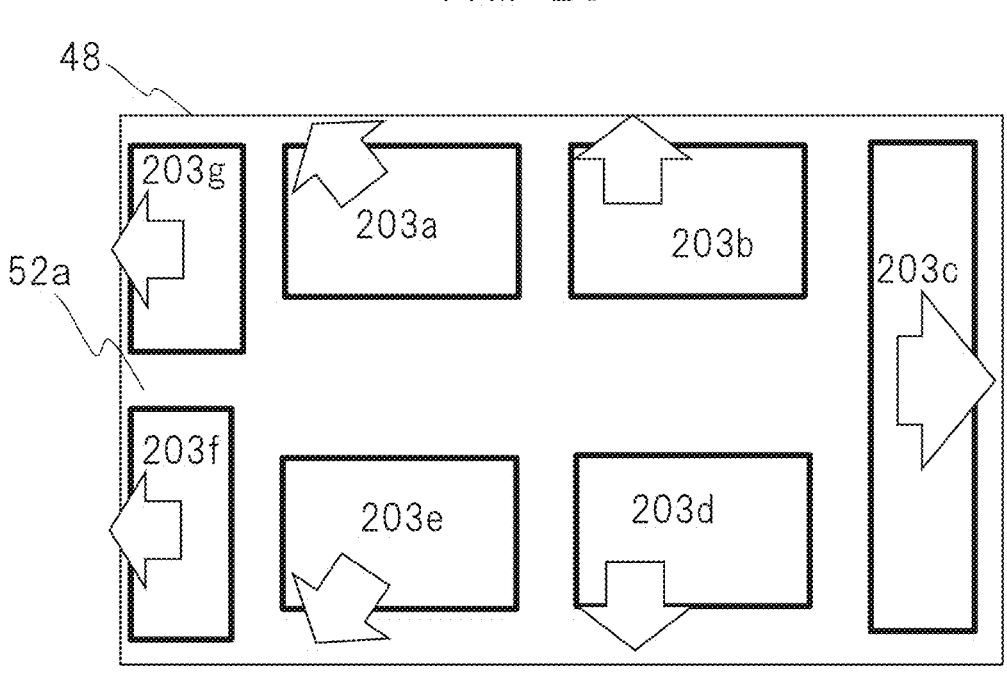
FIG. 25 is a diagram showing an example in which the image display apparatus of the information display system is installed on a ceiling portion of a passenger car serving as a vehicle.

As a specific configuration for displaying an image on (a part or all of) the window glass of an automobile, for example, as shown in FIG. 25, the image projection apparatus 48 including a large-sized liquid crystal panel 52a (see also reference numeral 52 in FIG. 2) is installed on a ceiling portion of a vehicle body 1, and a plurality of light guide bodies 203a, 203b, 203c, 203d, 203e, 203f, and 203g (see also reference numerals 101 and 203 in FIG. 2) constituting the light source apparatus 101 is provided on a part of the back surface of the liquid crystal panel as the light source apparatus 101, so that the image light each having a narrow diffusion angle (high straightness) and an aligned polarization plane like the light from the surface-emitting laser light source can be obtained as indicated by the white arrows in the drawing. These light fluxes are further projected to the windshield 6, the rear glass 6', and the side glass 6" serving as projected surfaces of the image information by the light direction changing panels (not shown here, see reference numeral 54 in FIG. 2) provided so as to correspond to each of the light guide bodies 203a to 203g, and the image is unidirectionally displayed to the inside or outside of the vehicle 1. At this time, as shown in FIG. 25, at the positions of the liquid crystal panels 52 constituting the image projection apparatus 48, the images corresponding to them are separately displayed, respectively. Also, since the distances from the image display apparatus to the window glasses and the shapes of the window glasses are different, the original image is distorted such that the projected images are displayed in the correct shape. As the resolution of the large-sized liquid crystal panel 52a, about 8 k is sufficient.

Figure 26:
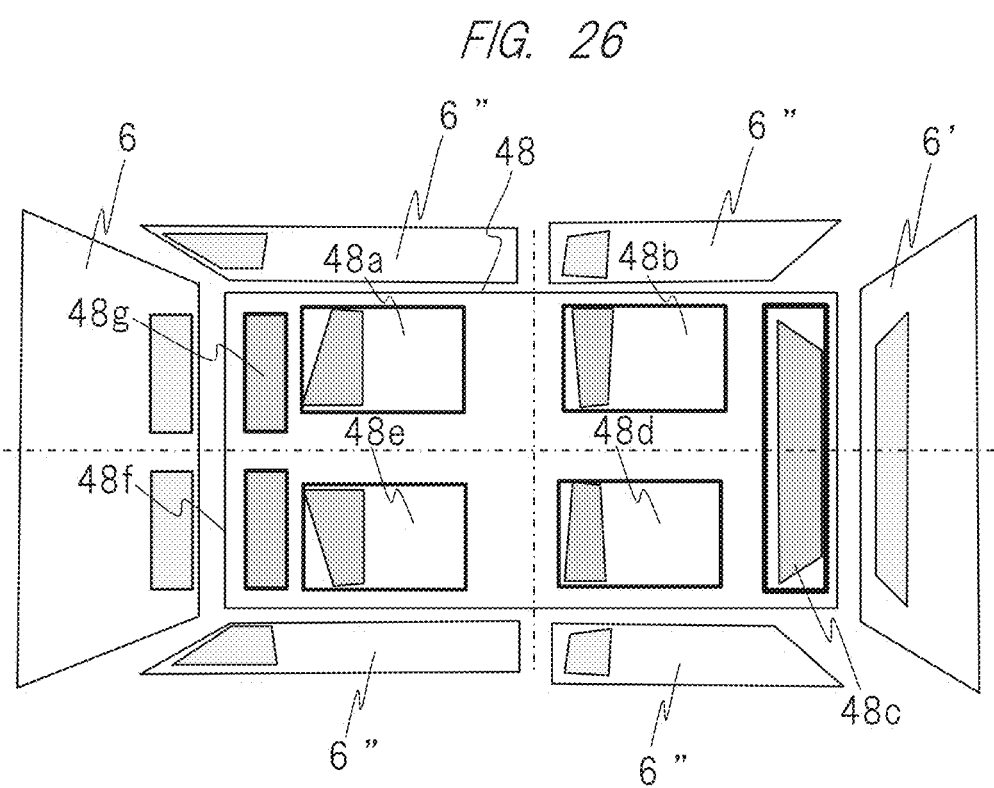
FIG. 26 is a diagram showing an example in which images are displayed on windows of a passenger car serving as a vehicle.

Alternatively, as shown in FIG. 26, it is also possible to display the image to each of the window glasses by installing a plurality of image display apparatuses 48a, 48b, 48c, 48d, 48e, 48f, and 48g on a ceiling portion of a vehicle body instead of the image projection apparatus 48 composed of the large-sized liquid crystal panel 52a described above. Also at this time, since the distances from the image display apparatuses to the window glasses and the shapes of the window glasses are different, the original image is preferably distorted such that the projected images are displayed in the correct shape.

In the above, an example in which various images are displayed on the image display region in which the transparent sheet 51 is attached to the window glass 6 by the vehicle information display system has been described, but the present invention is not limited to this. For example, by providing the reflection enhanced coating whose reflectance of a specific polarized wave is increased instead of the above-mentioned transparent diffusion sheet material, the reflectance of the image light flux can be increased and simultaneously the intensity of the double image generated by the reflected image of the window glass 6 can be significantly reduced, and thus the same effect as the above-mentioned technique can be obtained.

Figure 27:
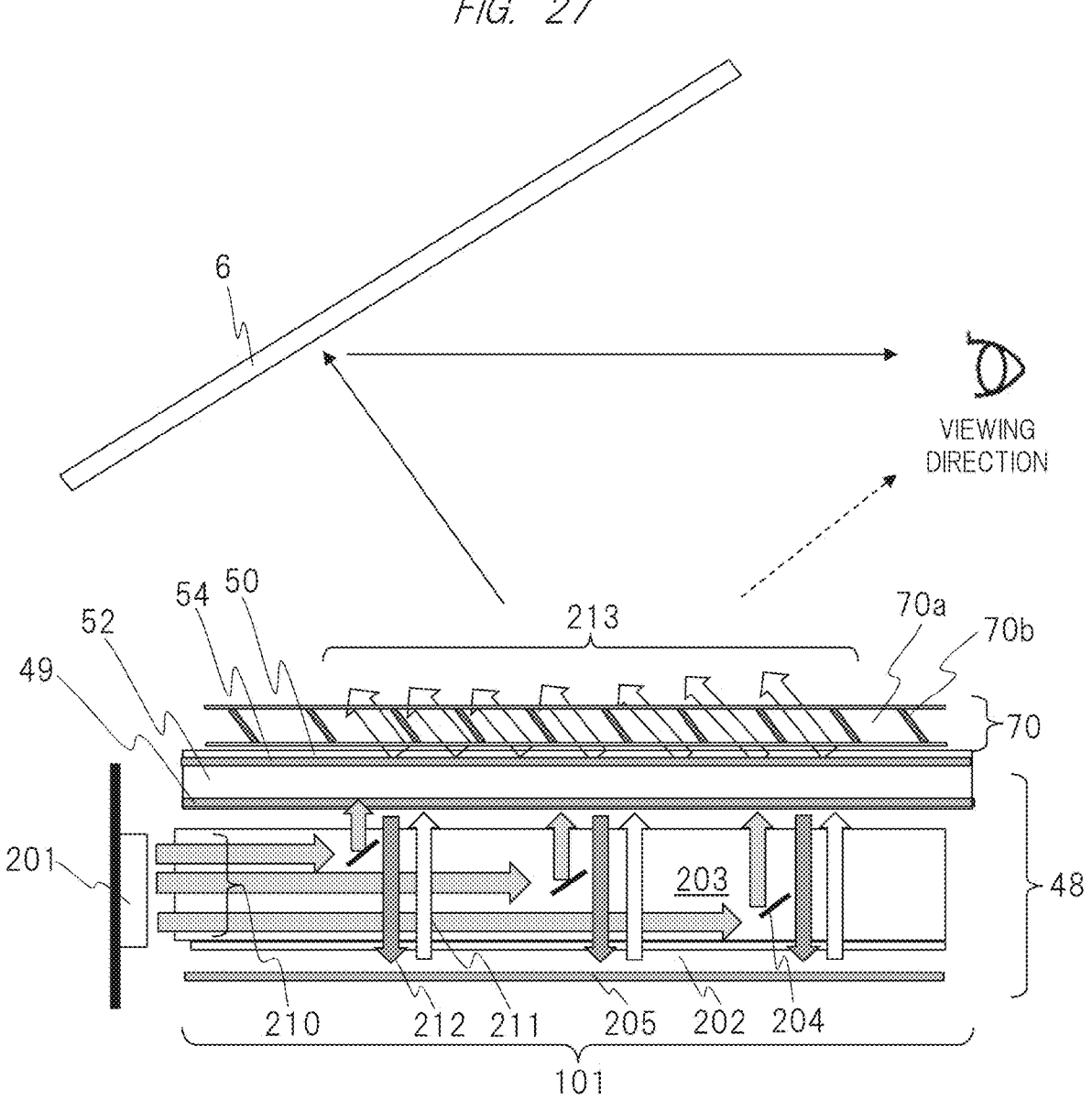
FIG. 27 is a diagram showing an example in which a light direction restriction panel provided in the image display apparatus of the information display system is installed in a vehicle together with the image display apparatus.

FIG. 27 shows the configuration in which the image display apparatus 48 shown in FIG. 2 is arranged on a dashboard of an automobile and the image light control film 70 shown in FIG. 19 is provided thereon. The image light from the liquid crystal display panel 52 is emitted toward the windshield 6, and a part of the light is blocked by the black portion 70b, so that the light does not directly enter the eyes of the driver and it is possible to prevent the hindrance due to the direct light from the image display apparatus 48 entering the observer's eyes. This image light control film 70 has a function to prevent the image light from being directly delivered to the observer, while the image light passes through the transparent portion 70a and is reflected by the windshield 6, and can be recognized by the driver who is the observer.

Figure 28:
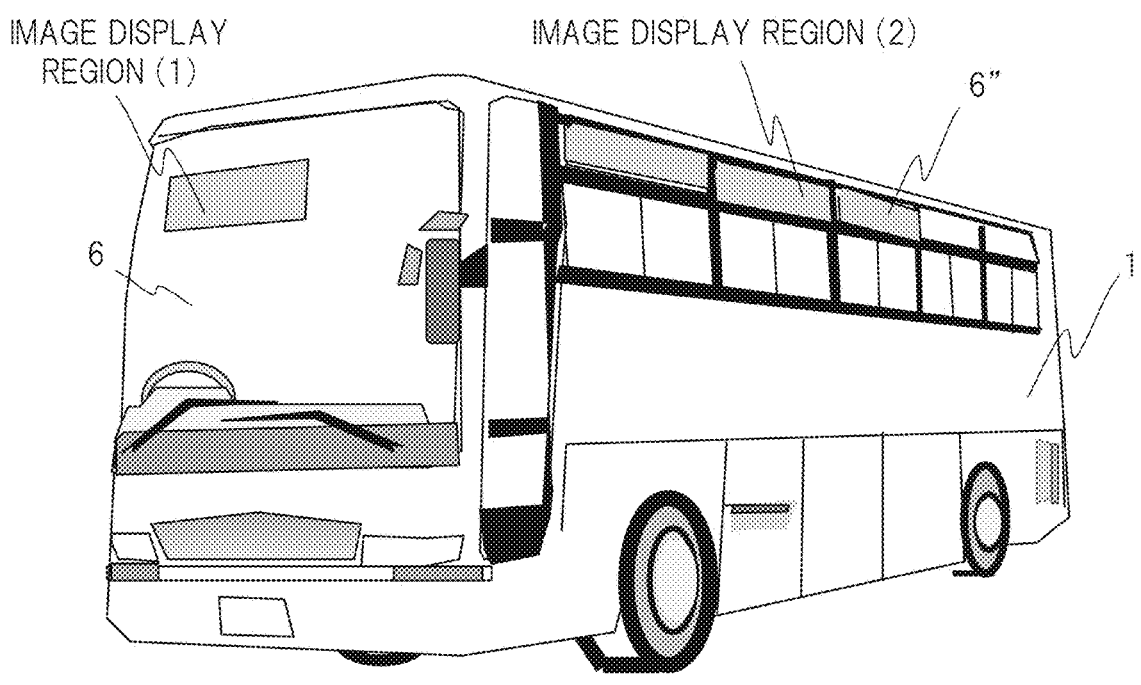
FIG. 28 is a diagram showing an example in which the information display system is applied to a bus serving as a vehicle.
Figure 29:
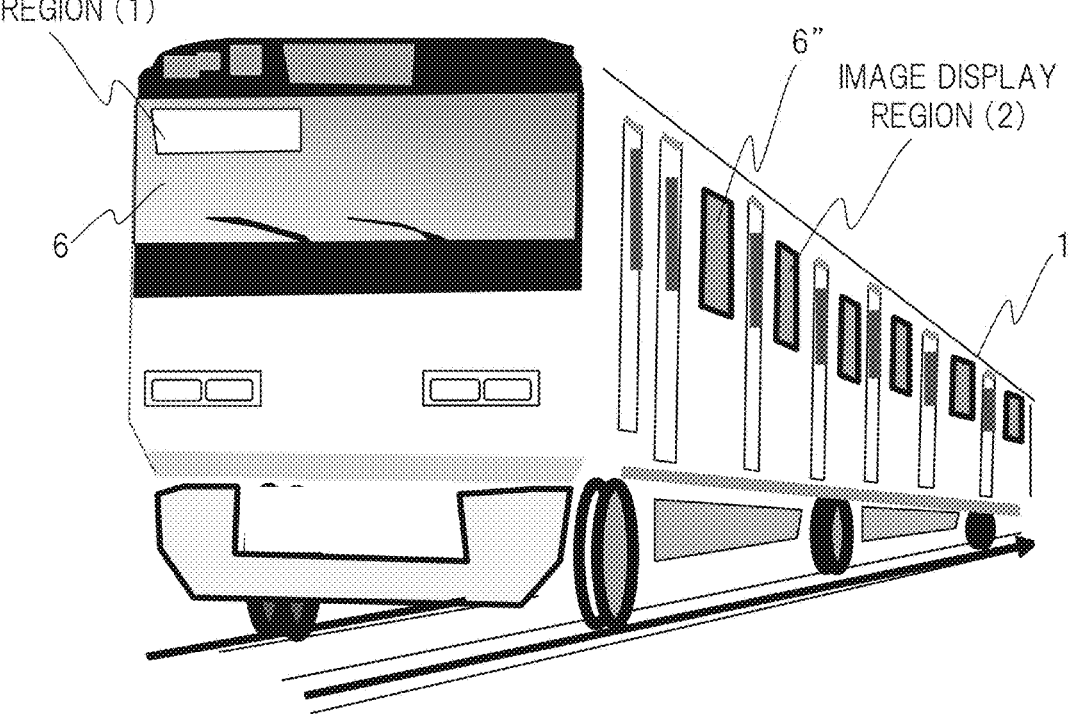
FIG. 29 is a diagram showing an example in which the information display system is applied to a train serving as a vehicle.

FIG. 28 and FIG. 29 are external views showing the case where the vehicle information display system is mounted on a commercial vehicle such as a bus or a train. The windshield 6, the rear glass 6' (not shown), the side glass 6", and the like (collectively referred to as "shield glass") as the transparent projected members on which the image light is projected and displayed are present in the vehicle body 1. In particular, the windshield 6 in front of the driver's seat of the vehicle body 1 has different inclination angles to the vehicle body depending on the types of the vehicle. The inventors studied the radius of curvature thereof in order to realize the optimum virtual image optical system. As a result, it was found that the windshield 6 of a bus, a railroad vehicle, and the like had the following relationship between the radius of curvature Rh in the horizontal direction horizontal to the ground contact surface of the vehicle and the radius of curvature Rv in the direction vertical to the horizontal axis, and the radius of curvature Rh in the horizontal direction was close to a flat surface in many cases.

Rh>Rv

This vehicle information display system is configured to unidirectionally display the image information to the inside or the outside of the vehicle by using the windshield 6, the rear glass 6', and/or the side glass 6" which are the translucent members partitioning the space in the vehicle and serve as the projected members constituting a part of the vehicle, and it relates to the system capable of displaying the image information to the driver and the passenger in the vehicle when the driver is driving the own vehicle and capable of displaying the image information also to the outside of the vehicle. Consequently, the driver and the passenger can monitor the necessary information displayed on a display region such as the windshield 6 inside the vehicle as appropriate, but the information cannot be monitored from the outside. Alternatively, the image information can be displayed also to the outside of the vehicle via the rear glass 6' or the side glass 6" (and the windshield 6), and this displayed information can be monitored from the outside but cannot be monitored from the inside of the vehicle, so that it does not obstruct the monitoring of the outside scenery by the driver and the passenger and does not hinder the driving.

Figures 31, 32:
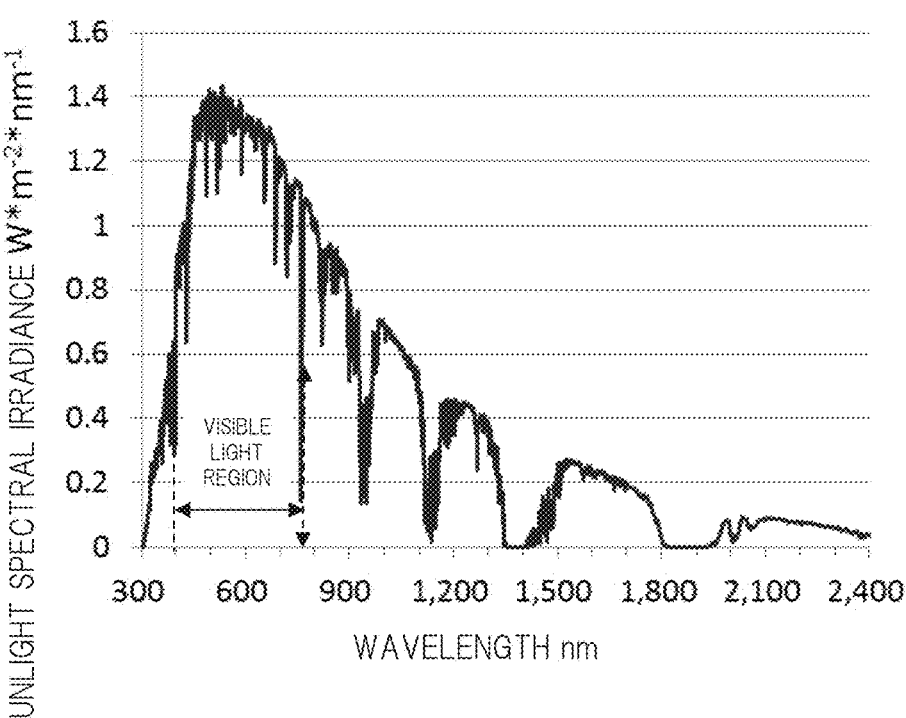
FIG. 31 is a diagram including a graph showing a wavelength distribution of natural light such as sunlight.
FIG. 32 is a diagram including graphs showing reflectance of glass with respect to p-polarized light and s-polarized light of natural light such as sunlight.

Further, in the vehicle information display system, since the vehicle itself is exposed to natural light including sunlight, it is necessary to take some measures for sunlight. However, as shown in FIG. 31, natural light such as sunlight is not only the light of the wide wavelength range from the ultraviolet to the infrared but also exists in the state where the lights of two types of polarization directions such as the light in the vibration direction perpendicular to the traveling direction of the light and the light in the horizontal direction (hereinafter, referred to as S-polarized light and P-polarized light) are mixed. In particular, in the region in which the incident angle on the windshield 6 is larger than 50 degrees, as shown in FIG. 32, the reflectance on the glass surface varies depending on the S-polarized light, the P-polarized light, and the incident angle, respectively.

Therefore, in the present embodiment, based on the above-mentioned findings by the inventors, that is, considering that most of the sunlight entering through the windshield 6 was a P-polarized light component, it was confirmed that it was particularly effective to reduce the P wave component in order to suppress external light including sunlight entering the information display apparatus. In addition, it was confirmed that it was effective to use the S wave component as the image light to be emitted from the information display apparatus and reflected in the vehicle and monitored by the driver and the passenger serving as the observers.

<Specific Configuration Example of Vehicle Information Display System (1)>

Subsequently, another vehicle information display system in which the information display system according to the present embodiment is applied to a vehicle and a specific configuration thereof will be described in detail with reference to FIG. 27 and FIG. 30.

Figure 30:
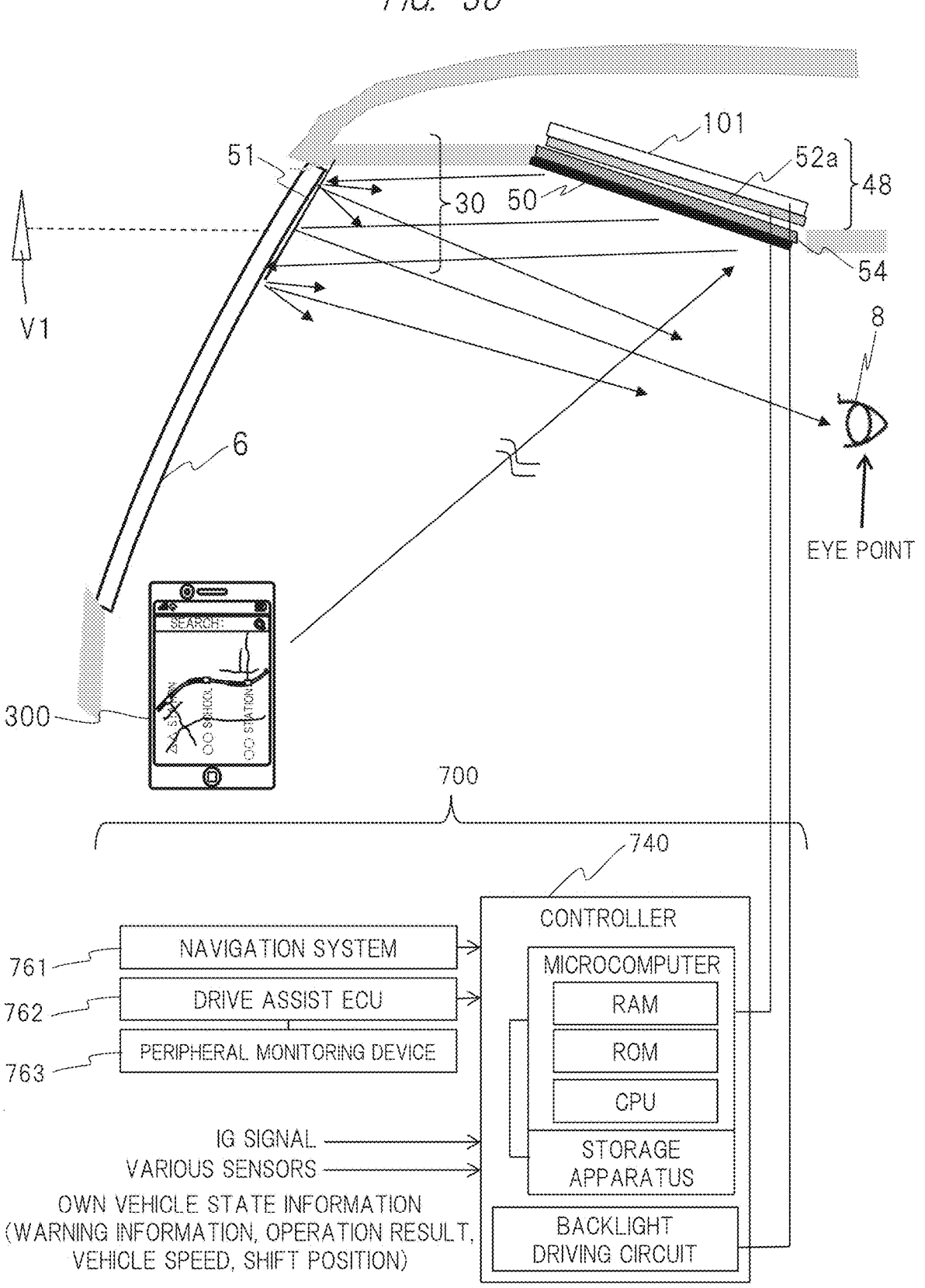
FIG. 30 is a diagram showing an example in which a light direction restriction panel provided in the image display apparatus of the information display system is installed in a vehicle together with the image display apparatus.

FIG. 27 and FIG. 30 show the overall configuration of the vehicle information display system in which the information display system according to the present embodiment is applied to the vehicle and the image information is displayed in a part of the outside scenery monitored by the driver via the windshield 6 which is a transparent projected member constituting a part of the vehicle. Here, the windshield 6 is divided into a plurality of regions, the image light from the image projection apparatus 48 is diffused and reflected in a part of the regions of the windshield 6 (in this example, the upper part of the windshield 6), and the reflected image is unidirectionally monitored by the driver and the passengers directly. As a result, the driver and the passenger can monitor the necessary information displayed in the display region of the windshield 6 as appropriate, but on the other hand, the information cannot be visually recognized from the outside of the vehicle.

In this vehicle information display system, as shown in FIG. 30, the image projection apparatus 48 projects the high-resolution map information from the smartphone 300 or the like (image of a large-sized high-resolution image display apparatus) onto the inner surface of the windshield 6 via the light direction changing panel 54 and the protective cover 50 (hereinafter, the light source apparatus 101 serving as a backlight apparatus, the image projection apparatus 48, the light direction changing panel 54, and the protective cover 50 constituting the information display system according to the present embodiment are collectively referred to as the "information display apparatus" 100) though described later in detail, so that the image light is reflected via the transparent sheet 51 provided on the surface of the windshield 6 to the eyes 8 of the observer (driver), thereby displaying the image on the windshield 6.

Note that an example of the case of using the smartphone 300 which is a high-performance mobile terminal device equipped with a navigation function that provides map information and the like is shown here, and the display screen from the smartphone 300 is input through a wired connection terminal or by a wireless connection such as Bluetooth (registered trademark) or Wifi (registered trademark) so as to be able to display the image thereof, so that the driver can monitor the high-resolution image information by using the vehicle information display system. Although not shown here, the smartphone is provided with a controller composed of a CPU (Central Processing Unit) and various solid-state memories such as RAM and ROM functioning as work memory and information storage like the image projection apparatus 48 described above, and has a function of generating and displaying the necessary image on the display apparatus (liquid crystal display) thereof.

Further, a more specific configuration of the vehicle information display system will be described. The image display element 52 constituting the image projection apparatus 48 of the information display apparatus 100 is composed of, for example, a relatively large liquid crystal display panel having a screen size of more than 6 inches. In general, since the radius of curvature of the windshield 6 is partially different in many cases, non-uniform (longitudinal and lateral) distortions occur in the displayed image depending on the place where the image is reflected. Therefore, distortion correction is required to obtain a correct image when the reflected image is viewed from the monitoring direction. In order to perform correction at a level that does not cause a problem in practical use by this distortion correction, the resolution of the panel needs to be 1280×720 dots or more.

Also, the image display apparatus 48 further includes the light source apparatus 101 constituting a light source thereof together with the above-mentioned liquid crystal display panel 52, and the light source apparatus 101 is shown above the liquid crystal display panel 52 in FIG. 30.

The liquid crystal display panel (element) 52 obtains an illumination light flux having strong directivity by the light source apparatus 101 which is a backlight apparatus and emits the image light modulated in accordance with an input image signal to the transparent sheet 51 provided on the windshield 6 as shown FIG. 30. Also, in FIG. 30, the vehicle information display system further includes the light direction changing panel 54 configured to control the directional characteristics of the light flux 30 emitted from the light source apparatus 101 and a narrow-angle diffusion plate (not shown) as needed together with the image projection apparatus 48 including the light source apparatus 101 and the liquid crystal display panel 52. Namely, polarization plates are provided on both surfaces of the liquid crystal display panel 52, and the image light having a specific polarization is emitted with the light intensity thereof modulated by the image signal. Consequently, the high-resolution image from the smartphone 300 or the like (image of large-sized high-resolution image display apparatus) is projected toward the windshield 6 via the light direction changing panel 54, and it is reflected toward the eyes 8 of the observer (driver) via the transparent sheet 51 provided on the surface of the windshield 6.

Note that the image projection apparatus 48 constituting the vehicle information display system includes the light source apparatus 101, the liquid crystal display panel 52, and the like as shown in the drawing, and the configuration and function of the image projection apparatus 48 including the light source apparatus 101 have already been described above as the embodiment of the image display apparatus and are not described in detail here. However, almost all the light generated by the LED can be taken out as parallel light, and the utilization efficiency of the generated light can be improved. Further, it is also possible to improve its uniform illumination characteristics, and at the same time, it is possible to manufacture it in a small size and at low cost including a light source apparatus capable of taking out the S-polarized image light while modulating the light intensity by the modularized liquid crystal panel. The polarization direction of the light source light required at this time differs depending on the characteristics of the liquid crystal panel, and the reflected image of the window glass can be efficiently observed by adopting the P-polarized light in the case of the black display in which no voltage is applied and adopting the S-polarized light in the case of the black display in which voltage is applied.

Though not shown here, with the image light having a narrow diffusion angle (high straightness) and including only a specific polarization component like the image light from the surface-emitting laser image source obtained by adopting the lenticular lens or the microlens array sheet (not shown) shown in FIG. 9 to FIG. 11, the image light from the image projection apparatus 48 is efficiently delivered to the eyes 8 of the observer inside or outside the room, so that it is possible to realize the vehicle information display system in which the high-quality image can be displayed with high resolution and the power consumption can be reduced by reducing the output of the image projection apparatus 48.

In addition, the light direction changing panel 54 provided on the lower surface of the image projection apparatus 48 described above is also the same as that described above with reference to FIG. 12 and others, and the configuration and function thereof are not described in detail here. However, the image light which is emitted from the liquid display panel 52 constituting the image projection apparatus 48 of the vehicle information display system is directed to the transparent sheet 51 provided on the windshield 6 without being visually recognized by the driver and the passenger in the vehicle, and then, the image light is unidirectionally reflected and diffused by the transparent sheet 51 and the reflected image is visually recognized by the driver. Namely, with this light direction changing panel 54, the image light itself from the image projection apparatus 48 is not visually recognized directly from the inside of the vehicle and thus does not obstruct the driving, and only the reflected image by the reflected light thereof is monitored by the driver and the passenger.

Also, the protective cover 50 shown in FIG. 30 arranged in contact with the ceiling surface of the vehicle and provided on the upper surface of the light direction changing panel 54 described above is also the same as that described above with reference to FIG. 13 and others, and the configuration and function thereof are not described in detail here. However, in the vehicle information display system, in particular, the hindrance due to the reflection of external light at the time when the driver drives the own vehicle can be reduced.

In addition, the S-polarized light of the sunlight incident on the windshield 6 from an oblique direction is reflected, and the P-polarized light thereof is transmitted and directed to the transparent sheet 51. As described above with reference to FIG. 20 and others, the transparent sheet 51 is composed of the polarization plate 57 that transmits the S waves and the transparent diffusion sheet material 55, is transparent when the image is not displayed, and does not prevent the driver from monitoring the scenery of the outside world (outside the vehicle). On the other hand, the transparent sheet 51 diffuses and reflects the image light when the image is displayed, so that the unidirectional display in which the driver and the passenger can visually recognize the image information can be realized. Further, it has already been described that the same effect can be obtained also in the configuration shown in FIG. 21. At this time, there is no practical problem if the haze (HAZE) defined by the ratio of the diffusion transmittance and the parallel light transmittance of the transparent sheet 51 is 10% or less, but it is preferably 4% or less. Meanwhile, the HAZE of window glass for automobiles is 2% or less.

On the other hand, since the image light from the image projection apparatus 48 constituting the vehicle information display system is S-polarized light, it scatters inside the transparent diffusion sheet material 55 constituting the transparent sheet 51 described above and is emitted toward the observer in a state where the reflectance in the oblique incidence is high. On the other hand, a part of the image light whose polarization direction is disturbed due to the scattering diffuses and transmits through the transparent diffusion sheet material 55, and is emitted toward the windshield 6. Since the difference in refractive index is small on the incident surface of the windshield 6, the level of the double image generated by the reflected light is low. On the other hand, since the reflected light generated on the emission surface (the surface in contact with the outside world) of the windshield 6 is mostly the S polarization component, the reflectance is large. Since the image light reflected on this surface passes through the polarization plate 57 again after reflection and is then absorbed, it does not return to the observer side. Therefore, since the double image caused by the reflected image of the windshield 6 is not generated, the image quality is greatly improved. Similarly, it goes without saying that the same effect can be obtained by attaching the above-mentioned transparent sheet 51 to the combiner instead of the windshield 6 as the image reflection surface.

With the transparent sheet 51 described above, as is clear from FIG. 20 and FIG. 21, the sunlight component of the P-polarized light that has passed through the windshield 6 (passed through also the combiner afterward in the combiner method) under predetermined conditions in the daytime is absorbed in front of the image projection apparatus 48 including the light source apparatus 101 and the liquid crystal panel 52 constituting the vehicle information display system, the apparatus including the light direction changing panel 54, and the protective cover 50 provided on the upper surface thereof, so that it is possible to prevent it from returning to the liquid crystal display panel and the polarization plate.

In the above example, the case in which the reflective transparent sheet 51 is adopted as the unidirectional transparent sheet 51 provided on the windshield 6 has been described, but also by adopting the transmission type transparent sheet 51' described with reference to FIG. 22 instead of it, the image light flux can also be diffused unidirectionally, that is, to the outside of the vehicle. In that case, a polarization plate that transmits P waves and a retardation plate are provided on the image light flux incident surface of the transparent diffusion sheet material 55 constituting the transparent sheet 51', and the image light flux reflected by the transparent diffusion sheet material 55 is prevented from returning to the inside of the vehicle (the space where the vehicle information display system is installed). As a result, the driving of the driver is not obstructed by the image projected on the windshield 6. As the optimum phase difference of the retardation plate 58 provided between the polarization plate 57 and the transparent diffusion sheet material 55, an optimal value is preferably selected in accordance with the diffusion characteristics of the transparent diffusion sheet. When the diffusion angle is large, it is preferably close to $\lambda/4$, and when the diffusion angle is small, better conversion characteristics can be obtained by combining with a $\lambda/8$ plate or the like. Further, the same effect can be obtained also in the example of the unidirectional transparent sheet described with reference to FIG. 23.

In the vehicle information display system including the image projection apparatus 48 having the light source apparatus 101 and the liquid crystal display panel 52, the light direction changing panel 54, and the like described above in detail, as shown by the arrows in FIG. 30, the large-sized high resolution image projection apparatus 48 is provided at the position (ceiling surface) corresponding to the image display region of the upper region of the windshield 6 which is the transparent member partitioning the space inside the vehicle, and the display image thereof is reflected on the windshield, so that the reflected image thereof can be directly monitored by the driver and the passenger. At that time, a high-quality image can be displayed with high resolution by the image light having a narrow diffusion angle (high straightness) and including only a specific polarization component like the image light from the surface-emitting laser image source, and power consumption can be significantly reduced by improving the utilization efficiency of the emitted light.

<Specific Configuration Example of Vehicle Information Display System (2)>

In the above, the vehicle information display system configured to display an image by the image projection apparatus 48, the light direction changing panel 54, and the like by using the window glasses including the windshield 6 and the side glass 6" partitioning the space in the vehicle has been described, but the present invention is not limited to this. For example, an image can be displayed also by using a rear glass, or a head-up display (HUD) type information display apparatus (hereinafter referred to as "HUD apparatus") can also be mounted and used at the same time. The example in such a case will be described below.

Figure 33:
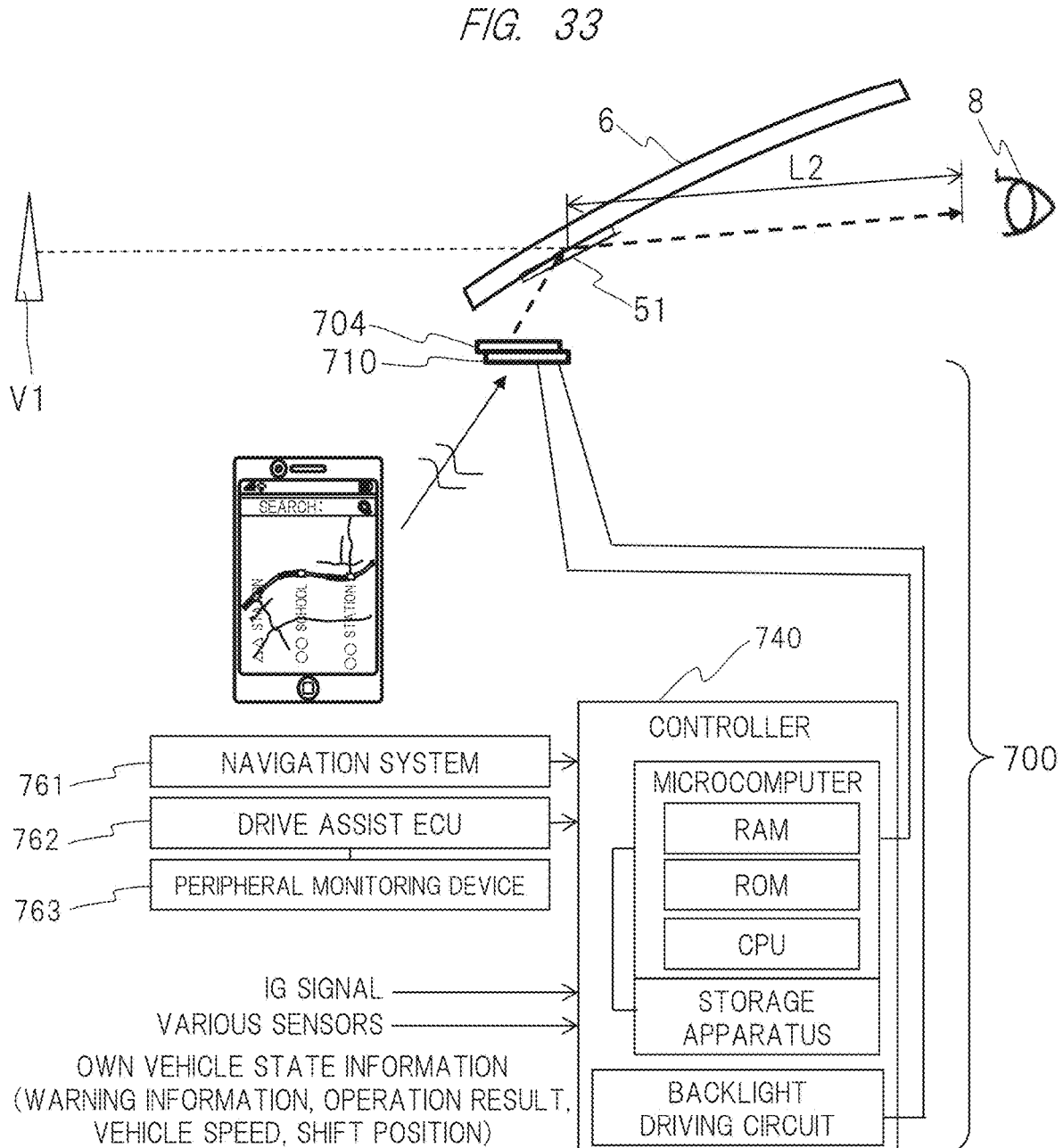
FIG. 33 is a diagram showing an example in which a vehicle information display system is mounted on a passenger car.

Subsequently, FIG. 33 shows an example in which the vehicle information display system is mounted on an ordinary passenger car whose appearance is shown in FIG. 24 instead of the above-mentioned large vehicle, and an image is unidirectionally displayed on a part of the windshield 6 (upper part of the steering 43) and a part of the side glass 6"

to the inside or outside of the vehicle by an image display apparatus 704 and a light source apparatus 710 of the HUD apparatus 700 provided instead of the image projection apparatus 48 and the light direction changing panel 54 described above.

Here, as the HUD apparatus, a known general apparatus can be adopted, and the outline thereof will be schematically described below as an example.

FIG. 33 is a schematic configuration diagram showing the HUD apparatus 700 including its peripheral device configuration. Here, in order to form a virtual image V1 in front of the own vehicle in the line of sight (eye point) 8 of the driver, various information reflected by the projected member 6 (inner surface of the windshield) is diffused and reflected by the transparent sheet 51 provided on the windshield 6 to the inside of the vehicle and is displayed as a real image.

The above-mentioned HUD apparatus 700 includes the image display apparatus 704 that corresponds to the image projection apparatus 48 described above and generates the image light of the information to be displayed and the light source apparatus 710 that corresponds to the light source apparatus 101 described above and supplies the light to the image display apparatus 704. In order to control the diffusion distribution of the image light from the image display apparatus 704, the unidirectional control can be achieved by optimizing the lens shape by providing a lenticular lens on a part of the surface of the image display apparatus 704 in the same manner as above. Further, the image light flux from the HUD apparatus 700 is emitted from an opening (not shown) toward the windshield 6. Namely, by adopting the image light having a narrow diffusion angle (high straightness) and including only a specific polarization component like the image light from the surface-emitting laser image source obtained by adopting the lenticular lens or the microlens array sheet described above in the HUD apparatus 700 constituting the vehicle information display system, the image light can be efficiently delivered to the eyes 8 of the observer inside or outside the room, and as a result, the vehicle information display system capable of displaying the high-quality image with high resolution and reducing the power consumption by reducing the output of the HUD apparatus 700 can be realized.

In addition, the HUD apparatus 700 includes a controller 740 that controls the backlight thereof. The image display apparatus 704 and the optical components including the backlight reflect and diffuse the display image of the image display apparatus 704 on the transparent sheet 51 attached to the windshield 6, thereby directing it toward the driver's line of sight 8. As the image display apparatus 704, for example, an LCD (Liquid Crystal Display) having a backlight can be presented.

The controller 740 in the drawing constituting the HUD apparatus acquires, from a navigation system 761, various information such as the speed limit and the number of lanes of the road corresponding to the current position where the own vehicle is traveling, the planned route of the own vehicle set in the navigation system 761, and others as foreground information (that is, information displayed in front of the own vehicle by the above-mentioned virtual image). Also, a driving support ECU 762 is a controller for realizing driving support control by controlling the drive system and the control system in accordance with the obstacle detected as a result of the monitoring by a peripheral monitoring device 763. Such driving support control includes well-known techniques such as cruise control, adaptive cruise control, pre-crash safety, and lane keeping assist. The peripheral monitoring device 763 in the drawing is configured to monitor the situation around the own vehicle, and is, for example, a camera that detects an object existing in the vicinity of the own vehicle based on an image taken around the own vehicle, a searching device that detects an object existing around the own vehicle based on the result of transmitting and receiving searching waves, and the like.

The controller 740 of the HUD apparatus described above acquires information from the driving support ECU 762 (for example, the distance to the preceding vehicle, the orientation of the preceding vehicle, the position where an obstacle or a sign exists, etc.) as foreground information. Further, an ignition (IG) signal and own vehicle state information are input to the controller 740. The own vehicle state information of these is information that is acquired as vehicle information and does not require high-resolution display, and includes for example, warning information indicating that the predetermined abnormal condition has occurred such as the remaining amount of fuel of the internal combustion engine and the temperature of cooling water. It also includes the operation result of the direction indicator, the traveling speed of the own vehicle, the shift position information, and the like. The controller 740 described above is activated when an ignition signal is input. Further, the projected member 6 may be any member such as a combiner on which information can be projected other than the windshield described above, and any member can be adopted as long as the real image can be formed in front of the own vehicle in the driver's line of sight 8 so as to be visually recognized by the driver.

Figure 34:
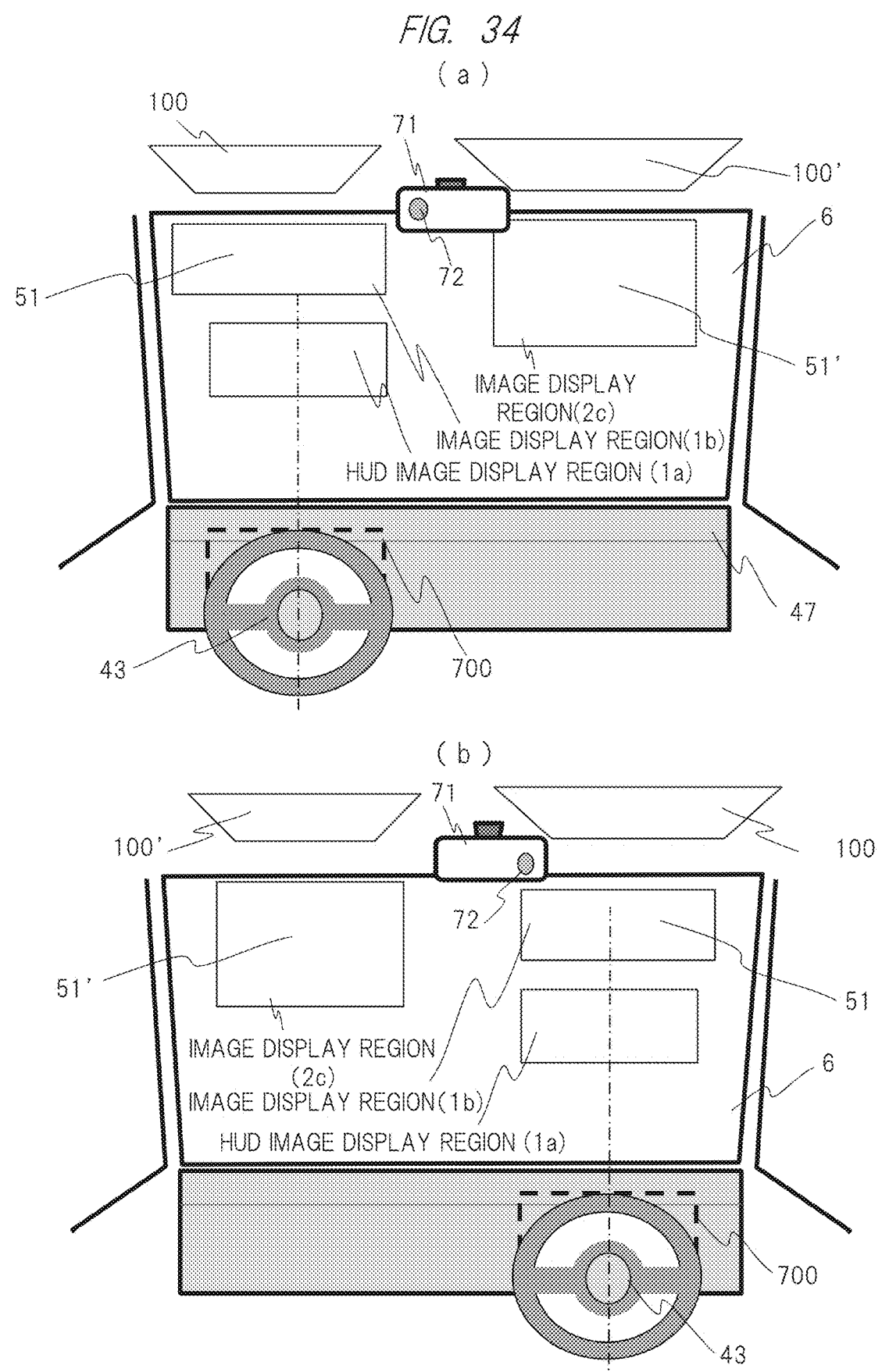
FIG. 34 is a diagram showing an example of an arrangement in a cockpit of an automobile.

Subsequently, FIG. 34 shows an example of the arrangement in the cockpit of the automobile in which the above-mentioned image projection apparatus 48, the transparent sheet 51, and/or the HUD apparatus 700 are mounted. FIG. 34(*a*) shows the arrangement of the system corresponding to the automobile having the steering arranged on the left side, and FIG. 34(*b*) shows the arrangement of the system corresponding to the automobile having the steering arranged on the right side. In an HUD image display region (1*a*) of the drawing, the image information is reflected and displayed on the windshield 6 by using the HUD apparatus 700 shown above. Also, in an image display region (1*b*) (corresponding to a region where the transparent sheet 51 is attached), image information is reflected on the windshield 6 by using the apparatus (here, "vehicle information display apparatus" denoted by reference numeral 100) including the image projection apparatus 48 having the light source apparatus 101 and the liquid crystal display panel 52 and the light direction changing panel 54, and the reflected image thereof is monitored by the driver. At that time, as shown in the drawing, it is preferable that the image display region (1*b*) is set in the upper part of the windshield 6 and the HUD image display region (1*a*) is set in a range or region which does not obstruct the monitoring of the scenery outside the vehicle for the driver, for example, in the range where the bonnet of the own vehicle is monitored.

As shown in FIG. 34, the vehicle information display apparatus 100 described above is arranged on the ceiling surface of the vehicle, while the HUD apparatus 700 is arranged inside the dashboard 47 between the windshield 6 and the steering 43 so as to be directed toward the steering 43 at the position continuous to the windshield 6. As a result, it is possible to provide the vehicle information display system, in which when the driver drives his/her own vehicle, the image of the large-sized high resolution image display apparatus is reflected on the windshield 6 by the vehicle information display apparatus 100 and the reflected image thereof can be monitored by the driver or the passenger on the outside scenery monitored through the windshield 6, that is, in a part of the region of the windshield 6 or the information from the HUD apparatus 700 can also be displayed as needed.

Namely, in the image display region (1*b*) in which the transparent sheet 51 is attached to the windshield 6, the image light from the vehicle information display apparatus 100 is reflected and monitored by the driver. At that time, the augmented reality can be realized in a pseudo manner by, for example, superimposing the image display region (1*b*) on the scenery monitored by the driver while driving. The image projected at this time is preferably set in a range or region that does not obstruct the monitoring of the scenery outside the vehicle for the driver.

For example, by providing a camera 72 configured to monitor the state of the driver and the state in the vehicle on a rear-view mirror 71 shown in FIG. 34, it is also possible to control the emission direction of the image light from the vehicle information display apparatus 100 so as to be matched with the height of eyes of the driver.

<Modification of Vehicle Information Display System: Display to Outside>

According to the embodiment described above in detail, when the driver drives his/her own vehicle, the necessary image information can be unidirectionally displayed with high resolution so as to be monitored by the driver and the passenger in the vehicle via the windshield 6 as the projected member which is the shield glass constituting the vehicle. At that time, the information cannot be monitored from the outside of the vehicle. However, the vehicle information display system according to the present invention is not limited to the above-described embodiment, and it is also possible to display the image information to the outside of the vehicle. Namely, the image information can be displayed to the inside or the outside of the vehicle not only via the windshield 6 described above but also via the rear glass 6' and the side glass 6' which are shield glasses in the same manner as above.

For example, in the system of this embodiment, it is possible to display information indicating the state of a vehicle such as "vacant" on a part of the windshield 6 of a taxi and further on the rear glass 6' or the side glass 6''. Alternatively, it is also possible to display other information such as promotion and advertisement to the outside of the vehicle. Also, in a vehicle such as a bus or a train, information such as the route and the destination can be unidirectionally displayed on the windshield, the rear glass, the side glass, and others to the outside of the vehicle. The configuration of the vehicle information display system when displaying information to the outside will be described below.

FIG. 34 shows a system in which necessary image information is unidirectionally displayed with high resolution to the outside of the vehicle via the windshield 6 as a projected member so as to be monitored from the outside. More specifically, an example of displaying the state of a taxi (such as "vacant") on the windshield of a taxi is shown here. In this example, in the configuration shown in FIG. 33, the image light from the vehicle information display apparatus 100' is diffused and transmitted on transparent sheet 51' (see FIG. 22) provided on the surface of the windshield 6, and the image thereof is transmitted and displayed to the outside of the vehicle such that a pedestrian or the like can monitor it. As a result, the driver or the passenger can display the necessary information on the windshield 6 in a relatively large size to the outside of the vehicle, but the display does not obstruct the monitoring of the scenery outside the vehicle to be monitored from the inside of the vehicle and does not hinder the driving of the driver.

Further, by providing a reflection enhanced coating whose reflectance of a specific polarized wave is increased instead of the above-mentioned transparent diffusion sheet material 55 of the transparent sheet 51', the reflectance of the image light flux can be increased and simultaneously the intensity of the double image generated by the reflected image of the windshield 6 can be significantly reduced. Namely, it was confirmed that the same effect as the above-mentioned technique can be obtained.

Further, it is preferable that, by using, for example, PDLC of Santech Display Co., Ltd. instead of the above-mentioned transparent diffusion sheet material 55 of the transparent sheet 51', the image light is dispersed without applying a voltage in the image display state and it is used instead of the transparent sheet by turning it to a transparent state by applying a voltage in the image non-display state.

Similarly to the above, the transparent sheet 51' is composed of the polarization plate 57 that transmits S waves and the transparent diffusion sheet material 55, and by using a film obtained by melting and stretching a thermoplastic polymer in which zirconium nanoparticles and diamond nanoparticles having a large refractive index are dispersed, for example, "KALEIDO SCREEN" manufactured by JXTG Energy Co., Ltd. (see Patent Document 3), it is transparent when the image is not displayed and it diffuses and transmits the image light when the image is displayed. Consequently, the image information can be displayed to the outside in the state where the image information is not visually recognized by driver and the passenger and the monitoring of the outside scenery is not obstructed.

The function of the transparent sheet 51' in this case will be described. The transparent sheet 51' is composed of the polarization plate 57, the transparent diffusion sheet material 55, and the retardation plate 58, and reduces the illuminance of the sunlight incident from an oblique direction by reflecting the S-polarized light thereof and transmitting the P-polarized light thereof similarly to the above. At this time, a part of the sunlight is absorbed by the polarization plate by rotating the polarization axis of P-polarized light by the retardation plate 58. As a result, the damage that the image projection apparatus 48 receives due to the sunlight can be dispersed.

On the other hand, the image light diffused to the outside of the vehicle by the function of the transparent diffusion sheet material 55 (see FIG. 22) is reflected by the rear glass 6' and returns to the inside of the vehicle. This light may obstruct the driver's field of view and thus hinder the driving. Therefore, in this embodiment, the retardation plate 58 is arranged between the rear glass 6' and the polarization plate 57 to absorb the reflected light by the polarization plate, so that the information by the image light is unidirectionally displayed to the outside of the vehicle without being visually recognized by the driver and the passenger in the vehicle. Needless to say, the same effect can be obtained also in the example of the unidirectional transparent sheet shown in FIG. 23. At that time, the information by the image light does not obstruct the monitoring of the outside scenery by the driver or the passenger in the vehicle and does not hinder the driving. There is no practical problem if the haze (HAZE) defined by the ratio of the diffusion transmittance and the parallel light transmittance of the transparent sheet 51 mentioned above is 10% or less, but it is preferably 4% or less. Meanwhile, the HAZE of window glass for automobiles is 2% or less.

As described above, the display of information to the outside of the vehicle by using a part of shield glasses such as the windshield 6, the rear glass, and the side glass is particularly suitable for displaying the above-mentioned information such as "vacant" indicating the vacant state of the taxi to pedestrians or the like on the street. Further, as described above, the vehicle information display system according to the present embodiment not only unidirectionally displays image information on the windshield, but also can display various information including promotion, advertisement, and notification even in a large vehicle such as a bus or a train by using the projected member such as the rear glass 6' and the side glass 6'' (see FIG. 25, FIG. 26, and others) which are the shield glasses constituting the vehicle. In the following, the configuration and function of the vehicle information display system in the case of displaying information to the outside of the vehicle will be described below.

Figure 35:
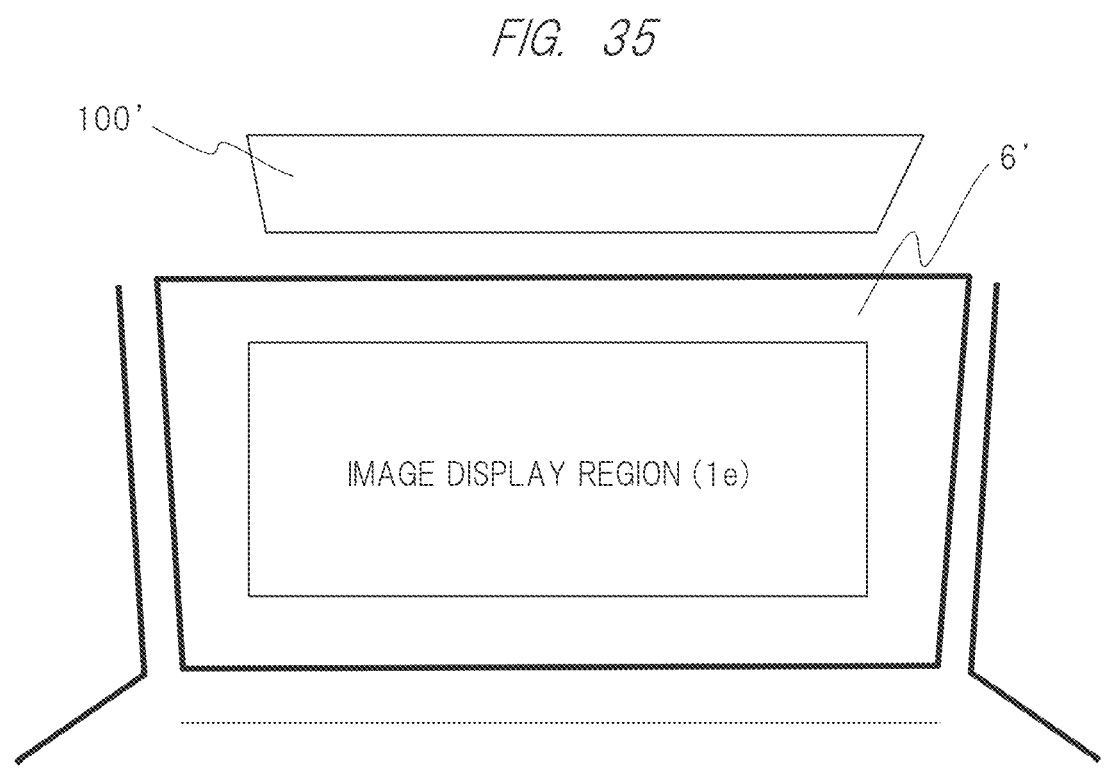

FIG. 35 shows an example in which information is displayed to, for example, a pedestrian or the like outside the vehicle via the rear glass 6' as the projected member constituting a part of the vehicle. As a result, the driver and the passenger can monitor the necessary information on the windshield 6 described above (see FIG. 25 and the like), and at the same time, information can be displayed also to the outside of the vehicle by the rear glass 6'. Note that the driver and the passenger cannot monitor the information displayed to the outside, and thus, the driver's field of view is not obstructed. Namely, the display of information to the outside of the vehicle does not obstruct the monitoring of the outside scenery by the driver and the passenger inside the vehicle.

In this example, the vehicle information display apparatus 100' is arranged above the rear glass 6' which is the projected member constituting a part of the vehicle, and the image information is displayed by projecting the image light thereof to the image display region (1e) set on the entire surface or a part of the surface of the rear glass 6'.

Also in this example, the transparent sheet 51' shown in FIG. 22 and FIG. 23 described above is provided in the image display region of the rear glass 6'. In addition, the projected member that unidirectionally displays the image information to the outside of the vehicle is not limited to the windshield 6 and the rear glass 6' described above, and the side glass 6'' that constitutes the side surface of the vehicle (see FIG. 28, FIG. 29, and others) can also be used. In this case, though not shown here, the vehicle information display apparatus 100' is arranged on a member in the vicinity of the side glass 6'' (for example, a part of adjacent ceiling surface or window frame) and the transparent sheet 51' shown in FIG. 22 and FIG. 23 described above is provided in the image display region (1d) of the side glass 6''. The display of the information on the side glass 6'' may be suitable for displaying a message such as "Thank you for waiting" or "Please board" in a taxi to the passenger or the like on the street.

In addition, in the above example, the vehicle information display apparatuses 100 and 100' in which the image information is unidirectionally displayed to the inside or the outside of the vehicle via the windshield 6, the rear glass 6', and the side glass 6'' which are the projected members constituting the vehicle have been described. However, the present invention is not limited to these, and for example, the vehicle information display apparatus 100 that displays information to the inside of the vehicle and the vehicle information display apparatus 100' that displays information to the outside of the vehicle can be combined as appropriate. According to this, for example, when applied to public transportation such as a bus and a train, various types of information including promotion, advertisement, notification, and others can be displayed to the public outside the vehicle via the rear glass 6' and the side glass 6" (in this case, it is possible to control the display so as not to be visually recognized from the inside of vehicle), and information can be effectively displayed to the public. Further, as described above, it is also possible to simultaneously mount and use the head-up display (HUD) 700 as the vehicle information display apparatus.

Further, by using, for example, PDLC of Santech Display Co., Ltd. instead of the transparent diffusion sheet material 55 described above (see FIG. 22) to form a sheet or a film that absorbs or reflects the specific polarized wave on the image light incident side, the image light can be displayed to the inside and the outside of the vehicle by turning it to a white state without applying a voltage in the image display state. It is preferable that it is used instead of the transparent sheet by turning it to a transparent state by applying a voltage in the image non-display state. When the driver needs to see the rear scenery, for example, when a shift lever is shifted to a back gear or it is confirmed by a driver surveillance camera that the point of view has been moved to a side mirror or a rear-view mirror, the rear visibility is ensured by applying a voltage to a part of the PDLC to make the entire surface or a part of the PDLC transparent. The return of the image light to the driver side is reduced by the sheet or the film mentioned above, thereby preventing the hindrance of the driving.

Further, it is also possible to display the image from the HUD apparatus 700 described above on the window glass 6 by using the display apparatus including the image projection apparatus 48 and the light direction changing panel 54 described above, and FIG. and FIG. 33 show an example thereof. The configuration and operation of the HUD apparatus 700 are the same as above, and the configuration and operation of the vehicle information display apparatus 100 are also the same as above. Also in this case, similarly to the above, it is possible to improve the utilization efficiency of the generated light and to improve the uniform illumination characteristics, and at the same time, it is possible to manufacture it in a small size and at low cost including a modularized light source apparatus of the S-polarized wave.

In addition, when displaying a larger image via the windshield 6, the rear glass 6', and the side glass 6' which are projected members constituting the vehicle, a large-sized liquid crystal display panel 52 obtained by combining a plurality of relatively inexpensive liquid crystal display panels by making the joints thereof continuous may be adopted as the image display element 52 that constitutes the image projection apparatus 48 together with the light source apparatus 101 in the vehicle information display apparatuses 100 and 100'. In this case, the vehicle information display system capable of displaying more expanded image information by emitting the light flux from the above-mentioned light source apparatus 101 to the transparent sheet 51 parallelly provided on the window glass 6 and unidirectionally reflecting and diffusing it by the transparent sheet 51 can be realized relatively easily and at low cost while significantly reducing the power consumption.

In the vehicle image display system of the HUD apparatus type according to the present invention described above, when the image light from the image display apparatus 48 is parallel and the distance from the window glass to the eyes 8 of the observer is 80 cm, the relative size of the reflected image (virtual image) shown on the window glass in the case where the screen horizontal size of the image display apparatus 48 is 10 to 20 inches is obtained by calculation using the distance at which the virtual image can be seen (position reflected on the window glass) as a parameter. FIG. 36 shows the result thereof. When a virtual image is formed above an axis L-L' horizontal to the eyes of the observer, the virtual image appears in the air, and the observer causes motion sickness when the car fluctuates up and down. Therefore, the virtual image should be displayed on or below the horizontal line L-L', and the experiments by the inventors have revealed that an angle β formed between the virtual image and the horizontal axis is preferably in the range of 0 to 8 degrees, and is more preferably in the range of 0 to 4 degrees when realizing augmented reality. The virtual image distance when β is 4 degrees is 20 m, and the virtual image obtained by the reflection on the window is about 250 inches when the horizontal size of the image display apparatus is 10 inches and the virtual image is about 500 inches when the horizontal size is 20 inches.

In the foregoing, various vehicle information display systems to which the information display system according to the embodiment is applied and the specific configurations thereof have been described, but the information display system according to the present invention is not limited to these and can be used also as an information display system for displaying information necessary for sailing to a ship captain and steerers in a deck (steering house) of a ship. For example, as shown in FIG. 37(*a*) and FIG. 37(*b*), the image display apparatus 48' constituting the display system can be arranged in the deck (steering house) of the ship (for example, on the ceiling surface), and the image corresponding to the necessary information can be projected and reflected on a part of the windshield 6 constituting the deck (steering house) (see arrows in the drawing) such that the image can be visually recognized by the observer as a virtual image in the same manner as the vehicle information display system described above. In the drawing, a steering wheel is denoted by a reference numeral 43'. As can be seen from these drawings, the deck (steering house) of the ship is wider than the driver's seat in a vehicle and the windshield 6 thereof is not greatly inclined unlike that in a passenger car and is almost vertical and is inclined forward at its upper portion as shown in the drawing in many cases. Therefore, the information display system for the ship can be installed more easily as compared with the vehicle information display system.

In the foregoing, the various embodiments have been described above. However, the present invention is not limited to the above-described embodiments, and includes various modifications. For example, the above embodiments have described the entire system in detail in order to make the present invention easily understood, and the present invention is not necessarily limited to those having all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

The preferable modes in the present invention will be additionally presented below.

[Additional Remark 1]

A light source apparatus configured to supply specific polarized light to an image display apparatus, comprising:

a point or surface light source configured to diffuse natural light;

an optical unit configured to reduce a divergence angle of divergent light from the point or surface light source configured to diffuse the natural light; and reflection surfaces configured to reflect the divergent light to propagate it to the image display apparatus, wherein a connection surface which connects the reflection surfaces is arranged so as to face the image display apparatus on one side and a reflective polarization plate is arranged between the image display apparatus and the reflection surface, wherein a reflection surface is arranged via a retardation plate on the other side of the connection surface so as to face the connection surface, and wherein the other polarized wave reflected by the reflective polarization plate is subjected to polarization conversion so as to be transmitted through the reflective polarization plate, thereby selectively propagating only the specific polarized wave to the image display apparatus, and a part of a divergence angle of a light flux incident on the image display apparatus from the surface light source is controlled by a shape and roughness of a reflection surface provided on the surface light source.

[Additional Remark 2]

The light source apparatus according to additional remark 1, wherein the divergence angle is within ±30 degrees.

[Additional Remark 3]

The light source apparatus according to additional remark 2, wherein the divergence angle is within ±10 degrees.

[Additional Remark 4]

The light source apparatus according to additional remark 1, wherein a horizontal diffusion angle and a vertical diffusion angle are different from each other.

[Additional Remark 5]

The light source apparatus according to additional remark 1, wherein a relative luminance ratio of an overall screen between a center of the screen and a peripheral portion of the screen in a state where the image display apparatus faces straight the center of the screen and a viewpoint is placed at the same position as a diagonal dimension of the screen is 20% or more.

[Additional Remark 6]

The light source apparatus according to additional remark 5, wherein a relative luminance of the peripheral portion of the screen is 30% or more.

[Additional Remark 7]

The light source apparatus according to additional remark 1, wherein the image display apparatus is a liquid crystal panel element, and high contrast performance obtained by multiplying an inverse of a cross transmittance of the reflective polarization plate with a contrast obtained by characteristics of polarization plates provided on a light incident surface and an emission surface can be obtained.

[Additional Remark 8]

An information display system using the light source apparatus according to any one of additional remarks 1 to 7, comprising:

the image display apparatus configured to generate and project image light by modulating an intensity of specific polarized light having acute-angled diffusion characteristics in accordance with an image signal, as an information display apparatus configured to unidirectionally display an image to inside or outside of a space via a transparent projected member constituting the space;

a transparent sheet provided on an inner surface of a display region set on a part of the projected member; and a light direction changing unit configured to direct a direction of the image light from the image display apparatus toward the transparent sheet of the display region, wherein the image display apparatus includes an image light characteristic converting unit configured to convert the image light from the point or surface light source constituting the image display apparatus into image light having a narrow diffusion angle and composed of a specific polarization component.

[Additional Remark 9]

The information display system according to additional remark 8, wherein a plurality of surface-emitting light sources is provided together for one image display element in the light source apparatus.

[Additional Remark 10]

The information display system according to additional remark 9, wherein a plurality of surface-emitting light sources having different light emission directions is provided together for one image display element in the light source apparatus.

[Additional Remark 11]

A light source apparatus configured to supply specific polarized light to an image display apparatus, comprising:

a point or surface light source configured to diffuse natural light;

an optical unit configured to reduce a divergence angle of divergent light from the point or surface light source configured to diffuse the natural light; and a first polarization conversion unit, wherein a light flux emitted from the first polarization conversion unit is incident on a light guide body arranged adjacent to a light emission surface of the first polarization conversion unit, is reflected on a reflection surface of the light guide body, and is propagated to the image display apparatus arranged at a position facing the reflection surface, wherein a connection surface which connects the reflection surfaces of the light guide body is arranged so as to face the image display apparatus on one side and a reflective polarization plate is arranged between the image display apparatus and the reflection surface, and wherein, by a second polarization conversion unit in which a reflection surface is arranged via a retardation plate on the other side of the connection surface so as to face the reflection surface and the connection surface, the other polarized wave reflected by the reflective polarization plate is converted so as to be transmitted through the reflective polarization plate, thereby selectively propagating the specific polarized wave to the image display apparatus, and a part of a divergence angle of a light flux incident on the image display apparatus from the surface light source is controlled by a shape and roughness of a reflection surface provided on the surface light source.

[Additional Remark 12]

The light source apparatus according to additional remark 11, wherein the divergence angle is within ±30 degrees.

[Additional Remark 13]

The light source apparatus according to additional remark 11, wherein the divergence angle is within ±10 degrees.

[Additional Remark 14]

The light source apparatus according to additional remark 11, wherein a horizontal diffusion angle and a vertical diffusion angle are different from each other.

[Additional Remark 15]

The light source apparatus according to additional remark 11, wherein a relative luminance ratio of an overall screen between a center of the screen and a peripheral portion of the screen in a state where the image display apparatus faces straight the center of the screen and a viewpoint is placed at the same position as a diagonal dimension of the screen is 20% or more.

[Additional Remark 16]

The light source apparatus according to additional remark 15, wherein a relative luminance of the peripheral portion of the screen is 30% or more.

[Additional Remark 17]

The light source apparatus according to additional remark 11, wherein the image display apparatus is a liquid crystal panel element, and high contrast performance obtained by multiplying an inverse of a cross transmittance of the reflective polarization plate with a contrast obtained by characteristics of polarization plates provided on a light incident surface and an emission surface can be obtained.

[Additional Remark 18]

An information display system using the light source apparatus according to any one of additional remarks 11 to 17, comprising:

the image display apparatus configured to generate and project image light by modulating an intensity of specific polarized light having acute-angled diffusion characteristics in accordance with an image signal, as an information display apparatus configured to unidirectionally display an image to inside or outside of a space via a transparent projected member constituting the space;

a transparent sheet provided on an inner surface of a display region set on a part of the projected member; and a light direction changing unit configured to direct a direction of the image light from the image display apparatus toward the transparent sheet of the display region, wherein the image display apparatus includes an image light characteristic converting unit configured to convert the image light from the point or surface light source constituting the image display apparatus into image light having a narrow diffusion angle and composed of a specific polarization component.

[Additional Remark 19]

The information display system according to additional remark 18, wherein a plurality of surface-emitting light sources is provided together for one image display element in the light source apparatus.

[Additional Remark 20]

The information display system according to additional remark 18, wherein a plurality of surface-emitting light sources having different light emission directions is provided together for one image display element in the light source apparatus.

[Additional Remark 21]

An information display system having acute-angled diffusion characteristics configured to display an image to inside or outside of a space via a transparent projected member constituting the space, comprising:

an image projection apparatus arranged inside the space and configured to generate and project image light by modulating a light flux from a light source;

a transparent sheet provided on an inner surface of a display region set on a part of the projected member; and a light direction changing unit configured to direct a direction of the image light from the image projection apparatus toward the transparent sheet of the display region, wherein the image projection apparatus includes an image light characteristic converting unit for converting the image light from the light source constituting the image projection apparatus into image light having a narrow diffusion angle and composed of a specific polarization component, and wherein the transparent sheet unidirectionally displays the image to inside or outside of the space by reflecting or transmitting the image light from the image projection apparatus.

[Additional Remark 22]

The information display system according to additional remark 21, wherein, when an image is displayed to inside of the space, the image light flux from the image projection apparatus is set to S-polarized light, and a unidirectional image display transparent sheet in which a retardation plate, a polarization plate transmitting S-polarized light, and a transparent diffusion sheet material are laminated in order from the projected member toward the inside of the space is provided inside the projected member.

[Additional Remark 23]

The information display system according to additional remark 21, wherein, when an image is displayed to outside of the space, the image light flux from the image projection apparatus is set to P-polarized light, and a unidirectional image display transparent sheet in which a transparent diffusion sheet material, a retardation plate, and a polarization plate transmitting P-polarized light are laminated in order from the projected member toward the inside of the space is provided inside the projected member.

[Additional Remark 24]

The information display system according to additional remark 21, wherein, when an image is displayed to inside of the space, the image light flux from the image projection apparatus is set to S-polarized light, and a unidirectional image display transparent sheet in which an image light control film, a transparent sheet, and a transparent diffusion sheet material are laminated in order from the projected member toward the inside of the space is provided inside the projected member.

[Additional Remark 25]

The information display system according to additional remark 21, wherein, when an image is displayed to outside of the space, the image light flux from the image projection apparatus is set to P-polarized light, and a unidirectional image display transparent sheet in which a transparent diffusion sheet material, an image light control film, a transparent sheet, and a transparent diffusion sheet material are laminated in order from the projected member toward the inside of the space is provided inside the projected member.

[Additional Remark 26]

A unidirectional image display transparent sheet used in the information display system according to any one of additional remarks 21 to 25, wherein the unidirectional image display transparent sheet is composed of a polarization plate, a transparent sheet, and a retardation plate, and wherein the unidirectional image display transparent sheet is a film obtained by stretching a thermoplastic polymer in which nanoparticles having a large refractive index are dispersed, is transparent when no image is displayed, and makes an observer inside or outside the space visually recognize image information by diffusing and reflecting the image light when the image is displayed.

[Additional Remark 27]

The unidirectional image display transparent sheet according to additional remark 26, wherein a haze defined by a ratio of a diffusion transmittance and a parallel light transmittance of the unidirectional image display transparent sheet is 10% or less.

[Additional Remark 28]

The unidirectional image display transparent sheet according to additional remark 26, wherein a haze defined by a ratio of a diffusion transmittance and a parallel light transmittance of the unidirectional image display transparent sheet is 4% or less.

REFERENCE SIGNS LIST

1 . . . automobile (vehicle) body, 6 . . . windshield, 6' . . . rear glass, 6" . . . side glass, 100 . . . vehicle information display apparatus, 101 . . . light source apparatus, 48 . . . image projection apparatus, 49 . . . reflective polarization plate, 52 . . . liquid crystal display panel (element), 50 . . . protective cover, 51 . . . unidirectional transparent sheet, 54 . . . light direction changing panel, 55 . . . transparent diffusion sheet material, 57 . . . polarization plate, 58 . . . retardation plate, 70a . . . transparent portion, 70b . . . black portion, 202 . . . LED board, 203 . . . light guide body, 205 . . . reflection sheet, 220 . . . show window (window glass), 300 . . . smartphone

The invention claimed is:

1. An information display system comprising:

an image projection apparatus having a display panel and a point or surface light source configured to irradiate the display panel with light;

a transparent sheet configured to reflect the light from the image projection apparatus;

a light direction changing panel configured to direct a projection direction of the light from the image projection apparatus toward the transparent sheet;

a first image light control film provided on an upper surface of the image projection apparatus and configured to restrict an emission direction of the image light such that the image light is not directly delivered to an observer and the image light reflected by the transparent sheet is recognized by the observer; and a protective cover configured to absorb or reflect near-infrared light and infrared light, wherein the image projection apparatus is arranged above the observer, and an image is displayed to inside of a space via a transparent projected member that partitions the space, wherein the transparent sheet is composed of a polarization plate and a transparent diffusion sheet, and is provided on an inner surface of a display region set on a part of the transparent projected member, wherein the protective cover is provided on a light emission side of the light direction changing panel, and wherein a second image light control film is provided between the projected member and the transparent sheet.

2. The information display system according to claim 1, wherein the first image light control film and the second image light control film have a sandwich structure in which a transparent portion made of transparent silicon and a black portion made of black silicon are alternately arranged and a synthetic resin is arranged on a light incident/emission surface.

3. The information display system according to claim 1, wherein a pitch h of the transparent portion and the black portion of the first image light control film and the second image light control film is ⅓ or less with respect to pixels of an image to be displayed.

4. The information display system according to claim 1, wherein the polarization plate is a reflective polarization plate and the reflective polarization plate has a property of reflecting P-polarized light and transmitting S-polarized light or a property of reflecting S-polarized light and transmitting P-polarized light.

5. The information display system according to claim 1, wherein the protective cover has a film configured to absorb or reflect a P wave component of sunlight.

6. The information display system according to claim 1, wherein the protective cover has black stripes formed of a base material and a paint containing carbon black, and wherein the black stripes are provided on a light emission side of the base material.

7. The information display system according to claim 1, wherein the transparent projected member is a windshield of a vehicle.

8. The information display system according to claim 1, wherein the transparent projected member is a show window of a store.

9. The information display system according to claim 1, wherein a haze of the transparent sheet is 10% or less.

\* \* \* \* \*